235-380
3/8/83
OR 4,376,279
SR

United States Patent [19]

Perlman et al.

[11] 4,376,279

[45] Mar. 8, 1983

[54] PERSONAL IDENTIFICATION SYSTEM

[75] Inventors: Marvin Perlman, Granada Hills; Milton Goldfine, La Crescenta, both of Calif.

[73] Assignee: Trans-Cryption, Inc., La Crescenta, Calif.

[21] Appl. No.: 229,085

[22] Filed: Jan. 28, 1981

[51] Int. Cl.$^{3}$ .......... H04Q 9/00

[52] U.S. Cl. .......... 235/380; 340/825.34; 377/55

[58] Field of Search .......... 340/825.34; 235/92 SH, 235/380; 364/717; 371/53, 54

[56] References Cited

U.S. PATENT DOCUMENTS

| | | | |
|---|---|---|---|
| 3,938,091 | 2/1976 | Atalla et al. | 340/825.34 |
| 4,016,405 | 4/1977 | McCune et al. | 340/825.34 |
| 4,108,359 | 8/1978 | Proto | 371/53 |
| 4,198,619 | 4/1980 | Atalla | 235/380 |
| 4,328,414 | 5/1982 | Atalla | 235/380 |

*Primary Examiner*—Donald J. Yusko
*Attorney, Agent, or Firm*—Freilich, Hornbaker, Wasserman, Rosen & Fernandez

[57] ABSTRACT

A personal identification system comprises a generator which generates an Offset Number which is recorded on the magnetic stripe of a card, together with the account number (PAN) of the person to whom the card is to be issued. The generator stores transformed digits of a sequence of digits (IN) which have been secretly entered by one or more officers of the card-issuing institution. To generate the Offset Number the PAN is entered and transformed before being stored to initialize a first feedback shift register. The person to whom the card is to be issued enters a chosen alphanumeric sequence (PIN) secretly known only to him. The PIN, after undergoing transformation is stored to initialize a second feedback shift register. When both registers have been initialized they are reinitialized by different parts of different digits of the transformed IN. Different digits of the two registers are used to initialize a control feedback shift register which when reaching a selected state in its cycle of states controls the generator to generate the Offset Number, based on a selected mapping of the digits, then present, in the first and second feedback shift registers. To use the card it is entered into a verifier. Therein the PAN and Offset Number on the magnetic stripe are read out. The intended user enters a PIN, and the verifier, like the generator, generates an Offset Number. Only if the PIN entered into the verifier is identical to that entered into the generator, does the verifier produce an Offset Number identical to that read off the card, thereby indicating that the card user is the one to whom the card was issued.

27 Claims, 41 Drawing Figures

| Line | | |
|---|---|---|
| a | 1 8 8 9 0 0 4 2 5 0 8 8 9 7 0 2 0 2 5 7 | IN |
| b | 0 9 9 8 1 1 5 3 4 1 9 9 8 6 1 3 1 3 4 6 | IN transformed |
| c | 0 4 4 4 0 0 2 1 2 0 4 4 4 3 0 1 0 1 2 3 | IN transformed mod 5 |
| d | 0 1 1 1 0 0 0 0 0 0 1 1 1 0 0 0 0 0 0 0 | Reg 61 |
| e | 0 0 0 0 0 0 1 0 1 0 0 0 0 1 0 0 0 0 1 1 | Reg 62 |
| f | 0 0 0 0 0 0 0 1 0 0 0 0 0 1 0 1 0 1 0 1 | Reg 63 |
| g | 0 1 1 0 1 1 1 1 0 1 1 1 0 0 1 1 1 1 0 0 | IN transformed mod 2, Reg 64 |

FIG. 3

| | $E_{A5}$ | | | | |
|---|---|---|---|---|---|
| $A^{(5)}_{k-5}A^{(5)}_{k-10}$ | 0 | 1 | 2 | 3 | 4 |
| 0 0 | 2 | 3 | 4 | 1 | 0 |
| 0 1 | 1 | 2 | 3 | 0 | 4 |
| 0 2 | 0 | 1 | 2 | 4 | 3 |
| 0 3 | 4 | 0 | 1 | 3 | 2 |
| 0 4 | 3 | 4 | 0 | 2 | 1 |
| 1 0 | 4 | 0 | 1 | 3 | 2 |
| 1 1 | 3 | 4 | 0 | 2 | 1 |
| 1 2 | 2 | 3 | 4 | 1 | 0 |
| 1 3 | 1 | 2 | 3 | 0 | 4 |
| 1 4 | 0 | 1 | 2 | 4 | 3 |
| 2 0 | 1 | 2 | 3 | 0 | 4 |
| 2 1 | 0 | 1 | 2 | 4 | 3 |
| 2 2 | 4 | 0 | 1 | 3 | 2 |
| 2 3 | 3 | 4 | 0 | 2 | 1 |
| 2 4 | 2 | 3 | 4 | 1 | 0 |
| 3 0 | 3 | 4 | 0 | 2 | 1 |
| 3 1 | 2 | 3 | 4 | 1 | 0 |
| 3 2 | 1 | 2 | 3 | 0 | 4 |
| 3 3 | 0 | 1 | 2 | 4 | 3 |
| 3 4 | 4 | 0 | 1 | 3 | 2 |
| 4 0 | 0 | 1 | 2 | 4 | 3 |
| 4 1 | 4 | 0 | 1 | 3 | 2 |
| 4 2 | 3 | 4 | 0 | 2 | 1 |
| 4 3 | 2 | 3 | 4 | 1 | 0 |
| 4 4 | 1 | 2 | 3 | 0 | 4 |

FIG. 4

| Line | | | | | | | | | | | | | |
|---|---|---|---|---|---|---|---|---|---|---|---|---|---|
| a | 1 | 3 | 7 | 0 | 5 | 8 | 4 | 2 | 9 | 6 | 0 | 2 | PAN |
| b | 0 | 2 | 6 | 1 | 4 | 9 | 5 | 3 | 8 | 7 | 1 | 3 | PAN transformed |
| c | 0 | 1 | 3 | 0 | 2 | 4 | 2 | 1 | 4 | 3 | 0 | 1 | $\hat{PAN}_5$ |
| d | 0 | 0 | 0 | 1 | 0 | 1 | 1 | 1 | 0 | 1 | 1 | 1 | $\hat{PAN}_2$ |

FIG. 5

| | | | | $A^{(5)}_{k-5}$ | | | | | $A^{(5)}_{k-10}$ | $\hat{PAN}_5$ |
|---|---|---|---|---|---|---|---|---|---|---|
| 0 | 0 | 0 | 0 | 0 | 0 | 0 | 0 | 0 | 0 | 0 |
| 2 | 0 | 0 | 0 | 0 | 0 | 0 | 0 | 0 | 0 | 1 |
| 3 | 2 | 0 | 0 | 0 | 0 | 0 | 0 | 0 | 0 | 3 |
| 1 | 3 | 2 | 0 | 0 | 0 | 0 | 0 | 0 | 0 | 0 |
| 2 | 1 | 3 | 2 | 0 | 0 | 0 | 0 | 0 | 0 | 2 |
| 4 | 2 | 1 | 3 | 2 | 0 | 0 | 0 | 0 | 0 | 4 |
| 4 | 4 | 2 | 1 | 3 | 2 | 0 | 0 | 0 | 0 | 2 |
| 0 | 4 | 4 | 2 | 1 | 3 | 2 | 0 | 0 | 0 | 1 |
| 0 | 0 | 4 | 4 | 2 | 1 | 3 | 2 | 0 | 0 | 4 |
| 4 | 0 | 0 | 4 | 4 | 2 | 1 | 3 | 2 | 0 | 3 |
| 4 | 4 | 0 | 0 | 4 | 4 | 2 | 1 | 3 | 2 | 0 |
| 3 | 4 | 4 | 0 | 0 | 4 | 4 | 2 | 1 | 3 | 1 |
| 0 | 3 | 4 | 4 | 0 | 0 | 4 | 4 | 2 | 1 | |

| | $A^{(2)}_{k-2}$ | | | | | | $A^{(2)}_{k-8}$ | | $A^{(2)}_{k-10}$ | $\hat{PAN}_2$ |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 1 | 0 | 0 | 0 | 0 | 0 | 0 | 0 | 0 | 0 |
| 0 | 1 | 1 | 0 | 0 | 0 | 0 | 0 | 0 | 0 | 1 |
| 1 | 0 | 1 | 1 | 0 | 0 | 0 | 0 | 0 | 0 | 0 |
| 1 | 1 | 0 | 1 | 1 | 0 | 0 | 0 | 0 | 0 | 1 |
| 1 | 1 | 1 | 0 | 1 | 1 | 0 | 0 | 0 | 0 | 1 |
| 1 | 1 | 1 | 1 | 0 | 1 | 1 | 0 | 0 | 0 | 1 |
| 1 | 1 | 1 | 1 | 1 | 0 | 1 | 1 | 0 | 0 | 0 |
| 1 | 1 | 1 | 1 | 1 | 1 | 0 | 1 | 1 | 0 | 1 |
| 0 | 1 | 1 | 1 | 1 | 1 | 1 | 0 | 1 | 1 | 1 |
| 0 | 0 | 1 | 1 | 1 | 1 | 1 | 1 | 0 | 1 | 1 |
| 0 | 0 | 0 | 1 | 1 | 1 | 1 | 1 | 1 | 0 | |

FIG. 6

| $C^{(5)}_{k-5}\,C^{(5)}_{k-10}$ | $E_{C5}$: 0 | 1 | 2 | 3 | 4 |
|---|---|---|---|---|---|
| 0 0 | 1 | 4 | 3 | 2 | 0 |
| 0 1 | 0 | 3 | 2 | 1 | 4 |
| 0 2 | 4 | 2 | 1 | 0 | 3 |
| 0 3 | 3 | 1 | 0 | 4 | 2 |
| 0 4 | 2 | 0 | 4 | 3 | 1 |
| 1 0 | 3 | 1 | 0 | 4 | 2 |
| 1 1 | 2 | 0 | 4 | 3 | 1 |
| 1 2 | 1 | 4 | 3 | 2 | 0 |
| 1 3 | 0 | 3 | 2 | 1 | 4 |
| 1 4 | 4 | 2 | 1 | 0 | 3 |
| 2 0 | 0 | 3 | 2 | 1 | 4 |
| 2 1 | 4 | 2 | 1 | 0 | 3 |
| 2 2 | 3 | 1 | 0 | 4 | 2 |
| 2 3 | 2 | 0 | 4 | 3 | 1 |
| 2 4 | 1 | 4 | 3 | 2 | 0 |
| 3 0 | 2 | 0 | 4 | 3 | 1 |
| 3 1 | 1 | 4 | 3 | 2 | 0 |
| 3 2 | 0 | 3 | 2 | 1 | 4 |
| 3 3 | 4 | 2 | 1 | 0 | 3 |
| 3 4 | 3 | 1 | 0 | 4 | 2 |
| 4 0 | 4 | 2 | 1 | 0 | 3 |
| 4 1 | 3 | 1 | 0 | 4 | 2 |
| 4 2 | 2 | 0 | 4 | 3 | 1 |
| 4 3 | 1 | 4 | 3 | 2 | 0 |
| 4 4 | 0 | 3 | 2 | 1 | 4 |

FIG. 7

| Line | | |
|---|---|---|
| a | C O D E 8 5 | PIN |
| b | 2 6 3 3 8 5 | numerical representation of PIN |
| c | 3 7 2 2 9 4 | transformed PIN |
| d | 1 3 1 1 4 2 | $\hat{PIN}_5$ |
| e | 1 1 0 0 1 0 | $\hat{PIN}_2$ |

FIG. 8

| | | | | $C^{(5)}_{k-5}$ | | | | | $C^{(5)}_{k-10}$ | $\hat{P}IN_5$ | | $C^{(2)}_{k-2}$ | | | | | | $C^{(2)}_{k-8}$ | | $^{(2)}_{k-10}$ | $\hat{P}IN_2$ |
|---|---|---|---|---|---|---|---|---|---|---|---|---|---|---|---|---|---|---|---|---|---|
| 0 | 0 | 0 | 0 | 0 | 0 | 0 | 0 | 0 | 0 | 1 | 0 | 0 | 0 | 0 | 0 | 0 | 0 | 0 | 0 | 0 | 1 |
| 4 | 0 | 0 | 0 | 0 | 0 | 0 | 0 | 0 | 0 | 3 | 0 | 0 | 0 | 0 | 0 | 0 | 0 | 0 | 0 | 0 | 1 |
| 2 | 4 | 0 | 0 | 0 | 0 | 0 | 0 | 0 | 0 | 1 | 0 | 0 | 0 | 0 | 0 | 0 | 0 | 0 | 0 | 0 | 0 |
| 4 | 2 | 4 | 0 | 0 | 0 | 0 | 0 | 0 | 0 | 1 | 1 | 0 | 0 | 0 | 0 | 0 | 0 | 0 | 0 | 0 | 0 |
| 4 | 4 | 2 | 4 | 0 | 0 | 0 | 0 | 0 | 0 | 4 | 1 | 1 | 0 | 0 | 0 | 0 | 0 | 0 | 0 | 0 | 1 |
| 0 | 4 | 4 | 2 | 4 | 0 | 0 | 0 | 0 | 0 | 2 | 1 | 1 | 1 | 0 | 0 | 0 | 0 | 0 | 0 | 0 | 0 |
| 1 | 0 | 4 | 4 | 2 | 4 | 0 | 0 | 0 | 0 | | 0 | 1 | 1 | 1 | 0 | 0 | 0 | 0 | 0 | 0 | |

FIG. 9

| CPI k | | | | | $A^{(5)}_{k-5}$ | | | | | $A^{(5)}_{k-10}$ | $\delta_5$ | | $A^{(2)}_{k-2}$ | | | | | | $A^{(2)}_{k-8}$ | | $A^{(2)}_{k-10}$ | $\delta_2$ |
|---|---|---|---|---|---|---|---|---|---|---|---|---|---|---|---|---|---|---|---|---|---|---|
| 0 | 0 | 3 | 4 | 4 | 0 | 0 | 4 | 4 | 2 | 1 | | 0 | 0 | 0 | 1 | 1 | 1 | 1 | 1 | 1 | 0 | |
| 1 | 1 | 0 | 3 | 4 | 4 | 0 | 0 | 4 | 4 | 2 | | 0 | 0 | 0 | 0 | 1 | 1 | 1 | 1 | 1 | 1 | |
| 2 | 3 | 1 | 0 | 3 | 4 | 4 | 0 | 0 | 4 | 4 | | 1 | 0 | 0 | 0 | 0 | 1 | 1 | 1 | 1 | 1 | |
| • | | | | | • | | | | | | | | | | | | • | | | | | |
| • | | | | | • | | | | | | | | | | | | • | | | | | |
| • | | | | | • | | | | | | | | | | | | • | | | | | |
| 16 | 1 | 2 | 2 | 1 | 2 | 4 | 1 | 2 | 0 | 4 | | 0 | 0 | 0 | 1 | 1 | 1 | 1 | 1 | 1 | 0 | |
| 17 | 2 | 1 | 2 | 2 | 1 | 2 | 4 | 1 | 2 | 0 | 4 | 0 | 0 | 0 | 0 | 1 | 1 | 1 | 1 | 1 | 1 | 1 |
| 18 | 2 | 2 | 1 | 2 | 2 | 1 | 2 | 4 | 1 | 2 | 4 | 0 | 0 | 0 | 0 | 0 | 1 | 1 | 1 | 1 | 1 | 1 |
| 19 | 2 | 2 | 2 | 1 | 2 | 2 | 1 | 2 | 4 | 1 | 3 | 0 | 0 | 0 | 0 | 0 | 0 | 1 | 1 | 1 | 1 | 0 |
| 20 | 4 | 2 | 2 | 2 | 1 | 2 | 2 | 1 | 2 | 4 | 0 | 1 | 0 | 0 | 0 | 0 | 0 | 0 | 1 | 1 | 1 | 1 |
| 21 | 0 | 4 | 2 | 2 | 2 | 1 | 2 | 2 | 1 | 2 | 1 | 0 | 1 | 0 | 0 | 0 | 0 | 0 | 0 | 1 | 1 | 1 |
| 22 | 0 | 0 | 4 | 2 | 2 | 2 | 1 | 2 | 2 | 1 | 0 | 0 | 0 | 1 | 0 | 0 | 0 | 0 | 0 | 0 | 1 | 1 |
| 23 | 0 | 0 | 0 | 4 | 2 | 2 | 2 | 1 | 2 | 2 | 1 | 1 | 0 | 0 | 1 | 0 | 0 | 0 | 0 | 0 | 0 | 1 |
| 24 | 0 | 0 | 0 | 0 | 4 | 2 | 2 | 2 | 1 | 2 | 2 | 0 | 1 | 0 | 0 | 1 | 0 | 0 | 0 | 0 | 0 | 0 |
| 25 | 0 | 0 | 0 | 0 | 0 | 4 | 2 | 2 | 2 | 1 | 3 | 0 | 0 | 1 | 0 | 0 | 1 | 0 | 0 | 0 | 0 | 1 |
| 26 | 0 | 0 | 0 | 0 | 0 | 0 | 4 | 2 | 2 | 2 | 0 | 0 | 0 | 0 | 1 | 0 | 0 | 1 | 0 | 0 | 0 | 1 |
| 27 | 0 | 0 | 0 | 0 | 0 | 0 | 0 | 4 | 2 | 2 | | 0 | 0 | 0 | 0 | 1 | 0 | 0 | 1 | 0 | 0 | |
| 28 | 0 | 0 | 0 | 0 | 0 | 0 | 0 | 0 | 4 | 2 | | 0 | 0 | 0 | 0 | 0 | 1 | 0 | 0 | 1 | 0 | |
| 29 | 0 | 0 | 0 | 0 | 0 | 0 | 0 | 0 | 0 | 4 | | 1 | 0 | 0 | 0 | 0 | 0 | 1 | 0 | 0 | 1 | |
| 30 | 3 | 0 | 0 | 0 | 0 | 0 | 0 | 0 | 0 | 0 | | 0 | 1 | 0 | 0 | 0 | 0 | 0 | 1 | 0 | 0 | |
| 31 | 2 | 3 | 0 | 0 | 0 | 0 | 0 | 0 | 0 | 0 | | 1 | 0 | 1 | 0 | 0 | 0 | 0 | 0 | 1 | 0 | |
| 32 | 2 | 2 | 3 | 0 | 0 | 0 | 0 | 0 | 0 | 0 | | 1 | 1 | 0 | 1 | 0 | 0 | 0 | 0 | 0 | 1 | |
| 33 | 2 | 2 | 2 | 3 | 0 | 0 | 0 | 0 | 0 | 0 | | 1 | 1 | 1 | 0 | 1 | 0 | 0 | 0 | 0 | 0 | |
| 34 | 2 | 2 | 2 | 2 | 3 | 0 | 0 | 0 | 0 | 0 | | 0 | 1 | 1 | 1 | 0 | 1 | 0 | 0 | 0 | 0 | |
| 35 | 3 | 2 | 2 | 2 | 2 | 3 | 0 | 0 | 0 | 0 | | 0 | 0 | 1 | 1 | 1 | 0 | 1 | 0 | 0 | 0 | |
| 36 | 1 | 3 | 2 | 2 | 2 | 2 | 3 | 0 | 0 | 0 | | 1 | 0 | 0 | 1 | 1 | 1 | 0 | 1 | 0 | 0 | |
| 37 | 1 | 1 | 3 | 2 | 2 | 2 | 2 | 3 | 0 | 0 | | 0 | 1 | 0 | 0 | 1 | 1 | 1 | 0 | 1 | 0 | |
| 38 | 1 | 1 | 1 | 3 | 2 | 2 | 2 | 2 | 3 | 0 | | 0 | 0 | 1 | 0 | 0 | 1 | 1 | 1 | 0 | 1 | |
| 39 | 1 | 1 | 1 | 1 | 3 | 2 | 2 | 2 | 2 | 3 | | 1 | 0 | 0 | 1 | 0 | 0 | 1 | 1 | 1 | 0 | |
| 40 | 0 | 1 | 1 | 1 | 1 | 3 | 2 | 2 | 2 | 2 | | 0 | 1 | 0 | 0 | 1 | 0 | 0 | 1 | 1 | 1 | |
| 41 | 2 | 0 | 1 | 1 | 1 | 1 | 3 | 2 | 2 | 2 | | 0 | 0 | 1 | 0 | 0 | 1 | 0 | 0 | 1 | 1 | |
| n-10 | 2 | 2 | 0 | 1 | 1 | 1 | 1 | 3 | 2 | 2 | | 0 | 0 | 0 | 1 | 0 | 0 | 1 | 0 | 0 | 1 | |

FIG. 10

| CPI k | $C^{(5)}_{k-5}$ (5th digit) … $C^{(5)}_{k-10}$ (10th digit) | $Y_5$ | $C^{(2)}_{k-2}$ (2nd digit) … $C^{(2)}_{k-8}$ (8th digit) $C^{(2)}_{k-10}$ (10th digit) | $Y_2$ |
|---|---|---|---|---|
| 0 | 1 0 4 4 2 4 0 0 0 0 | | 0 1 1 1 0 0 0 0 0 0 | |
| 1 | 0 1 0 4 4 2 4 0 0 0 | | 0 0 1 1 1 0 0 0 0 0 | |
| 2 | 4 0 1 0 4 4 2 4 0 0 | | 1 0 0 1 1 1 0 0 0 0 | |
| . | . | | . | |
| . | . | | . | |
| . | . | | . | |
| 16 | 0 3 1 2 2 4 3 3 0 0 | | 0 1 1 1 0 0 0 0 0 0 | |
| 17 | 0 0 3 1 2 2 4 3 3 0 | 4 | 0 0 1 1 1 0 0 0 0 0 | 1 |
| 18 | 4 0 0 3 1 2 2 4 3 3 | 4 | 0 0 0 1 1 1 0 0 0 0 | 0 |
| 19 | 4 4 0 0 3 1 2 2 4 3 | 4 | 1 0 0 0 1 1 1 0 0 0 | 0 |
| 20 | 3 4 4 0 0 3 1 2 2 4 | 0 | 1 1 0 0 0 1 1 1 0 0 | 1 |
| 21 | 2 3 4 4 0 0 3 1 2 2 | 0 | 0 1 1 0 0 0 1 1 1 0 | 1 |
| 22 | 4 2 3 4 4 0 0 3 1 2 | 2 | 0 0 1 1 0 0 0 1 1 1 | 1 |
| 23 | 4 4 2 3 4 4 0 0 3 1 | 1 | 0 0 0 1 1 0 0 0 1 1 | 1 |
| 24 | 1 4 4 2 3 4 4 0 0 3 | 2 | 1 0 0 0 1 1 0 0 0 1 | 0 |
| 25 | 1 1 4 4 2 3 4 4 0 0 | 0 | 0 1 0 0 0 1 1 0 0 0 | 0 |
| 26 | 0 1 1 4 4 2 3 4 4 0 | 4 | 0 0 1 0 0 0 1 1 0 0 | 0 |
| 27 | 3 0 1 1 4 4 2 3 4 4 | | 0 0 0 1 0 0 0 1 1 0 | |
| 28 | 0 3 0 1 1 4 4 2 3 4 | | 0 0 0 0 1 0 0 0 1 1 | |
| 29 | 4 0 3 0 1 1 4 4 2 3 | | 0 0 0 0 0 1 0 0 0 1 | |
| 30 | 0 4 0 3 0 1 1 4 4 2 | | 0 0 0 0 0 0 1 0 0 0 | |
| 31 | 4 0 4 0 3 0 1 1 4 4 | | 1 0 0 0 0 0 0 1 0 0 | |
| 32 | 3 4 0 4 0 3 0 1 1 4 | | 0 1 0 0 0 0 0 0 1 0 | |
| 33 | 2 3 4 0 4 0 3 0 1 1 | | 0 0 1 0 0 0 0 0 0 1 | |
| 34 | 3 2 3 4 0 4 0 3 0 1 | | 0 0 0 1 0 0 0 0 0 0 | |
| 35 | 0 3 2 3 4 0 4 0 3 0 | | 1 0 0 0 1 0 0 0 0 0 | |
| 36 | 4 0 3 2 3 4 0 4 0 3 | | 1 1 0 0 0 1 0 0 0 0 | |
| 37 | 4 4 0 3 2 3 4 0 4 0 | | 0 1 1 0 0 0 1 0 0 0 | |
| 38 | 0 4 4 0 3 2 3 4 0 4 | | 0 0 1 1 0 0 0 1 0 0 | |
| 39 | 3 0 4 4 0 3 2 3 4 0 | | 0 0 0 1 1 0 0 0 1 0 | |
| 40 | 1 3 0 4 4 0 3 2 3 4 | | 1 0 0 0 1 1 0 0 0 1 | |
| 41 | 0 1 3 0 4 4 0 3 2 3 | | 0 1 0 0 0 1 1 0 0 0 | |
| n-1 | 1 0 1 3 0 4 4 0 3 2 | | 0 0 1 0 0 0 1 1 0 0 | |

FIG. 11

| $A_i$ \ $C_i$ | 0 | 1 | 2 | 3 | 4 | 5 | 6 | 7 | 8 | 9 |
|---|---|---|---|---|---|---|---|---|---|---|
| 0 | 8 | 1 | 4 | 7 | 0 | 3 | 6 | 9 | 2 | 5 |
| 1 | 9 | 2 | 5 | 8 | 1 | 4 | 7 | 0 | 3 | 6 |
| 2 | 0 | 3 | 6 | 9 | 2 | 5 | 8 | 1 | 4 | 7 |
| 3 | 1 | 4 | 7 | 0 | 3 | 6 | 9 | 2 | 5 | 8 |
| 4 | 2 | 5 | 8 | 1 | 4 | 7 | 0 | 3 | 6 | 9 |
| 5 | 3 | 6 | 9 | 2 | 5 | 8 | 1 | 4 | 7 | 0 |
| 6 | 4 | 7 | 0 | 3 | 6 | 9 | 2 | 5 | 8 | 1 |
| 7 | 5 | 8 | 1 | 4 | 7 | 0 | 3 | 6 | 9 | 2 |
| 8 | 6 | 9 | 2 | 5 | 8 | 1 | 4 | 7 | 0 | 3 |
| 9 | 7 | 0 | 3 | 6 | 9 | 2 | 5 | 8 | 1 | 4 |

$$D_i = A_i + 3C_i + 8 \mod 10$$

FIG. 13

| CPI k | $b_{k-1}$ $S_1$ | | | | | ... | ... | | | | | $b_{k-12}$ $S_{12}$ | |
|---|---|---|---|---|---|---|---|---|---|---|---|---|---|
| 40 | 0 | 1 | 1 | 1 | 1 | 0 | 1 | 1 | 0 | 1 | 0 | 1 | FSR B Initialized |
| 41 | 1 | 0 | 1 | 1 | 1 | 1 | 0 | 1 | 1 | 0 | 1 | 0 | |
| n-10 | 1 | 1 | 0 | 1 | 1 | 1 | 1 | 0 | 1 | 1 | 0 | 1 | ↓ |
| n-9 | 1 | 1 | 1 | 0 | 1 | 1 | 1 | 1 | 0 | 1 | 1 | 0 | |
| n-8 | 1 | 1 | 1 | 1 | 0 | 1 | 1 | 1 | 1 | 0 | 1 | 1 | |
| n-7 | 1 | 1 | 1 | 1 | 1 | 0 | 1 | 1 | 1 | 1 | 0 | 1 | 10 CPI |
| n-6 | 1 | 1 | 1 | 1 | 1 | 1 | 0 | 1 | 1 | 1 | 1 | 0 | Window Period |
| n-5 | 1 | 1 | 1 | 1 | 1 | 1 | 1 | 0 | 1 | 1 | 1 | 1 | |
| n-4 | 1 | 1 | 1 | 1 | 1 | 1 | 1 | 1 | 0 | 1 | 1 | 1 | |
| n-3 | 1 | 1 | 1 | 1 | 1 | 1 | 1 | 1 | 1 | 0 | 1 | 1 | |
| n-2 | 1 | 1 | 1 | 1 | 1 | 1 | 1 | 1 | 1 | 1 | 0 | 1 | |
| n-1 | 1 | 1 | 1 | 1 | 1 | 1 | 1 | 1 | 1 | 1 | 1 | 0 | ↓ |
| n | 1 | 1 | 1 | 1 | 1 | 1 | 1 | 1 | 1 | 1 | 1 | 1 | Terminal State |

FIG. 14

| | | |
|---|---|---|
| a | 6 0 5 6 2 8 7 6 0 9 5 4 8 5 1 4 8 0 6 9 | IN |
| b | 7 1 4 7 3 8 6 7 1 8 4 5 9 4 0 5 9 1 7 8 | IN transformed |
| c | 3 0 2 3 1 4 3 3 0 4 2 2 4 2 0 2 4 0 3 4 | IN transformed mod 5 |
| d | 1 1 0 1 1 0 0 1 1 0 0 1 1 0 0 1 1 1 1 0 | IN transformed mod 2 |
| e | 7 8 5 4 2 6 1 3 2 | PAN |
| f | 6 9 4 5 3 7 0 2 3 | PAN transformed |
| g | 3 4 2 2 1 3 0 1 1 | $\hat{P}AN_5$ |
| h | 0 1 0 1 1 1 0 0 1 | $\hat{P}AN_2$ |
| i | T E S T P I N S | PIN (characters only) |
| j | 8 3 7 8 7 4 6 7 | PIN (numerical representation) |
| k | 9 2 6 9 6 5 7 6 | PIN transformed |
| l | 4 1 3 4 3 2 3 3 | $\hat{P}IN_5$ |
| m | 1 0 0 1 0 1 1 0 | $\hat{P}IN_2$ |

FIG. 15

| | | | | $A_{k-5}^{(5)}$ | | | | | $A_{k-10}^{(5)}$ | $\hat{P}AN_5$ |
|---|---|---|---|---|---|---|---|---|---|---|
| 0 | 0 | 0 | 0 | 0 | 0 | 0 | 0 | 0 | 0 | 3 |
| 1 | 0 | 0 | 0 | 0 | 0 | 0 | 0 | 0 | 0 | 4 |
| 0 | 1 | 0 | 0 | 0 | 0 | 0 | 0 | 0 | 0 | 2 |
| 4 | 0 | 1 | 0 | 0 | 0 | 0 | 0 | 0 | 0 | 2 |
| 4 | 4 | 0 | 1 | 0 | 0 | 0 | 0 | 0 | 0 | 1 |
| 3 | 4 | 4 | 0 | 1 | 0 | 0 | 0 | 0 | 0 | 3 |
| 3 | 3 | 4 | 4 | 0 | 1 | 0 | 0 | 0 | 0 | 0 |
| 2 | 3 | 3 | 4 | 4 | 0 | 1 | 0 | 0 | 0 | 1 |
| 1 | 2 | 3 | 3 | 4 | 4 | 0 | 1 | 0 | 0 | 1 |
| 1 | 1 | 2 | 3 | 3 | 4 | 4 | 0 | 1 | 0 | |

| | $A_{k-2}^{(5)}$ | | | | | | $A_{k-8}^{(2)}$ | | $A_{k-10}^{(2)}$ | $\hat{P}AN_2$ |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 0 | 0 | 0 | 1 |
| 0 | 1 | 0 | 0 | 0 | 0 | 0 | 0 | 0 | 0 | 0 |
| 0 | 0 | 1 | 0 | 0 | 0 | 0 | 0 | 0 | 0 | 1 |
| 0 | 0 | 0 | 1 | 0 | 0 | 0 | 0 | 0 | 0 | 1 |
| 0 | 0 | 0 | 0 | 1 | 0 | 0 | 0 | 0 | 0 | 1 |
| 0 | 0 | 0 | 0 | 0 | 1 | 0 | 0 | 0 | 0 | 0 |
| 1 | 0 | 0 | 0 | 0 | 0 | 1 | 0 | 0 | 0 | 0 |
| 1 | 1 | 0 | 0 | 0 | 0 | 0 | 1 | 0 | 0 | 1 |
| 0 | 1 | 1 | 0 | 0 | 0 | 0 | 0 | 1 | 0 | |

| | | | | $C_{k-5}^{(5)}$ | | | | | $C_{k-10}^{(5)}$ | $\hat{P}IN_5$ |
|---|---|---|---|---|---|---|---|---|---|---|
| 0 | 0 | 0 | 0 | 0 | 0 | 0 | 0 | 0 | 0 | 4 |
| 0 | 0 | 0 | 0 | 0 | 0 | 0 | 0 | 0 | 0 | 1 |
| 4 | 0 | 0 | 0 | 0 | 0 | 0 | 0 | 0 | 0 | 3 |
| 2 | 4 | 0 | 0 | 0 | 0 | 0 | 0 | 0 | 0 | 4 |
| 0 | 2 | 4 | 0 | 0 | 0 | 0 | 0 | 0 | 0 | 3 |
| 2 | 0 | 2 | 4 | 0 | 0 | 0 | 0 | 0 | 0 | 2 |
| 3 | 2 | 0 | 2 | 4 | 0 | 0 | 0 | 0 | 0 | 3 |
| 0 | 3 | 2 | 0 | 2 | 4 | 0 | 0 | 0 | 0 | 3 |
| 1 | 0 | 3 | 2 | 0 | 2 | 4 | 0 | 0 | 0 | |

| | $C_{k-2}^{(2)}$ | | | | | | $C_{k-8}^{(2)}$ | | $C_{k-10}^{(2)}$ | $\hat{P}IN_2$ |
|---|---|---|---|---|---|---|---|---|---|---|
| 0 | 0 | 0 | 0 | 0 | 0 | 0 | 0 | 0 | 0 | 1 |
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 1 | 1 | 0 | 0 | 0 | 0 | 0 | 0 | 0 | 0 | 1 |
| 1 | 1 | 1 | 0 | 0 | 0 | 0 | 0 | 0 | 0 | 0 |
| 0 | 1 | 1 | 1 | 0 | 0 | 0 | 0 | 0 | 0 | 1 |
| 1 | 0 | 1 | 1 | 1 | 0 | 0 | 0 | 0 | 0 | 1 |
| 0 | 1 | 0 | 1 | 1 | 1 | 0 | 0 | 0 | 0 | 0 |
| 0 | 0 | 1 | 0 | 1 | 1 | 1 | 0 | 0 | 0 | |

FIG. 16

| CPI k | $A^{(5)}_{k-5}$ ↓ … $A^{(5)}_{k-10}$ ↓ | $\delta_5$ | $A^{(2)}_{k-2}$ ↓ … $A^{(2)}_{k-8}$ ↓ $A^{(2)}_{k-10}$ ↓ | $\delta_2$ |
|---|---|---|---|---|
| 0 | 1 1 2 3 3 4 4 0 1 0 | | 0 1 1 0 0 0 0 0 1 0 | |
| 1 | 3 1 1 2 3 3 4 4 0 1 | | 0 0 1 1 0 0 0 0 0 1 | |
| ⋮ | ⋮ | | ⋮ | |
| 16 | 0 4 4 0 1 4 1 1 2 3 | | 0 1 1 0 0 0 0 0 1 0 | |
| 17 | 1 0 4 4 0 1 4 1 1 2 | 2 | 0 0 1 1 0 0 0 0 0 1 | 1 |
| 18 | 2 1 0 4 4 0 1 4 1 1 | 4 | 1 0 0 1 1 0 0 0 0 0 | 0 |
| 19 | 2 2 1 0 4 4 0 1 4 1 | 2 | 1 1 0 0 1 1 0 0 0 0 | 1 |
| 20 | 1 2 2 1 0 4 4 0 1 4 | 0 | 1 1 1 0 0 1 1 0 0 0 | 1 |
| 21 | 3 1 2 2 1 0 4 4 0 1 | 2 | 1 1 1 1 0 0 1 1 0 0 | 1 |
| 22 | 0 3 1 2 2 1 0 4 4 0 | 4 | 0 1 1 1 1 0 0 1 1 0 | 0 |
| 23 | 4 0 3 1 2 2 1 0 4 4 | 0 | 1 0 1 1 1 1 0 0 1 1 | 1 |
| 24 | 2 4 0 3 1 2 2 1 0 4 | 3 | 1 1 0 1 1 1 1 0 0 1 | 1 |
| 25 | 4 2 4 0 3 1 2 2 1 0 | 4 | 0 1 1 0 1 1 1 1 0 0 | 0 |
| 26 | 1 4 2 4 0 3 1 2 2 1 | 3 | 1 0 1 1 0 1 1 1 1 0 | 0 |
| 27 | 0 1 4 2 4 0 3 1 2 2 | | 0 1 0 1 1 0 1 1 1 1 | |
| 28 | 3 0 1 4 2 4 0 3 1 2 | | 0 0 1 0 1 1 0 1 1 1 | |
| 29 | 4 3 0 1 4 2 4 0 3 1 | | 1 0 0 1 0 1 1 0 1 1 | |
| ⋮ | ⋮ | | ⋮ | |
| 108 | 4 2 1 4 4 3 0 1 4 2 | | 0 0 1 0 1 1 0 1 1 1 | |
| 109 | 3 4 2 1 4 4 3 0 1 4 | | 1 0 0 1 0 1 1 0 1 1 | |
| 110 | 1 3 4 2 1 4 4 3 0 1 | | 0 1 0 0 1 0 1 1 0 1 | |
| 111 | 3 1 3 4 2 1 4 4 3 0 | | 0 0 1 0 0 1 0 1 1 0 | |
| 112 | 1 3 1 3 4 2 1 4 4 3 | | 0 0 0 1 0 0 1 0 1 1 | |
| n-10 | 2 1 3 1 3 4 2 1 4 4 | | 0 0 0 0 1 0 0 1 0 1 | |

FIG. 17

| CPI k | (arrows: $C^{(5)}_{k-5}$ at 5th position, $C^{(5)}_{k-10}$ at 10th position) | $Y_5$ | (arrows: $C^{(2)}_{k-2}$ at 2nd position, $C^{(2)}_{k-8}$ at 8th position, $C^{(2)}_{k-10}$ at 10th position) | $Y_2$ |
|---|---|---|---|---|
| 0 | 1 0 3 2 0 2 4 0 0 0 | | 0 0 1 0 1 1 1 0 0 0 | |
| 1 | 1 1 0 3 2 0 2 4 0 0 | | 1 0 0 1 0 1 1 1 0 0 | |
| . | . | | . | |
| . | . | | . | |
| . | . | | . | |
| 16 | 0 4 4 3 4 1 2 0 2 4 | | 0 0 1 0 1 1 1 0 0 0 | |
| 17 | 0 0 4 4 3 4 1 2 0 2 | 0 | 1 0 0 1 0 1 1 1 0 0 | 1 |
| 18 | 0 0 0 4 4 3 4 1 2 0 | 2 | 1 1 0 0 1 0 1 1 1 0 | 1 |
| 19 | 1 0 0 0 4 4 3 4 1 2 | 3 | 0 1 1 0 0 1 0 1 1 1 | 0 |
| 20 | 3 1 0 0 0 4 4 3 4 1 | 1 | 0 0 1 1 0 0 1 0 1 1 | 0 |
| 21 | 3 3 1 0 0 0 4 4 3 4 | 4 | 0 0 0 1 1 0 0 1 0 1 | 1 |
| 22 | 1 3 3 1 0 0 0 4 4 3 | 3 | 0 0 0 0 1 1 0 0 1 0 | 1 |
| 23 | 4 1 3 3 1 0 0 0 4 4 | 3 | 0 0 0 0 0 1 1 0 0 1 | 1 |
| 24 | 0 4 1 3 3 1 0 0 0 4 | 0 | 1 0 0 0 0 0 1 1 0 0 | 1 |
| 25 | 3 0 4 1 3 3 1 0 0 0 | 4 | 1 1 0 0 0 0 0 1 1 0 | 0 |
| 26 | 1 3 0 4 1 3 3 1 0 0 | 2 | 1 1 1 0 0 0 0 0 1 1 | 1 |
| 27 | 0 1 3 0 4 1 3 3 1 0 | | 0 1 1 1 0 0 0 0 0 1 | |
| 28 | 4 0 1 3 0 4 1 3 3 1 | | 1 0 1 1 1 0 0 0 0 0 | |
| 29 | 0 4 0 1 3 0 4 1 3 3 | | 1 1 0 1 1 1 0 0 0 0 | |
| . | . | | . | |
| . | . | | . | |
| . | . | | . | |
| 108 | 0 0 0 4 0 4 0 1 3 0 | | 1 0 1 1 1 0 0 0 0 0 | |
| 109 | 1 0 0 0 4 0 4 0 1 3 | | 1 1 0 1 1 1 0 0 0 0 | |
| 110 | 1 1 0 0 0 4 0 4 0 1 | | 0 1 1 0 1 1 1 0 0 0 | |
| 111 | 0 1 1 0 0 0 4 0 4 0 | | 0 0 1 1 0 1 1 1 0 0 | |
| 112 | 1 0 1 1 0 0 0 4 0 4 | | 0 0 0 1 1 0 1 1 1 0 | |
| n-10 | 2 1 0 1 1 0 0 0 4 0 | | 0 0 0 0 1 1 0 1 1 1 | |

FIG. 18

| CPI k | $b_{k-1}$ $S_1$ | | | | | • • • • • • | | | | | | $b_{k-12}$ $S_{12}$ | |
|---|---|---|---|---|---|---|---|---|---|---|---|---|---|
| 40 | 1 | 0 | 0 | 1 | 0 | 1 | 1 | 1 | 0 | 1 | 1 | 0 | FSR B Initialized |
| 41 | 0 | 1 | 0 | 0 | 1 | 0 | 1 | 1 | 1 | 0 | 1 | 1 | |
| 42 | 0 | 0 | 1 | 0 | 0 | 1 | 0 | 1 | 1 | 1 | 0 | 1 | |
| . | | | | | | . | | | | | | | |
| . | | | | | | . | | | | | | | |
| . | | | | | | . | | | | | | | |
| 110 | 1 | 1 | 1 | 1 | 0 | 1 | 1 | 0 | 1 | 0 | 1 | 0 | |
| 111 | 0 | 1 | 1 | 1 | 1 | 0 | 1 | 1 | 0 | 1 | 0 | 1 | |
| 112 | 1 | 0 | 1 | 1 | 1 | 1 | 0 | 1 | 1 | 0 | 1 | 0 | |
| n-10 | 1 | 1 | 0 | 1 | 1 | 1 | 1 | 0 | 1 | 1 | 0 | 1 | |
| n-9 | 1 | 1 | 1 | 0 | 1 | 1 | 1 | 1 | 0 | 1 | 1 | 0 | |
| n-8 | 1 | 1 | 1 | 1 | 0 | 1 | 1 | 1 | 1 | 0 | 1 | 1 | |
| n-7 | 1 | 1 | 1 | 1 | 1 | 0 | 1 | 1 | 1 | 1 | 0 | 1 | 10 CPI |
| n-6 | 1 | 1 | 1 | 1 | 1 | 1 | 0 | 1 | 1 | 1 | 1 | 0 | Window Period |
| n-5 | 1 | 1 | 1 | 1 | 1 | 1 | 1 | 0 | 1 | 1 | 1 | 1 | |
| n-4 | 1 | 1 | 1 | 1 | 1 | 1 | 1 | 1 | 0 | 1 | 1 | 1 | |
| n-3 | 1 | 1 | 1 | 1 | 1 | 1 | 1 | 1 | 1 | 0 | 1 | 1 | |
| n-2 | 1 | 1 | 1 | 1 | 1 | 1 | 1 | 1 | 1 | 1 | 0 | 1 | |
| n-1 | 1 | 1 | 1 | 1 | 1 | 1 | 1 | 1 | 1 | 1 | 1 | 0 | |
| n | 1 | 1 | 1 | 1 | 1 | 1 | 1 | 1 | 1 | 1 | 1 | 1 | Terminal State |

FIG. 19

| r | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ | $c_{20}$ |
|---|---|---|---|---|---|---|---|---|---|---|---|---|---|---|---|---|---|---|---|---|
| 1 | 1 | | | | | | | | | | | | | | | | | | | |
| 2 | 0 | 1 | | | | | | | | | | | | | | | | | | |
| 3 | 1 | 1 | 1 | | | | | | | | | | | | | | | | | |
| 4 | 0 | 0 | 0 | 1 | | | | | | | | | | | | | | | | |
| 5 | 1 | 0 | 0 | 1 | 1 | | | | | | | | | | | | | | | |
| 6 | 0 | 1 | 0 | 1 | 0 | 1 | | | | | | | | | | | | | | |
| 7 | 1 | 1 | 1 | 1 | 1 | 1 | 1 | | | | | | | | | | | | | |
| 8 | 0 | 0 | 0 | 0 | 0 | 0 | 0 | 1 | | | | | | | | | | | | |
| 9 | 1 | 0 | 0 | 0 | 0 | 0 | 0 | 1 | 1 | | | | | | | | | | | |
| 10 | 0 | 1 | 0 | 0 | 0 | 0 | 0 | 1 | 0 | 1 | | | | | | | | | | |
| 11 | 1 | 1 | 1 | 0 | 0 | 0 | 0 | 1 | 1 | 1 | 1 | | | | | | | | | |
| 12 | 0 | 0 | 0 | 1 | 0 | 0 | 0 | 1 | 0 | 0 | 0 | 1 | | | | | | | | |
| 13 | 1 | 0 | 0 | 1 | 1 | 0 | 0 | 1 | 1 | 0 | 0 | 1 | 1 | | | | | | | |
| 14 | 0 | 1 | 0 | 1 | 0 | 1 | 0 | 1 | 0 | 1 | 0 | 1 | 0 | 1 | | | | | | |
| 15 | 1 | 1 | 1 | 1 | 1 | 1 | 1 | 1 | 1 | 1 | 1 | 1 | 1 | 1 | 1 | | | | | |
| 16 | 0 | 0 | 0 | 0 | 0 | 0 | 0 | 0 | 0 | 0 | 0 | 0 | 0 | 0 | 0 | 1 | | | | |
| 17 | 1 | 0 | 0 | 0 | 0 | 0 | 0 | 0 | 0 | 0 | 0 | 0 | 0 | 0 | 0 | 1 | 1 | | | |
| 18 | 0 | 1 | 0 | 0 | 0 | 0 | 0 | 0 | 0 | 0 | 0 | 0 | 0 | 0 | 0 | 1 | 0 | 1 | | |
| 19 | 1 | 1 | 1 | 0 | 0 | 0 | 0 | 0 | 0 | 0 | 0 | 0 | 0 | 0 | 0 | 1 | 1 | 1 | 1 | |
| 20 | 0 | 0 | 0 | 1 | 0 | 0 | 0 | 0 | 0 | 0 | 0 | 0 | 0 | 0 | 0 | 1 | 0 | 0 | 0 | 1 |

FIG. 22

| r | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ | $c_{20}$ |
|---|---|---|---|---|---|---|---|---|---|---|---|---|---|---|---|---|---|---|---|---|
| 1 | 1 | | | | | | | | | | | | | | | | | | | |
| 2 | 2 | 2 | | | | | | | | | | | | | | | | | | |
| 3 | 0 | 0 | 1 | | | | | | | | | | | | | | | | | |
| 4 | 1 | 0 | 1 | 2 | | | | | | | | | | | | | | | | |
| 5 | 2 | 2 | 1 | 1 | 1 | | | | | | | | | | | | | | | |
| 6 | 0 | 0 | 2 | 0 | 0 | 2 | | | | | | | | | | | | | | |
| 7 | 1 | 0 | 2 | 1 | 0 | 2 | 1 | | | | | | | | | | | | | |
| 8 | 2 | 2 | 2 | 2 | 2 | 2 | 2 | 2 | | | | | | | | | | | | |
| 9 | 0 | 0 | 0 | 0 | 0 | 0 | 0 | 0 | 1 | | | | | | | | | | | |
| 10 | 1 | 0 | 0 | 0 | 0 | 0 | 0 | 0 | 1 | 2 | | | | | | | | | | |
| 11 | 2 | 2 | 0 | 0 | 0 | 0 | 0 | 0 | 1 | 1 | 1 | | | | | | | | | |
| 12 | 0 | 0 | 1 | 0 | 0 | 0 | 0 | 0 | 1 | 0 | 0 | 2 | | | | | | | | |
| 13 | 1 | 0 | 1 | 2 | 0 | 0 | 0 | 0 | 1 | 2 | 0 | 2 | 1 | | | | | | | |
| 14 | 2 | 2 | 1 | 1 | 1 | 0 | 0 | 0 | 1 | 1 | 1 | 2 | 2 | 2 | | | | | | |
| 15 | 0 | 0 | 2 | 0 | 0 | 2 | 0 | 0 | 1 | 0 | 0 | 1 | 0 | 0 | 1 | | | | | |
| 16 | 1 | 0 | 2 | 1 | 0 | 2 | 1 | 0 | 1 | 2 | 0 | 1 | 2 | 0 | 1 | 2 | | | | |
| 17 | 2 | 2 | 2 | 2 | 2 | 2 | 2 | 2 | 1 | 1 | 1 | 1 | 1 | 1 | 1 | 1 | 1 | | | |
| 18 | 0 | 0 | 0 | 0 | 0 | 0 | 0 | 0 | 2 | 0 | 0 | 0 | 0 | 0 | 0 | 0 | 0 | 2 | | |
| 19 | 1 | 0 | 0 | 0 | 0 | 0 | 0 | 0 | 2 | 1 | 0 | 0 | 0 | 0 | 0 | 0 | 0 | 2 | 1 | |
| 20 | 2 | 2 | 0 | 0 | 0 | 0 | 0 | 0 | 2 | 2 | 2 | 0 | 0 | 0 | 0 | 0 | 0 | 2 | 2 | 2 |

FIG. 23

| r | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ | $c_{20}$ |
|---|---|---|---|---|---|---|---|---|---|---|---|---|---|---|---|---|---|---|---|---|
| 1 | 1 | | | | | | | | | | | | | | | | | | | |
| 2 | 2 | 3 | | | | | | | | | | | | | | | | | | |
| 3 | 3 | 1 | 1 | | | | | | | | | | | | | | | | | |
| 4 | 0 | 2 | 0 | 3 | | | | | | | | | | | | | | | | |
| 5 | 1 | 2 | 2 | 3 | 1 | | | | | | | | | | | | | | | |
| 6 | 2 | 1 | 0 | 1 | 2 | 3 | | | | | | | | | | | | | | |
| 7 | 3 | 3 | 3 | 1 | 1 | 1 | 1 | | | | | | | | | | | | | |
| 8 | 0 | 0 | 0 | 2 | 0 | 0 | 0 | 3 | | | | | | | | | | | | |
| 9 | 1 | 0 | 0 | 2 | 2 | 0 | 0 | 3 | 1 | | | | | | | | | | | |
| 10 | 2 | 3 | 0 | 2 | 3 | 2 | 0 | 3 | 2 | 3 | | | | | | | | | | |
| 11 | 3 | 1 | 1 | 2 | 1 | 3 | 2 | 3 | 3 | 1 | 1 | | | | | | | | | |
| 12 | 0 | 2 | 0 | 1 | 3 | 2 | 3 | 1 | 0 | 2 | 0 | 3 | | | | | | | | |
| 13 | 1 | 2 | 2 | 1 | 2 | 3 | 1 | 2 | 3 | 2 | 2 | 3 | 1 | | | | | | | |
| 14 | 2 | 1 | 0 | 3 | 1 | 1 | 2 | 1 | 1 | 3 | 0 | 1 | 2 | 3 | | | | | | |
| 15 | 3 | 3 | 3 | 3 | 2 | 0 | 1 | 3 | 0 | 2 | 1 | 1 | 1 | 1 | 1 | | | | | |
| 16 | 0 | 0 | 0 | 0 | 3 | 2 | 1 | 2 | 1 | 2 | 3 | 0 | 0 | 0 | 0 | 3 | | | | |
| 17 | 1 | 0 | 0 | 0 | 3 | 3 | 3 | 1 | 3 | 1 | 1 | 1 | 0 | 0 | 0 | 3 | 1 | | | |
| 18 | 2 | 3 | 0 | 0 | 3 | 0 | 0 | 2 | 2 | 2 | 0 | 0 | 3 | 0 | 0 | 3 | 2 | 3 | | |
| 19 | 3 | 1 | 1 | 0 | 3 | 1 | 0 | 2 | 0 | 0 | 2 | 0 | 3 | 1 | 0 | 3 | 3 | 1 | 1 | |
| 20 | 0 | 2 | 0 | 3 | 3 | 2 | 3 | 2 | 2 | 0 | 2 | 2 | 3 | 2 | 3 | 3 | 0 | 2 | 0 | 3 |

FIG. 24

| r | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ | $c_{20}$ |
|---|---|---|---|---|---|---|---|---|---|---|---|---|---|---|---|---|---|---|---|---|
| 1 | 1 | | | | | | | | | | | | | | | | | | | |
| 2 | 2 | 4 | | | | | | | | | | | | | | | | | | |
| 3 | 3 | 2 | 1 | | | | | | | | | | | | | | | | | |
| 4 | 4 | 4 | 4 | 4 | | | | | | | | | | | | | | | | |
| 5 | 0 | 0 | 0 | 0 | 1 | | | | | | | | | | | | | | | |
| 6 | 1 | 0 | 0 | 0 | 1 | 4 | | | | | | | | | | | | | | |
| 7 | 2 | 4 | 0 | 0 | 1 | 3 | 1 | | | | | | | | | | | | | |
| 8 | 3 | 2 | 1 | 0 | 1 | 2 | 3 | 4 | | | | | | | | | | | | |
| 9 | 4 | 4 | 4 | 4 | 1 | 1 | 1 | 1 | 1 | | | | | | | | | | | |
| 10 | 0 | 0 | 0 | 0 | 2 | 0 | 0 | 0 | 0 | 4 | | | | | | | | | | |
| 11 | 1 | 0 | 0 | 0 | 2 | 3 | 0 | 0 | 0 | 4 | 1 | | | | | | | | | |
| 12 | 2 | 4 | 0 | 0 | 2 | 1 | 2 | 0 | 0 | 4 | 2 | 4 | | | | | | | | |
| 13 | 3 | 2 | 1 | 0 | 2 | 4 | 1 | 3 | 0 | 4 | 3 | 2 | 1 | | | | | | | |
| 14 | 4 | 4 | 4 | 4 | 2 | 2 | 2 | 2 | 2 | 4 | 4 | 4 | 4 | 4 | | | | | | |
| 15 | 0 | 0 | 0 | 0 | 3 | 0 | 0 | 0 | 0 | 2 | 0 | 0 | 0 | 0 | 1 | | | | | |
| 16 | 1 | 0 | 0 | 0 | 3 | 2 | 0 | 0 | 0 | 2 | 3 | 0 | 0 | 0 | 1 | 4 | | | | |
| 17 | 2 | 4 | 0 | 0 | 3 | 4 | 3 | 0 | 0 | 2 | 1 | 2 | 0 | 0 | 1 | 3 | 1 | | | |
| 18 | 3 | 2 | 1 | 0 | 3 | 1 | 4 | 2 | 0 | 2 | 4 | 1 | 3 | 0 | 1 | 2 | 3 | 4 | | |
| 19 | 4 | 4 | 4 | 4 | 3 | 3 | 3 | 3 | 3 | 2 | 2 | 2 | 2 | 2 | 1 | 1 | 1 | 1 | 1 | |
| 20 | 0 | 0 | 0 | 0 | 4 | 0 | 0 | 0 | 0 | 4 | 0 | 0 | 0 | 0 | 4 | 0 | 0 | 0 | 0 | 4 |

FIG. 25

| r | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ | $c_{20}$ |
|---|---|---|---|---|---|---|---|---|---|---|---|---|---|---|---|---|---|---|---|---|
| 1 | 1 | | | | | | | | | | | | | | | | | | | |
| 2 | 2 | 9 | | | | | | | | | | | | | | | | | | |
| 3 | 3 | 7 | 1 | | | | | | | | | | | | | | | | | |
| 4 | 4 | 4 | 4 | 9 | | | | | | | | | | | | | | | | |
| 5 | 5 | 0 | 0 | 5 | 1 | | | | | | | | | | | | | | | |
| 6 | 6 | 5 | 0 | 5 | 6 | 9 | | | | | | | | | | | | | | |
| 7 | 7 | 9 | 5 | 5 | 1 | 3 | 1 | | | | | | | | | | | | | |
| 8 | 8 | 2 | 6 | 0 | 6 | 2 | 8 | 9 | | | | | | | | | | | | |
| 9 | 9 | 4 | 4 | 4 | 6 | 6 | 6 | 1 | 1 | | | | | | | | | | | |
| 10 | 0 | 5 | 0 | 0 | 2 | 0 | 0 | 5 | 0 | 9 | | | | | | | | | | |
| 11 | 1 | 5 | 5 | 0 | 2 | 8 | 0 | 5 | 5 | 9 | 1 | | | | | | | | | |
| 12 | 2 | 4 | 0 | 5 | 2 | 6 | 2 | 5 | 0 | 4 | 2 | 9 | | | | | | | | |
| 13 | 3 | 2 | 6 | 5 | 7 | 4 | 6 | 3 | 5 | 4 | 8 | 7 | 1 | | | | | | | |
| 14 | 4 | 9 | 4 | 9 | 2 | 7 | 2 | 7 | 2 | 9 | 4 | 9 | 4 | 9 | | | | | | |
| 15 | 5 | 5 | 5 | 5 | 3 | 5 | 5 | 5 | 5 | 7 | 5 | 5 | 5 | 5 | 1 | | | | | |
| 16 | 6 | 0 | 0 | 0 | 8 | 2 | 0 | 0 | 0 | 2 | 8 | 0 | 0 | 0 | 6 | 9 | | | | |
| 17 | 7 | 4 | 0 | 0 | 8 | 4 | 8 | 0 | 0 | 2 | 6 | 2 | 0 | 0 | 6 | 3 | 1 | | | |
| 18 | 8 | 7 | 6 | 0 | 8 | 6 | 4 | 2 | 0 | 2 | 4 | 6 | 8 | 0 | 6 | 7 | 8 | 9 | | |
| 19 | 9 | 9 | 9 | 4 | 8 | 8 | 8 | 8 | 8 | 2 | 2 | 2 | 2 | 2 | 6 | 1 | 1 | 1 | 1 | |
| 20 | 0 | 0 | 0 | 5 | 4 | 0 | 0 | 0 | 0 | 4 | 0 | 0 | 0 | 0 | 4 | 5 | 0 | 0 | 0 | 9 |

FIG. 26

| CPI k | $a_{k-1}$ | $a_{k-2}$ | $a_{k-3}$ | $a_k$ | $a_{k-1}$ | $a_{k-2}$ | $a_{k-3}$ | $a_k$ | $a_{k-1}$ | $a_{k-2}$ | $a_{k-3}$ | $a_k$ | $a_{k-1}$ | $a_{k-2}$ | $a_{k-3}$ | $a_k$ |
|---|---|---|---|---|---|---|---|---|---|---|---|---|---|---|---|---|
| 0 | 0 | 0 | 0 | 1 | 1 | 1 | 1 | 2 | 2 | 2 | 2 | 3 | 3 | 3 | 3 | 0 |
| 1 | 1 | 0 | 0 | 0 | 2 | 1 | 1 | 1 | 3 | 2 | 2 | 2 | 0 | 3 | 3 | 3 |
| 2 | 0 | 1 | 0 | 2 | 1 | 2 | 1 | 3 | 2 | 3 | 2 | 0 | 3 | 0 | 3 | 1 |
| 3 | 2 | 0 | 1 | 0 | 3 | 1 | 2 | 1 | 0 | 2 | 3 | 2 | 1 | 3 | 0 | 3 |
| 4 | 0 | 2 | 0 | 3 | 1 | 3 | 1 | 0 | 2 | 0 | 2 | 1 | 3 | 1 | 3 | 2 |
| 5 | 3 | 0 | 2 | 0 | 0 | 1 | 3 | 1 | 1 | 2 | 0 | 2 | 2 | 3 | 1 | 3 |
| 6 | 0 | 3 | 0 | 0 | 1 | 0 | 1 | 1 | 2 | 1 | 2 | 2 | 3 | 2 | 3 | 3 |
| 7 | 0 | 0 | 3 | 0 | 1 | 1 | 0 | 1 | 2 | 2 | 1 | 2 | 3 | 3 | 2 | 3 |
| | | | | | | | | | | | | | | | | |
| 0 | 0 | 1 | 1 | 3 | 1 | 2 | 2 | 0 | 2 | 3 | 3 | 1 | 3 | 0 | 0 | 2 |
| 1 | 3 | 0 | 1 | 3 | 0 | 1 | 2 | 0 | 1 | 2 | 3 | 1 | 2 | 3 | 0 | 2 |
| 2 | 3 | 3 | 0 | 1 | 0 | 0 | 1 | 2 | 1 | 1 | 2 | 3 | 2 | 2 | 3 | 0 |
| 3 | 1 | 3 | 3 | 2 | 2 | 0 | 0 | 3 | 3 | 1 | 1 | 0 | 0 | 2 | 2 | 1 |
| 4 | 2 | 1 | 3 | 3 | 3 | 2 | 0 | 0 | 0 | 3 | 1 | 1 | 1 | 0 | 2 | 2 |
| 5 | 3 | 2 | 1 | 1 | 0 | 3 | 2 | 2 | 1 | 0 | 3 | 3 | 2 | 1 | 0 | 0 |
| 6 | 1 | 3 | 2 | 1 | 2 | 0 | 3 | 2 | 3 | 1 | 0 | 3 | 0 | 2 | 1 | 0 |
| 7 | 1 | 1 | 3 | 0 | 2 | 2 | 0 | 1 | 3 | 3 | 1 | 2 | 0 | 0 | 2 | 3 |

FIG. 27

| r | ℓ | $N_T$ |
|---|---|---|
| 1 | 2 | $1 = 2^0$ |
| 2 | 4 | $1 = 2^0$ |
| 3 | 4 | $2 = 2^1$ |
| 4 | 8 | $2 = 2^1$ |
| 5 | 8 | $4 = 2^2$ |
| 6 | 8 | $8 = 2^3$ |
| 7 | 8 | $16 = 2^4$ |
| 8 | 16 | $16 = 2^4$ |
| 9 | 16 | $32 = 2^5$ |
| 10 | 16 | $64 = 2^6$ |
| 11 | 16 | $128 = 2^7$ |
| 12 | 16 | $256 = 2^8$ |
| 13 | 16 | $512 = 2^9$ |
| 14 | 16 | $1\ 024 = 2^{10}$ |
| 15 | 16 | $2\ 048 = 2^{11}$ |
| 16 | 32 | $2\ 048 = 2^{11}$ |
| 17 | 32 | $4\ 096 = 2^{12}$ |
| 18 | 32 | $8\ 192 = 2^{13}$ |
| 19 | 32 | $16\ 384 = 2^{14}$ |
| 20 | 32 | $32\ 768 = 2^{15}$ |

FIG. 28

| r | ℓ | $N_T$ |
|---|---|---|
| 1 | 3 | 1 = $3^0$ |
| 2 | 3 | 3 = $3^1$ |
| 3 | 9 | 3 = $3^1$ |
| 4 | 9 | 9 = $3^2$ |
| 5 | 9 | 27 = $3^3$ |
| 6 | 9 | 81 = $3^4$ |
| 7 | 9 | 243 = $3^5$ |
| 8 | 9 | 729 = $3^6$ |
| 9 | 27 | 729 = $3^6$ |
| 10 | 27 | 2 187 = $3^7$ |
| 11 | 27 | 6 561 = $3^8$ |
| 12 | 27 | 19 683 = $3^9$ |
| 13 | 27 | 59 049 = $3^{10}$ |
| 14 | 27 | 177 147 = $3^{11}$ |
| 15 | 27 | 531 441 = $3^{12}$ |
| 16 | 27 | 1 594 323 = $3^{13}$ |
| 17 | 27 | 4 782 969 = $3^{14}$ |
| 18 | 27 | 14 348 907 = $3^{15}$ |
| 19 | 27 | 43 046 721 = $3^{16}$ |
| 20 | 27 | 129 140 163 = $3^{17}$ |

FIG. 29

| r | ℓ | $N_T$ |
|---|---|---|
| 1 | 4 | 1 = $2^0$ |
| 2 | 8 | 2 = $2^1$ |
| 3 | 8 | 8 = $2^3$ |
| 4 | 16 | 16 = $2^4$ |
| 5 | 16 | 64 = $2^6$ |
| 6 | 16 | 256 = $2^8$ |
| 7 | 16 | 1 024 = $2^{10}$ |
| 8 | 32 | 2 048 = $2^{11}$ |
| 9 | 32 | 8 192 = $2^{13}$ |
| 10 | 32 | 32 768 = $2^{15}$ |
| 11 | 32 | 131 072 = $2^{17}$ |
| 12 | 32 | 524 288 = $2^{19}$ |
| 13 | 32 | 2 097 152 = $2^{21}$ |
| 14 | 32 | 8 388 608 = $2^{23}$ |
| 15 | 32 | 33 554 432 = $2^{25}$ |
| 16 | 64 | 67 108 864 = $2^{26}$ |
| 17 | 64 | 268 435 456 = $2^{28}$ |
| 18 | 64 | 1 073 741 824 = $2^{30}$ |
| 19 | 64 | 4 294 967 296 = $2^{32}$ |
| 20 | 64 | 17 179 869 184 = $2^{34}$ |

FIG. 30

| r | ℓ | $N_T$ | | |
|---|---|---|---|---|
| 1 | 5 | 1 | = | $5^0$ |
| 2 | 5 | 5 | = | $5^1$ |
| 3 | 5 | 25 | = | $5^2$ |
| 4 | 5 | 125 | = | $5^3$ |
| 5 | 25 | 125 | = | $5^3$ |
| 6 | 25 | 625 | = | $5^4$ |
| 7 | 25 | 3 125 | = | $5^5$ |
| 8 | 25 | 15 625 | = | $5^6$ |
| 9 | 25 | 78 125 | = | $5^7$ |
| 10 | 25 | 390 625 | = | $5^8$ |
| 11 | 25 | 1 953 125 | = | $5^9$ |
| 12 | 25 | 9 765 625 | = | $5^{10}$ |
| 13 | 25 | 48 828 125 | = | $5^{11}$ |
| 14 | 25 | 244 140 625 | = | $5^{12}$ |
| 15 | 25 | 1 220 703 125 | = | $5^{13}$ |
| 16 | 25 | 6 103 515 625 | = | $5^{14}$ |
| 17 | 25 | . | | $5^{15}$ |
| 18 | 25 | . | | $5^{16}$ |
| 19 | 25 | . | | $5^{17}$ |
| 20 | 25 | . | | $5^{18}$ |

FIG. 31

| r | $\ell_1$ | $\ell_2$ | $\ell$ | $N_T$ for m = 10 |
|---|---|---|---|---|
| 1 | 2 | 5 | 10 | 1 = $2^0 5^0$ |
| 2 | 4 | 5 | 20 | 5 = $2^0 5^1$ |
| 3 | 4 | 5 | 20 | 50 = $2^1 5^2$ |
| 4 | 8 | 5 | 40 | 250 = $2^1 5^3$ |
| 5 | 8 | 25 | 200 | 500 = $2^2 5^3$ |
| 6 | 8 | 25 | 200 | 5 000 = $2^3 5^4$ |
| 7 | 8 | 25 | 200 | 50 000 = $2^4 5^5$ |
| 8 | 16 | 25 | 400 | 250 000 = $2^4 5^6$ |
| 9 | 16 | 25 | 400 | $2^5 5^7$ |
| 10 | 16 | 25 | 400 | 25 MILLION = $2^6 5^8$ |
| 11 | 16 | 25 | 400 | $2^7 5^9$ |
| 12 | 16 | 25 | 400 | $2^8 5^{10}$ |
| 13 | 16 | 25 | 400 | $2^9 5^{11}$ |
| 14 | 16 | 25 | 400 | $2^{10} 5^{12}$ |
| 15 | 16 | 25 | 400 | $2^{11} 5^{13}$ |
| 16 | 32 | 25 | 800 | $2^{11} 5^{14}$ |
| 17 | 32 | 25 | 800 | $2^{12} 5^{15}$ |
| 18 | 32 | 25 | 800 | $2^{13} 5^{16}$ |
| 19 | 32 | 25 | 800 | $2^{14} 5^{17}$ |
| 20 | 32 | 25 | 800 | $2^{15} 5^{18}$ |

FIG. 32

| BCD-TO-DECIMAL DECODER | | | | | DECIMAL-TO-BCD ENCODER | | | | |
|---|---|---|---|---|---|---|---|---|---|
| INPUT | | | | OUTPUT | INPUT | OUTPUT | | | |
| $Y_8$ | $Y_4$ | $Y_2$ | $Y_1$ | i of $Z_i$ | j of $z_j$ | $y_8$ | $y_4$ | $y_2$ | $y_1$ |
| 0 | 0 | 0 | 0 | 0 | 4 | 0 | 1 | 0 | 0 |
| 0 | 0 | 0 | 1 | 1 | 3 | 0 | 0 | 1 | 1 |
| 0 | 0 | 1 | 0 | 2 | 1 | 0 | 0 | 0 | 1 |
| 0 | 0 | 1 | 1 | 3 | 5 | 0 | 1 | 0 | 1 |
| 0 | 1 | 0 | 0 | 4 | 8 | 1 | 0 | 0 | 0 |
| 0 | 1 | 0 | 1 | 5 | 0 | 0 | 0 | 0 | 0 |
| 0 | 1 | 1 | 0 | 6 | 9 | 1 | 0 | 0 | 1 |
| 0 | 1 | 1 | 1 | 7 | 2 | 0 | 0 | 1 | 0 |
| 1 | 0 | 0 | 0 | 8 | 7 | 0 | 1 | 1 | 1 |
| 1 | 0 | 0 | 1 | 9 | 6 | 0 | 1 | 1 | 0 |

| BINARY-TO-BASE 5 DECODER | | | | BASE 5-TO-BINARY ENCODER | | | |
|---|---|---|---|---|---|---|---|
| INPUT | | | OUTPUT | INPUT | OUTPUT | | |
| $Y_8$ | $Y_4$ | $Y_2$ | i of $X_i$ | j of $x_j$ | $y_8$ | $y_4$ | $y_1$ |
| 0 | 0 | 0 | 0 | 2 | 0 | 1 | 0 |
| 0 | 0 | 1 | 1 | 4 | 1 | 0 | 0 |
| 0 | 1 | 0 | 2 | 0 | 0 | 0 | 0 |
| 0 | 1 | 1 | 3 | 1 | 0 | 0 | 1 |
| 1 | 0 | 0 | 4 | 3 | 0 | 1 | 1 |

| BINARY-TO-BASE 2 DECODER | | BASE 2-TO-BINARY ENCODER | |
|---|---|---|---|
| INPUT | OUTPUT | INPUT | OUTPUT |
| $Y_1$ | i of $W_i$ | j of $w_j$ | $y_1$ |
| 0 | 0 | 1 | 1 |
| 1 | 1 | 0 | 0 |

| Z | $Y_8$ | $Y_4$ | $Y_2$ | $Y_1$ | X | W | $x$ | $w$ | $y_8$ | $y_4$ | $y_2$ | $y_1$ | d |
|---|---|---|---|---|---|---|---|---|---|---|---|---|---|
| 0 | 0 | 0 | 0 | 0 | 0 | 0 | 2 | 1 | 0 | 1 | 0 | 1 | 5 |
| 1 | 0 | 0 | 0 | 1 | 0 | 1 | 2 | 0 | 0 | 1 | 0 | 0 | 4 |
| 2 | 0 | 0 | 1 | 0 | 1 | 0 | 4 | 1 | 1 | 0 | 0 | 1 | 9 |
| 3 | 0 | 0 | 1 | 1 | 1 | 1 | 4 | 0 | 1 | 0 | 0 | 0 | 8 |
| 4 | 0 | 1 | 0 | 0 | 2 | 0 | 0 | 1 | 0 | 0 | 0 | 1 | 1 |
| 5 | 0 | 1 | 0 | 1 | 2 | 1 | 0 | 0 | 0 | 0 | 0 | 0 | 0 |
| 6 | 0 | 1 | 1 | 0 | 3 | 0 | 1 | 1 | 0 | 0 | 1 | 1 | 3 |
| 7 | 0 | 1 | 1 | 1 | 3 | 1 | 1 | 0 | 0 | 0 | 1 | 0 | 2 |
| 8 | 1 | 0 | 0 | 0 | 4 | 0 | 3 | 1 | 0 | 1 | 1 | 1 | 7 |
| 9 | 1 | 0 | 0 | 1 | 4 | 1 | 3 | 0 | 0 | 1 | 1 | 0 | 6 |

FIG. 38

| n | $R_n$ |
|---|---|
| 1 | 1 |
| 2 | 1 |
| 3 | 1 |
| 4 | 4 |
| 5 | 56 |
| 6 | 9 408 |
| 7 | 16 942 080 |
| 8 | 535 281 401 856 |
| 9 | 377 597 570 964 258 816 |

FIG. 40

PERSONAL IDENTIFICATION SYSTEM

BACKGROUND OF THE INVENTION

1. Field of the Invention

The present invention is directed to a personal identification system.

2. Description of the Prior Art

The widespread acceptance of the use of credit and bank cards has led to the need of improved methods for identifying the bearer of a card, as its rightful owner. A variety of systems have been devised for providing personal identification, to prohibit the use of such cards by unauthorized users. Typically, a credit (or bank) card, issued by a particular institution, bears, in embossed form, the name of the person to whom the card was issued, his or her assigned account number, and the card's expiration date. The card also bears a magnetic stripe on which binary coded representations of the name (to whom the card was issued), the assigned account number, and the expiration date are magnetically recorded. The magnetically recorded information is permanently stored and conveniently accessible by means of a magnetic stripe reader. A space is often provided for the signature of the person to whom the card was issued. Such cards when lost, stolen, or counterfeited have been fraudently used by unauthorized users, resulting in significant losses.

More recently, systems have been devised which include in the identity verification process the effect of an assigned Personal Identification Number. The person to whom the card is issued is assigned a Personal Identification Number. A multi-digit number is derived from a combination of the assigned Personal Identification Number and the assigned account number by means of a generator. A binary-coded representation of the multidigit number, hereafter referred to as an Offset Number, is also recorded on the magnetic stripe.

Prior to a card transaction, the card is inserted into a verifier which "magnetically reads" the assigned account number and the Offset Number. The card user also enters his or her Personal Identification Number by such means, as a keyboard. Just as the assigned Personal Identification Number in combination with the assigned account number was utilized by the generator to derive the Offset Number, the verifier employs the entered Personal Identification Number in combination with the magnetically read assigned account number to derive an Offset Number. Only if the Offset Number, derived by the verifier, and the Offset Number recorded on the card's magnetic stripe are identical is the user of a card recognized as the rightful owner of the card. The assigned Personal Identification Number provides a measure of security that is limited, since Personal Identification Numbers are assigned and thus are necessarily known by others in the employ of the card issuing institution.

The security of the foregoing system may be further enhanced by allowing the person to whom the card is issued to secretly select his or her Personal Identification Number, hereafter referred to as PIN. Any alphanumeric sequence, composed of digits selected from the set of ten decimal digits and any given subset (including the entire set) of alphabetic characters may serve as a PIN. A PIN that is secretly selected should be known only to the rightful owner of the card. An assigned account number may be any numeric sequence composed of digits selected from the set of ten decimal digits. The assigned account number is, hereafter, referred to as the Primary Account Number or simply PAN. Clearly since the PAN is assigned it is known to those assigning the PAN.

A system described in U.S. Pat. No. 3,938,091 derives an 8-digit octal (i.e., base 8) number from a single input sequence. For comparison purposes, the single input sequence may be comprised of a secretly selected PIN followed by PAN (or a segment of leading digits of PAN). The 8-digit octal number may represent an Offset Number. The system transforms a PIN-PAN sequence into an Offset Number as follows. The alphanumeric characters of PIN are entered via a keyboard by the card user and the appended digits of PAN (or a segment of PAN) are entered via the same keyboard by a representative of the institution, honoring the transaction. Each character of the PIN-PAN sequence results in a succession of state changes in a 24-stage binary feedback shift register which initially is in the all/O's state. The terminal state (i.e., the representation of a 24-bit binary number stored in the feedback shif register after the entry of the PIN-PAN sequence) is dependent upon the PIN-PAN input sequence. The set of all PAN's, associated with a particular card-issuing institution, are necessarily distinct. Clearly, all possible PIN-PAN input sequences will be distinct if the PAN portions are complete. The relationship between the terminal state and the PIN-PAN input sequence is fixed by the manufacturer by means of circuit module selection. The depression of a particular key of the input keyboard results in clocking the 24-stage binary feedback shift register by a fixed number of clock pulses causing it to advance that number of states. The terminal state is governed by the cumulative number of clock pulses resulting from a succession of key depressions corresponding to the input sequence. The Offset Number is determined from the 24-bits, represented by the terminal state.

Each bit corresponds to the output (i.e., state) of a particular register stage. A permutation of the 24 outputs are partitioned into 8 3-bit segments. Each 3-bit segment is converted to and displayed as an octal digit taken from the set $\{0,1,2,\ldots,7\}$. The number of clock pulses associated with each key and the particular partitioning of the 24-bit terminal state into 3-bit segments is realized by circuit modules selected by the manufacturer. The feedback network of the 24-stage register is "hard-wired" and thus is fixed. The bit being fed back is a linear switching function (realized with Exclusive-OR gates) of the contents of a prescribed set of stages. It is claimed that the states of the register are pseudo-randomized. To those schooled in the art, the "hard-wired" feedback logic circuitry is among those linear switching functions which cause the 24-stage register to assume $2^{24}-1$ distinct states (under continuous clocking) before repeating. The security of the foregoing system which transforms a PIN-PAN sequence into an Offset Number comprised of 8 octal digits is vulnerable for the following reasons.

1. In the system described in U.S. Pat. No. 3,938,091 a single alphanumeric sequence is transformed. PIN and PAN are sequentially entered in a fixed order via a single input device, thereby limiting their transformation.

If the PIN and PAN were entered by means of different input devices, removing the restriction of order, individual and separate transformations on them would be possible significantly increasing overall transformation selection (by the manufacturer), and allowing the introduction of a many-to-one into mapping of the transformed PIN and the transformed PAN to an Offset Number. A many-to-one into mapping guarantees irreversibility, regardless of which of the other transformations are selected. Many-to-one into mappings as well as transformations which may be one-to-one or many-to-one are realizeable with off-the-self integrated circuits.

2. In the system described in U.S. Pat. No. 3,938,091, the institution utilizing the system cannot independently participate in the selection of the overall transformation of a PIN-PAN sequence to an Offset Number. The manufacturer excercises complete control over the selection of the overall transformation.

3. The system as described in U.S. Pat. No. 3,938,091 transforms distinct PIN-PAN input sequences comprised of the same alphanumeric characters into the same Offset Number. For example, PIN-PAN input sequences A4B37, BA374, 7BA43, etc. each advance the 24-stage register from the all 0's initial state to the same terminal state. Hence, such PIN-PAN sequences are transformed into the same Offset Number. With a fixed correspondence between each input key and the number of resulting clock pulses, the cumulative sum of clock pulses, associated with an alphanumeric sequence is independent of the order in which the alphanumeric characters, comprising the alphanumeric sequence are entered.

From the foregoing it should be appreciated that the system described in U.S. Pat. No. 3,938,091 is quite vulnerable and therefore does not provide sufficient security against unauthorized use of a card.

SUMMARY OF THE INVENTION

The present invention is directed to a personal identification system which includes significant security enhancing features, as summarized herebelow in connection with sequences or numbers of examplary lengths.

1. PAN is entered via a dedicated input device. PIN is entered via a different and also dedicated input device. PAN and PIN are individually processed. Each undergoes a distinct succession of transformations and a mapping with distinct portions of a transformed 20-digit decimal sequence subsequently described. The two arguments derived from transformed PAN, transformed PIN, and the transformed 20-digit decimal sequence are then mapped into an Offset Number, comprised of 10 decimal digits.

2. Each generator and each verifier to be used by a particular institution must be enabled with the 20-digit decimal sequence previously mentioned. The 20-digit decimal sequence is called herein the Institution Number, and is hereafter referred to as IN. The one-time entry of IN particularizes a given generator or verifier to an institution. As IN is entered, preferably by several officers of the institution, where each privately enters a distinct subsequence of his or her choosing, it undergoes a one-to-one transformation. Furthermore, the transformed IN is permanently stored and protected with interlocked standby power.

The security of the system is thus partitioned. The manufacturer secretly selects the set of integrated circuits which realize the set of transformations and mappings, while the officers of the institution individually and secretly select segments of the 20-digit decimal sequence IN, and each card user secretly selects his or her PIN.

3. The overall mapping of PAN and PIN into a 10-digit Offset Number is a many-to-one into mapping which guarantees irreversibility whereby PIN's cannot be determined from known PAN- Offset Number combinations. The degree of into mapping is PIN dependent. Hypothetically, if every card user selected identical PIN's, the range of distinct Offset Numbers into which the PAN-PIN combinations can be mapped is less than 8 billion out of a possible 10 billion. Again hypothetically, if every card user selected a different PIN, the range of distinct Offset Numbers into which PAN-PIN combinations can be mapped exceed 6 billion out of a total of 10 billion. This "focusing and defocusing" effect is independent of transformations and mappings selected and incorporated by the manufacturer (by means of off-the-shelf integrated circuits) and the IN selected by officers of the institution.

The personal identification system described herein is not limited in application to determining whether or not the bearer of a credit or bank card is its rightful owner. It has application wherever personal identification is required. Other examples include controlled access through personal identification into classified areas, computer systems, and electronic funds transfer systems. Check cashing and proof of ownership of automobiles, drivers licenses', stock certificates, securities, and passports also require positive and absolute personal identification.

The novel features that are considered characteristic of this invention are set forth with particularity in the appended claims. The invention will best be understood from the following description when read in connection with the accompanying drawing.

BRIEF DESCRIPTION OF THE DRAWINGS

FIGS. 4–11 are in the form of tables of states of various registers, used to explain the invention with specific examples;

FIG. 13 is a table of a particular mapping criteria used to generate the Offset Number;

FIGS. 14–19 are in the form of tables useful in explaining the invention in connection with specific examples.

FIGS. 22–26 are tables of mulipliers $c_i$ in the rth degree linear recurrence relation, characterizing equal length feedback shift register cycles modulo 2,3,4,5 and 10, respectively;

FIG. 27 is a table of 8 equal length cycles of a feedback shift register of 3 stages modulo 4;

FIGS. 28–32 are tables of cycle length and Total number of Cycles $N_T$ versus r for m equal to 2,3,4,5 and 10, respectively;

FIGS. 34–38 are tables useful in explaining various transformations used in describing embodiments of the invention;

FIG. 40 is a table of a reduced Latin square of n from 1 to 9; and

DETAILED DESCRIPTION OF THE EMBODIMENTS

Figure 1:
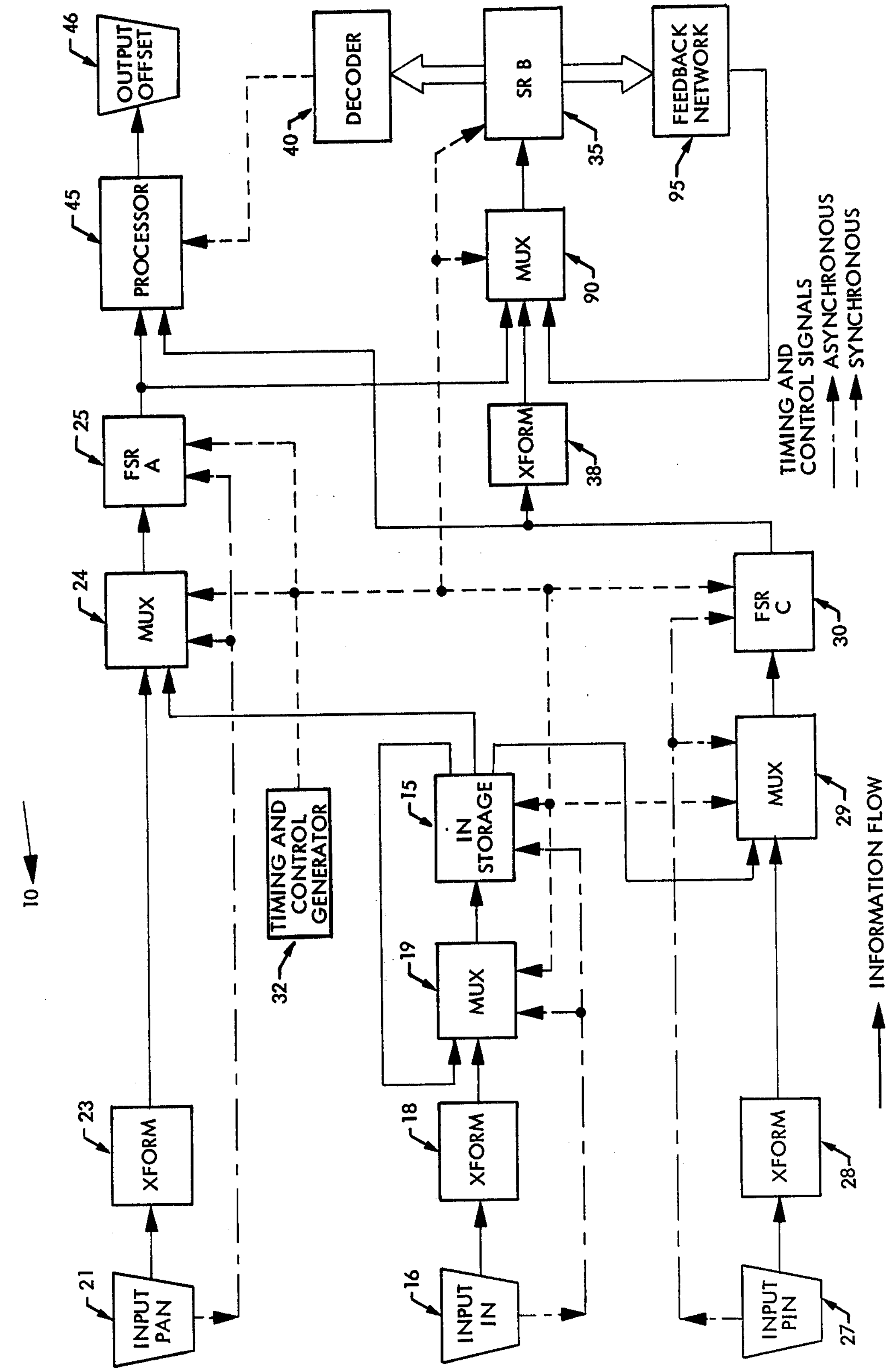
FIG. 1 is a general block diagram of a generator, useful in explaining various embodiments of the invention.

The following summarized description of an example of an embodiment is presented in the order to facilitate the subsequent description of the invention in conjunction with the Figures. In accordance with the present invention, an institution's personal identification system is provided which includes one or more offset generators and a plurality of verifier units. A 20-digit decimal institution number (IN) is entered into the generator and stored in an IN storage unit. The IN may be entered by one authorized officer of the institution. To enhance security, several officers may enter different portions of the 20 digit IN, which are known only to them, thereby reducing the probability that unauthorized parties may obtain the entire 20-digit IN. The IN is stored in such a manner that any attempt to learn its numerical value, such as, by opening the machine, would be foiled. Typically, stand-by power is provided to the IN storage unit, to protect its content in the event of power failure. Its content is automatically destroyed when an attempt is made to open it to learn of its content.

The generator is also provided with 2 input keyboards. When a card is to be issued, the Primary Account Number, herein referred to as PAN, is entered into the generator through one of the units. After undergoing a numerical transformation the transformed PAN is stored in a shift register. The person to whom the card is to be issued enters his self-chosen and secret personal identification number herein referred to as PIN, via the other input unit. The PIN after undergoing a numerical transformation is stored in another shift register.

The entering of PIN and PAN is asynchronous. After both have been entered, under the command of timing and control unit in the generator, the transformed PIN and PAN in their respective shift register undergo an reinitialization operation which is a function of different portions of the stored IN. Thereafter, different portions of the PAN and PIN are used to load up a control register. Subsequently the contents of the PIN and PAN shift registers are clocked out and based on the contents of the control register, 10 successive output digits of the PIN and PAN registers are processed to form a 10 digit decimal Offset Number. This number is automatically recorded on the card's magnetic stripe for subsequent machine reading.

When the card is to be used it is fed to a verifier which is similar to the generator in many respects. It too has the 20-digit IN prestored therein. In the verifier, both the Offset Number and the PAN are automatically read off the card's magnetic stripe and are respectively stored in an Offset Number storage unit, and in the PAN shift register. The PIN is entered via an input keyboard by the card user. Once the PIN is entered, the verifier, like the generator, generates an Offset Number as a function of the PIN, PAN, and IN and the particular transformation and criteria employed in the generator which generated the Offset Number which is recorded on the card. The verifier-generated Offset Number is compared with that on the card which is temporarily stored in the verifier. If the two are identical, it indicates that the user is the authorized card user. This occurs only if the correct PIN, known only to whom the card was issued, was entered into the verifier.

Attention is now directed to FIG. 1 which is a simplified block diagram of an Offset Generator 10. The function of the Offset Generator, hereafter also referred to as the Generator, is to generate the Offset Number as herebefore defined. The Generator includes three basic storage units whose functions are to store transformations of the IN the PAN, and PIN.

Before the Generator can be used, the IN, is transformed and loaded into an IN storage unit 15. For explanatory purposes it is assumed that the IN consists of 20 decimal digits and that storage unit 15 comprises 20 stages. The IN is entered by means of IN input unit 16. As each IN digit is entered it passes through a transformation unit 18, which converts each of the decimal digits of the IN into a corresponding decimal digit, which is then fed to storage unit 15 through a multiplexer 19. Once the transformed IN is stored in storage unit 15 it remains therein, for as long as the Generator is to be used with the particular IN by a particular institution.

To enhance the security of the system different institution officers may each enter a distinct segment of the 20-digit IN, known only to him or her. Preferably, the system is designed so that storage unit 15 is tamperproof in that any attempt to determine the contents of storage unit 15 would result in the destruction of its content (i.e., the transformed IN). In practice, storage unit 15 is provided with a standby power source in case of a general power failure, to insure that once the 20-digit IN, entered by one or more officers of the institution, is transformed and stored in the storage unit 15, it remains therein and is not subject to destruction, due to the power failure.

When an Offset Number is to be generated, a representative of the institution enters a sequence of decimal digits, called the Primary Account Number, PAN, via PAN input unit 21. Every customer is necessarily assigned a unique PAN. Each of the PAN decimal digits is transformed by transformation unit 23 into a corresponding digit and therefrom it is fed through multiplexer 24 to PAN storage unit 25. The latter consists of a Feedback Shift Register (FSR). In order for PAN to participate in the generation of a 10-digit Offset Number in an 8421 format and in order to provide the system with distributed security FSR 25, hereafter referred to as FSR A, is incorporated. It consists of 10 stages and a feedback network. Each stage is capable of assuming one of 10 states. The feedback network's output is a function of the contents of the register and an external input, reduced modulo 10. Since present devices for storing information are of a binary nature, the modulo 10 FSR A is preferably decomposed into a 10-stage modulo 5 FSR and a 10 stage modulo 2 FSR. The 10-stage modulo 5 FSR can be implemented with three 10-stage binary registers and an appropriate feedback network. Such an implementation with no external input except clock pulses is described in detail in U.S. Pat. No. 3,718,863, particular attention being directed to FIG. 11 therein. Thus, the 10-stage modulo 10 register portion of the FSR is implementable with four 10-stage binary registers, where three of them are associated with the 10-stage modulo 5 FSR and the fourth one is associated with the 10-stage modulo 2 FSR. In practice, each of the transformed PAN decimal digits is fed to FSR A as four bits with three of them being fed to the feedback network of the three binary registers, associated with the modulo 5 FSR, and the fourth one to the feedback network of the binary register, associated with the modulo 2 FSR.

Also included in Generator 10 is PIN input unit 27, by means of which the person, to whom the identification card is issued, enters his or her own secret Personal Identification Number, PIN. The PIN, secretly selected and privately entered by each person, is one of any of the possible sequences of four or more alphanumeric characters. Hereafter, the term "digit" will be used to denote any PIN character.

As each PIN digit is entered, it undergoes a transformation by transformation unit 28 and therefrom it is fed through multiplexer 29 to PIN storage unit 30. The latter is also a 10-stage modulo 10 FSR, hereafter simply referred to as FSR C. FSR C provides a means whereby PIN also participates in the generation of the 10-digit Offset Number. It too, like FSR A, is easily decomposed into a 10-stage modulo 5 FSR, implementable by means of three 10-stage binary registers and a feedback network, and a 10-stage modulo 2 FSR, implementable by means of one 10 stage binary register and a feedback network. The entering of PIN and the entering of PAN are time independent—i.e. asynchronous. PIN may be entered before, during, or after the entry of PAN. Each digit of either one of these sequences enters at the rate at which the operator or the person activates the respective input units 21 and 27. Until both transformed PIN and transformed PAN are entered via feedback networks into their respective storage units, i.e., registers of FSR C and A, the timing and control unit 32 of the Generator is inactive. The time at which the entry of both PIN and PAN have been completed it sensed by the Generator. Upon the completion of the entry of PAN an end of PAN signal is produced which may be used to set a flip flop. Likewise, upon the completion of the entry of PIN a signal is produced to set another flip flop. When both are set thereby indicating that both PAN and PIN have been entered the timing and control unit 32 assumes its operation.

It provides clocking pulses to FSR A and C thereby causing their registers to assume a succession of states, depending on their respective feedback functions and external inputs. (During the entry of PIN and PAN, asynchronous clock pulses are provided by their respective input units.) Digits of different portions of the transformed IN in storage unit 15 are fed as external inputs to the feedback networks of FSR A and C, respectively, to impact the contents of their corresponding registers by different digits of the transformed IN. In the particular embodiment being described, with registers of FSR A and C each being assumed to be 10 stages long, different 10-stage portions of the 20-digit transformed IN in storage unit 15 are used to impact the contents of each of the respective registers of FSR A and C. For definition purposes, the entering of the transformed PIN and transformed PAN into FSR C and A, respectively, can be thought of as initializing FSR C and A. Then, after having been impacted by the various digits from the IN storage unit 15, FSR C and A, respectively, are said to have been re-initialized.

From the foregoing it should thus be appreciated that the initialization of FSR A is a function of PAN, which was assigned and recorded by the institution. The initialization of FSR C is a function of PIN, which is only known to the person to whom the card is being issued. On the other hand, the re-initialization of FSR C and A is a function of PIN and PAN, respectively, and IN, distinct segments of which may be known only to one or more officers of the institution, and the transform (by transformation 18) of which is secretly and safely stored in storage unit 15.

If desired, after the re-initialization of FSR A and C, their contents may be clocked out and processed to successively output 10 four-bit representations of digits of a 10-digit Offset Number in an 8421 format. Such an Offset Number could then be recorded together with the PAN on the magnetic stripe of a card.

However, in order to further enhance the security of the PIN, additional circuitry is included, as will be described hereinbelow. The additional circuitry includes a 12-stage binary FSR, consisting of Shift Register SR 35 and feedback network 95, hereafter referred to as FSR B, a multiplexer 90, and a transformation unit 38. Briefly, after FSR A and C are reinitialized, nine (9) consecutive bits, stored in the modulo 2 portion of FSR C are clocked into the register of FSR B via multiplexer 90. This 9-bit string undergoes a transformation by transformation unit 38, as will be described hereafter in connection with two specific examples. Following the entry of nine bits from FSR C into the register of FSR B, three bits, representing a digit stored in the modulo 5 FSR portion of FSR A, are clocked into the register of FSR B. These three bits do not undergo a transformation by transformation unit 38.

After the register of FSR B is loaded with 12 bits (of which some are transformed) and is therefore fully initialized, FSR B is continuously clocked by timing and control unit 32. Thus, the 12 stages of the register of FSR B cycle through a succession of different states, governed by the feedback function of FSR B. The feedback function is chosen so that FSR B is singular and non-linear. The longest possible state sequence is one in which each state has a unique successor state and each state, except two, has a unique predecessor state. One of the foregoing two states has no predecessor state while the other has two predecessor states.

As previously stated, FSR B, after initialization, is clocked continuously and therefore sequences through various states. Being 12 stages long, it is capable of sequencing through at most $2^{12}=4096$ states. At the same time, FSR A and C are also clocked and each assumes a succession of states lying on a closed cycle in which every state has a unique successor state and a unique predecessor state.

Associated with FSR B is decoder 40. When decoder 40 detects that FSR B is in a preselected state it effectively establishes a window period. During this period a processor 45 is activated. Processor 45 effectively processes the contents of the 10 stages of FSR A and C based on particularly selected processing functions to produce 10 4-bit representations of digits which comprise the 10-digit Offset Number. The latter is fed to output unit 46 which may include a display of the Offset Number and/or means for directly recording the Offset Number on the magnetic stripe of the card.

Figure 2:
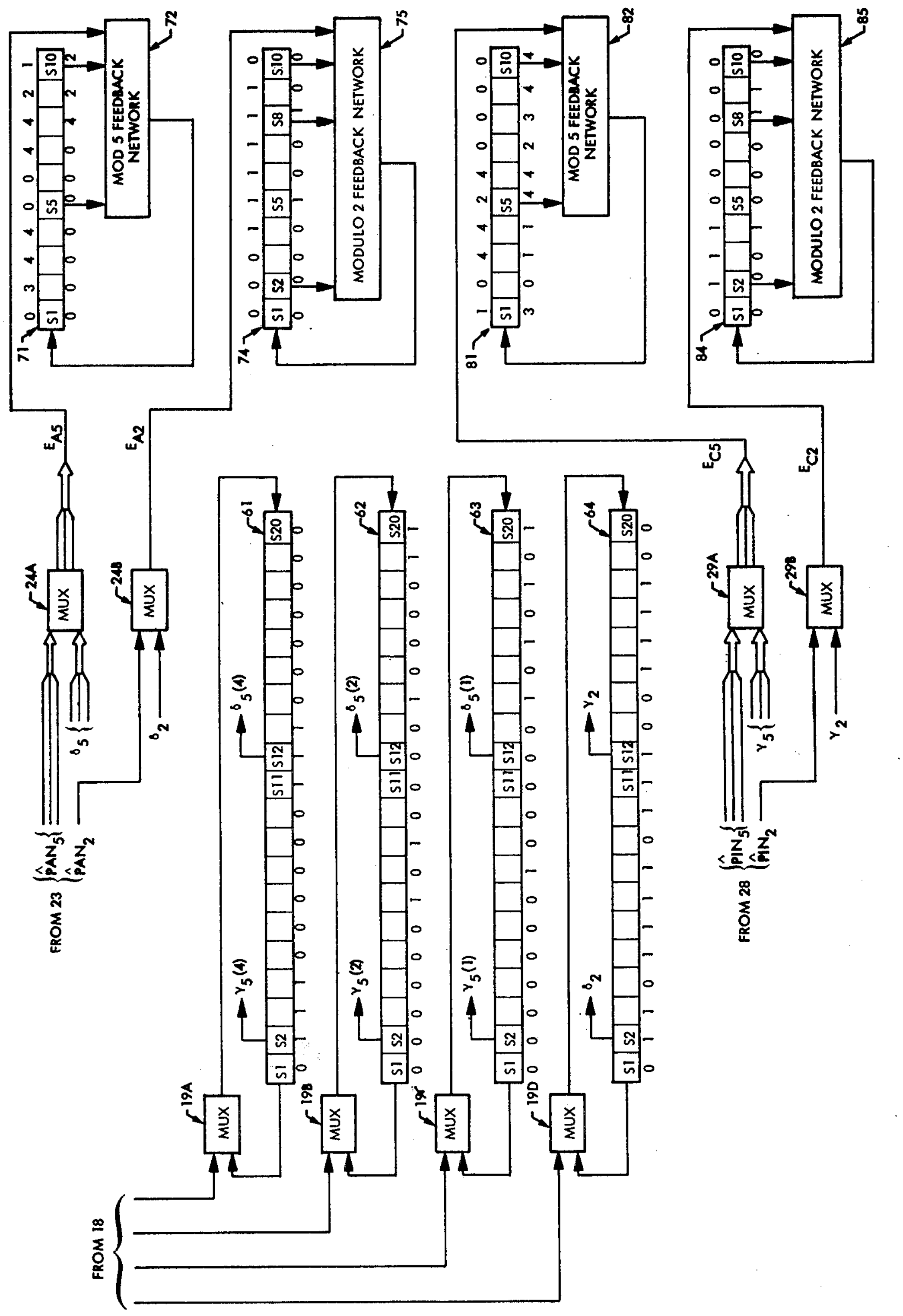
FIG. 2 is primarily a block diagram of certain feedback shift registers in decomposed format.

Attention is now directed to FIG. 2 which contains a more detailed functional block diagram of IN storage unit 15 and FSR's A and C. This functional block diagram will be used to describe the manner in which the IN storage unit 15 is first loaded with the transformed IN, as well as to describe the initialization and the re-initialization of FSR A and C as herebefore defined, in connection with two specific examples. As shown in FIG. 2, the IN storage unit 15 consists of four 20-stage (S1-S20) binary registers, designated by numerals 61–64. Since each transformed IN digit is a decimal digit, its binary representation contains four bits and therefore four registers are required. For explanatory purposes, let it be assumed that the 20-digit IN consists of the decimal digits as shown in line a of FIG. 3 and that these digits are chosen and entered by one or more institution officers via IN input unit 16, shown in FIG. 1.

As previously explained each entered digit undergoes a transformation by transformation unit 18. For explanatory purposes, let it be assumed that the digits 0,1,2,3,4,5,6,7,8, 9, are transformed by transformation unit 18 into corresponding digits 1,0,3,2,5,4,7,6,9,8, respectively. Thus, the 20 digits comprising IN as shown in line a of FIG. 3 are transformed by transformation unit 18 to the corresponding digits indicated in line b of FIG. 3. Each of these digits is stored as a 4-bit representation in corresponding stages of the four registers 61–64. Registers 61–63 store binary representations of the modulo 5 portion of the transformed IN digits corresponding to the columns of entries in lines d,e, and f while the fourth register 64 stores the modulo 2 portion of each transformed In digit as shown in line g. For example, the first transformed digit is 0, (see line b of FIG. 3) is stored as well as all zeroes in stages S1 of the four registers 61–64. On the other hand, the second transformed IN digit which is a nine is divided into a transformed modulo 5 portion with a base 5 value of 4 (see line C) and a transformed modulo 2 portion with a base 2 value of 1. The decomposition of each transformed digit into modulo 5 and modulo 2 portions is achieved by regarding the three higher ordered bits of the 4-bit representation of a decimal digit, as representing the modulo 5 portion and the least significant bit, as representing the modulo 2 portion. It should be noted that the three higher ordered bits (in the 10 4-bit combinations representing the decimal digits in an 8421 format) represent a base 5 digit i.e., 0,1,2,3 or 4. The digits 0,1,2,3 and 4 comprise a reduced residue system modulo 5. Thus, whereas the binary representation of 9 is 1001, and three higher order bits, 100 (the binary equivalent of 4) represent the modulo 5 portion and the least significant bit 1 represents the modulo 2 portion.

The loading of the four registers 61–64 with the transformed IN is done via multiplexers 19A–19D (FIG. 2) which together comprise the multiplexer 19, shown in FIG. 1. In FIG. 2, it is assumed that the bits are clocked into the four registers 61–64 with the last stage S20 of each register representing the input stage. The IN input unit 16 in FIG. 1 provides asynchronous clock pulses during the one time entry of the IN. For the particular example it should be apparent that after the 20-digit transformed IN is clocked or entered into storage unit 15, the four registers 61–64 store the binary values as indicated below their respective stages. In FIG. 3, the modulo 5 portion of the transformed IN digits appears in line c and the modulo 2 portion of the transformed IN digits appears in line g.

The incorporation of IN storage unit 15 for storing a transformation of the IN, is most significant. In essence, it customizes the Generator for a particular institution. Since the manufacture of the Generator does not know the IN, ultimately to be selected and entered into the generator by one or more officers of the institution the system is protected from either unscrupulous manufacturers or the blackmailing of honest manufacturers by anyone attempting to establish valid PAN-PIN-OFFSET combinations. Also, as previously stated, it is preferred that different officers of the institution select and insert distinct segments of the 20-digit IN. A collusive effort would, therefore, be required to determine the IN in its entirety.

As previously discussed, FSR A and FSR C are 10-stage modulo 10 feedback shift registers. Each is decomposed into a 10-stage modulo 5 FSR and a 10-stage modulo 2 FSR. Also, the modulo 5 FSR portion is in practice implementable by three binary registers with an appropriate feedback network, as described in the aforementioned U.S. patent, with the addition of an external input. However, in FIG. 2, each of the FSR's A and C is shown as the combination of a nonbinary modulo 5 FSR and a binary modulo 2 FSR. FSR A is represented in FIG. 2 by the modulo 5 FSR portion comprised of a 10-stage register 71 with its modulo 5 feedback network 72 and the modulo 2 FSR portion, comprised of a 10-stage binary register 74 and its modulo 2 feedback network 75. Likewise, FSR C is represented in FIG. 2 by a modulo 5 FSR portion, comprised of a 10-stage register 81 with its modulo 5 feedback network 82 and a modulo 2 FSR portion, comprised of a 10-stage binary register 84 and its modulo 2 feedback network 85.

It is appreciated by those familiar with modulo 2 (i.e., binary) FSR's that by operating the feedback networks of such FSR's in accordance with appropriate feedback functions, the (registers of the) FSR's will assume cycles of states of equal length. See U.S. Pat. No. 3,609,327. Thus, registers 74 and 84 of the modulo 2 portions of FSR A and FSR C, respectively, can each be made to assume cycles of states of length $2^4=16$, with the possible number of dintinct cycles being $2^6=64$. Equal length cycles are realized with feedback networks 75 and 85, respectively, yielding appropriate feedback functions. It will be further appreciated by those familiar with the art that by operating the feedback networks of modulo 5 FSR's in accordance with appropriate feedback functions, the (registers of the) FSR's will assume cycles of states of equal length. Thus, registers 71 and 81 of the modulo 5 portions of FSR A and FSR C, respectively, can be made to assume cycles of states of length $5^2=25$, with the possible number of distinct cycles being $5^8=390,625$. Equal length cycles are realized with feedback networks 72 and 82, respectively, yielding appropriate feedback functions.

It will be appreciated by those familiar with the art that the $5^{10}$ possible states of a 10-stage modulo 5 FSR will lie on $5^8$ disjoint cycles, each of which is of length $5^2=25$ if the feedback function is the modulo 5 sum of twice the output of the fifth stage S5 and four times the output of the tenth stage S10 and a nonzero constant 1,2,3, or 4.

As shown in FIG. 2, the outputs of stages S5 and S10 of the 10-stage register 71 are inputs to the modulo 5 feedback network 72. The feedback network 72 is further provided with an external input designated $E_{A5}$ from multiplexer 24A, which together with multiplexer 24B, comprise multiplexer 24 shown in FIG. 1. $E_{A5}$ is a 3-bit representation of a base 5 digit (i.e., 0,1,2,3 or 4). Appearing at $E_{A5}$ are representations of either a succession of the modulo 5 portion of transformed PAN digits designated $\hat{P}AN_5$, a succession of the modulo 5 portion of selected digits of the transformed IN designated $\delta_5$, or the constant 0 (i.e., 000). During the initialization of FSR A, PAN digits emanate from PAN input unit 21 shown in FIG. 1, and are transformed by transformation unit 23. The modulo 5 portion of the representation of transformed PAN digits namely, $\hat{P}AN_5$, appear at $E_{A5}$ via multiplexer 24A in FIG. 2 until the initialization of FSR A is completed. During the re-initialization of FSR A, the modulo 5 portion of representations of selected digits of the transformed IN which are stored in registers 61–63 namely, $\delta_5$, appear at $E_{A5}$ via multiplexer 24A. At all other times a representation of the constant 0 (i.e., 000) appears at $E_{A5}$.

Also, as shown in FIG. 2, the outputs of stages S2, S8 and S10 of the 10-stage register 74 are inputs to the modulo 2 feedback network 75. The feedback network 75 is further provided with an external input designated $E_{A2}$ from multiplexer 24B which, as previously stated, together with multiplexer 24A comprise multiplexer 24 in FIG. 1. $E_{A2}$ is either a succession of bits corresponding to the modulo 2 portion of transformed PAN digits designated $\hat{P}AN_2$, a succession of bits corresponding to the modulo 2 portion of selected digits of the transformed IN designated $\delta_2$, or the constant binary 0.

As previously stated, during the initialization of FSR A, PAN digits emanate from the PAN input unit 21 shown in FIG. 1, and are transformed by the transformation unit 23. The modulo 2 portion of the transformed PAN digits namely, $\hat{P}AN_2$, appear at $E_{A2}$ via multiplexer 24B, until the initialization of FSR A is completed. During the re-initialization of FSR A, the modulo 2 portion of selected digits of the transformed IN which are stored in register 64 namely $\delta_2$, appear at $E_{A2}$ via multiplexer 24B. At all other times the constant binary 0 appears at $E_{A2}$.

The output of the modulo 5 feedback network 72 is a function of the modulo 5 portion of FSR A as well as the external input $E_{A5}$ and is best summarized in the table, given in FIG. 4. Therein $$A^{(5)}_{k-5}$$

denotes the output of stage S5 of register 71 at Clock Pulse Interval (CPI) k whereas $$A^{(5)}_{k-10}$$

denotes the output of stage S10 at CPI k, and $E_{A5}$ represents the external modulo 5 input (at the same CPI k). The digit which is actually fed back to stage S1 of register 71 from feedback network 72 is a function of the digits stored in stages S5 and S10 and the external input to the feedback network, $E_{A5}$, appears among digits enclosed by a dashed line in FIG. 4. When the external input $E_{A5}$ is 0, the feedback function associated with two specific examples may be described mathematically as follows.

$$A^{(5)}_{k} = (2A^{(5)}_{k-5} + 4A^{(5)}_{k-10} + 2)\ mod\ 5$$

where $A_k^{(5)}$ denotes the digit being fed back to stage S1 of register 71 at CPI k.

As to the modulo 2 feedback network 75 of the modulo 2 portion of FSR A, its feedback function can always be expressed mathematically as follows:

$$A^{(2)}_{k} = (A^{(2)}_{k-2} + A^{(2)}_{k-8} + A^{(2)}_{k-10} + 1 + E_{A2})\ mod\ 2$$

where $$A^{(2)}_{k-2}$$

denotes the output of stage S2 of register 74 at CPI k, and $$A^{(2)}_{k-8} \text{ and } A^{(2)}_{k-10}$$

denote the outputs of stages S8 and S10, respectively, at CPI k, and $E_{A2}$ denotes an external modulo 2 input to feedback network 75 at the same CPI k. Also $A_k^{(2)}$ denotes the bit being fed back to stage S1 of register 74 at CPI k.

In operation, as each PAN digit is entered via PAN input 21, it is transformed by transformation unit 23. For explanatory purposes, it is assumed that the latter transforms digits 0,1,2,3,4,5,6,7,8,9 into respective digits 1,0,3,2,5,4,7,6,9,8. The three higher ordered bits of the 8421 binary representation of each digit represent the modulo 5 portion of the transformed PAN digit, i.e., $\hat{P}AN_5$. $\hat{P}AN_5$ is fed to multiplexer 24A and therefrom to the feedback network 72 for initializing register 71 of the modulo 5 FSR. The least significant bit of the representation of each transformed PAN digit, designated $\hat{P}AN_2$, is fed to multiplexer 24B and therefrom to the feedback network 75 for initializing register 74 of the modulo 2 FSR. Thus, after all the PAN digits are entered, the two registers 71 and 74, which together comprise the modulo 10 register of FSR A, are initialized. For explanatory purposes, let it be assumed that the PAN is 12 digits in length and consists of digits 137058429602. It should be appreciated that after transformation these 12 digits respectively become 0,2,6,1,4,9,5,3,8,7,1,3 and are decomposed into modulo 5 components 0 1 3 0 2 4 2 1 4 3 0 1 and modulo 2 components 0 0 0 1 0 1 1 1 0 1 1 1, respectively. The PAN digits, the transformed PAN digits, the modulo 5 components (i.e., $\hat{P}AN_5$) and modulo 2 components (i.e., $\hat{P}AN_2$) of the transformed PAN digits are listed in FIG. 5 on lines a,b,c, and d, respectively.

Initially, both registers 71 and 74 are in the all zeros state. However, as they are initialized by entering transformed components of the PAN digits via their respective feedback networks, they cycle through various states, governed by each feedback function. The state of each of registers 71 and 74 after initialization as indicated by the digit string appearing above each respective register in FIG. 2. Successive states of registers 71 and 74 from the start until the completion of their initialization are listed in tabular form in FIG. 6.

As previously stated, like modulo 10 FSR A, modulo 10 FSR C is also decomposed into a modulo 5 FSR portion and a modulo 2 FSR portion. The modulo 5 FSR portion of FSR C is represented in FIG. 2 by the 10-stage register 81 with its associated modulo 5 feedback network 82, and the modulo 2 FSR portion of FSR C is represented by the 10-stage register 84 with its associated modulo 2 feedback network 85. In addition to the outputs of stages S5 and S10 of register 81, the modulo 5 feedback network 82 is also provided with a 3-bit external input from multiplexer 29A, which together with multiplexer 29B comprise multiplexer 29, shown in FIG. 1. The external input to the modulo 5 feedback network 82, designated $E_{C5}$, is the modulo 5 portion of each transformed PIN digit designated $\hat{PIN}_5$ which is supplied to multiplexer 29A from PIN input unit 27 via transformation unit 28 during initialization or during reinitialization, a 3-bit external input designated $\gamma_5$ which represents the modulo 5 portion of selected digits of the transformed IN stored in registers 61–63. At all other times the external input $E_{C5}$ is a representation of the constant 0 (i.e., 000).

As to the modulo 2 feedback network 85, in addition to the inputs corresponding to the respective outputs of stages S2, S8, and S10 of register 84, it is also supplied with a single bit external input from multiplexer 29B. The single bit external input, designated $E_{C2}$, is the modulo 2 portion of each transformed PIN digit designated $\hat{PIN}_2$ which is supplied to multiplexer 29B from PIN input unit 27 via transformation unit 28 during initialization. During re-initialization the single bit external input designated $E_{C2}$ is the modulo 2 portion of selected digits of the transformed IN stored in register 64 denoted by $\gamma_2$. At all other times the constant binary 0 appears at $E_{C2}$.

The output of the modulo 5 feedback network 82 is a function of the contents of the fifth stage S5 and the tenth stage S10 of the modulo 5 portion of FSR C i.e. register 81, as well as the external input $E_{C5}$ and is best summarized in the table given in FIG. 7. Therein $$C^{(5)}_{k-5}$$

denotes the output of stage S5 of register 81 at CPI k whereas $$C^{(k)}_{k-10}$$

denotes the output of stage S10 at CPI k, and $E_{C5}$ represents the external modulo 5 input, at the same CPI k. The digit which is actually fed back to stage S1 of register 81 from feedback network 82 as a function of the digits stored in stages S5 and S10 and the external input to the feedback network, $E_{C5}$, appears among the digits enclosed by a dashed line in FIG. 7. When the external input $E_{C5}$ is 0, the feedback function associated with two specific examples may be described mathematically as follows.

$$C^{(5)}_k = (2C^{(5)}_{k-5} + 4C^{(5)}_{k-10} + 1) \bmod 5.$$

denotes the digit being fed back to stage S1 at CPI k.

The feedback function of the modulo 2 feedback network 85 can always be expressed mathematically as follows.

$$C^{(2)}_k = (C^{(2)}_{k-2} + C^{(2)}_{k-8} + C^{(2)}_{k-10} + 1 + E_{C2}) \bmod 2$$

denotes the output of stage S2 of register 84 at CPI k, and $$C^{(2)}_{k-8} \text{ and } C^{(2)}_{k-10}$$

denote the outputs of stages S8 and S10, respectively, at CPI k, and $E_{C2}$ denotes an external modulo 2 input to feedback network 85, at the same CPI k.

Attention is now directed to FIG. 8, wherein a selected PIN in alphanumeric characters appears in line a. Its numerical equivalent is given in line b as 263385. As these digits emanate from PIN input unit 27 they are transformed by transformation unit 28 into corresponding digits as given in line c. Lines d and e of FIG. 8 are the modulo 5 portions (i.e., $\hat{PIN}_5$) and the mod 2 portions (i.e., $\hat{PIN}_2$), respectively, of the various transformed PIN digits which, as hereinbefore described, are supplied to multiplexers 29A and 29B, respectively.

FIG. 9, to which attention is now directed, is similar to FIG. 6 and it represents the succession of states of registers 81 and 84 of FSR C during the initialization. Successive states from the start until the completion of the initialization are listed in tabular form in FIG. 9. The states of registers 81 and 84, after initialization are indicated by the digit string appearing above these registers in FIG. 2.

Once the two registers FSR A and FSR C have been initialized with transformed PAN and transformed PIN, respectively, the clocking of the various registers of the Generator is controlled by timing and control unit 32.

For explanatory purposes, it is assumed that after the two registers FSR A and FSR C have been initialized as previously described, timing and control unit 32 clocks the two FSR's for a preselected number of Clock Pulse Intervals (CPI's) before re-initialization occurs. As previously discussed, the external inputs to the feedback networks of FSR A and FSR C (i.e., $E_{A5}$, $E_{A2}$, $E_{C5}$, $E_{C2}$, in FIG. 2) are zero at all times other than during initialization and re-initialization of FSR A and FSR C. FIGS. 10 and 11 respectively are tabulations of the successive states assumed by the modulo 5 and modulo 2 registers of FSR A and FSR C. As shown therein it is assumed that after initialization of both registers, designated to have occurred at CPI 0, the FSRs are clocked for 17 CPIs with their external inputs at zero before the transformed IN starts impacting the contents of the FSR's. As shown in FIG. 2, it is assumed that the modulo 5 portion of FSR A is supplied with the modulo 5 portions of the transformed IN digits stored in stages S12–S20 and S1, of registers 61,63 where the successive contents of stages S12 are denoted by $\delta_5$, and the modulo 2 portion of FSR A is supplied with the modulo 2 portions of the transformed IN digits stored in stages S2–S11 of register 64 where the successive contents of stage S2 are denoted by $\delta_2$. Thus, different portions of representations of different digits of the transformed IN are fed to the feedback networks of FSR A as external inputs.

Likewise, the modulo 5 portions of the transformed In digits in stages S2–S11 of register 61–63 are fed to the modulo 5 portion of FSR C as external input $\gamma_5$ and the modulo 2 portions of the transformed IN digits in stages S12–S20 and S1 of register 64 are fed as external input $\gamma_2$ to the modulo 2 portion of FSR C.

Attention is now directed to FIGS. 2 and 10. Starting at CPI 17, the contents of each of the four registers 61–64 comprising IN storage unit 15 are cyclically shifted for 20 CPIs under the control of timing and control unit 32. The content of stage S20 becomes the content of stage S19 of each respective register upon receiving a clock pulse from timing and control unit 32. Whereas, the content of stage S19 becomes the content of stage S18 during the same CPI etc., and the content of stage S1 of each register is transferred to stage S20 via respective multiplexers 19A–19D shown in FIG. 2, which comprise multiplexer 19 in FIG. 1. During CPI 17–26 i.e., the first 10 consecutive CPIs during which the contents of registers 61–64 are cyclically shifted, the outputs of stages S12 of registers 61–63, denoted by $\delta_5$, are supplied to the modulo 5 portion of FSR A via multiplexer 24A as a sequence of external inputs denoted by $E_{A5}$. As shown in FIG. 10, $\delta_5$ during CPI 17–26 represents the modulo 5 digit sequence 4 4 3 0 1 0 1 2 3 0. Prior to the re-initialization of FSR A and FSR C, the foregoing sequence is stored as 10 3-bit representations in stages S12–S20 and S1, respectively, of registers 61–63 in FIG. 2. The binary representation of each digit, $\delta_5=\delta_5(4)\delta_5(2)\delta_5(1)$ is sequentially stored in stages S12 of registers 61–63 and supplied to the modulo 5 portion of FSR A, as heretofore indicated. Simultaneously, during CPI 17–26, the output of stage S2 of register 64 denoted by $\delta_2$ is supplied to the modulo 2 portion of FSR A via multiplexer 24B in FIG. 2 (which together with multiplexer 24A comprise multiplexer 24 in FIG. 1) as a sequence of external inputs denoted by $E_{A2}$. As shown in FIG. 10, $\delta_2$ during CPI 17–26, represents the modulo 2 (i.e., binary) sequence 1 1 0 1 1 1 1 0 1 1. Prior to the re-initialization of FSR A and FSR C, the foregoing binary sequence is stored in stages S2–S11, respectively, of register 64 in FIG. 2.

In a like manner, during CPI 17–26, the outputs of stages S2 of registers 61–63, denoted by $\gamma_5$, are supplied to the modulo 5 portion of FSR C via multiplexer 29A as a sequence of external inputs denoted by $E_{C5}$. As shown in FIG. 11, $\gamma_5$ during CPI 17–26 represents the modulo 5 sequence 4 4 4 0 0 2 1 2 0 4. Prior to the re-initialization of FSR A and FSR C, the foregoing sequence is stored as 10 3-bit representations in stages S2–S11, respectively, of registers 61–63 in FIG. 2. The binary representation of each digit, $\gamma_5=\gamma_5(4)\ \gamma_5(2)\ \gamma_5(1)$ is sequentially stored in stages S2 of registers 61–63 and supplied to the modulo 5 portion of FSR C as heretofore discussed. Simultaneously, during CPI 17–26, the output of stage S12 of register 64, denoted by $\gamma_2$, is supplied to the modulo 2 portion of FSR C via multiplexer 29B, which together with multiplexer 29A comprise multiplexer 29, shown in FIG. 1, as a sequence of external inputs denoted by $E_{C2}$. As shown in FIG. 11, $\gamma_2$ during CPI 17–26 represents the modulo 2 i.e., binary sequence 1 0 0 1 1 1 1 0 0 0. Prior to the re-initialization of FSR A and FSR C, the foregoing binary sequence is stored in stages S12–S20 and S1, respectively, of register 64 in FIG. 2.

At CPI 27 the re-initialization of FSR A and FSR C is completed. The state of registers 71 and 74 upon re-initialization of FSR A is as indicated by the digit string appearing below each respective register in FIG. 2. These digit strings correspond to the state of the modulo 5 and modulo 2 portions of FSR A, respectively, at CPI 27 as given in FIG. 10. The state of registers 81 and 84 upon re-initialization of FSR C is as indicated by the digit string appearing below each respective register in FIG. 2. These digit strings correspond to the state of the modulo 5 and modulo 2 portions of FSR C, respectively, at CPI 27 as shown in FIG. 11. It should be appreciated that the states appearing in FSR A and FSR C at CPI 17 are mapped into their respective re-initialized states at CPI 27 by sequences of 10 external inputs, which are functions of the transformed IN as previously described. After CPI 26 (i.e., starting at CPI 27), the external inputs to the feedback networks of FSR A and FSR C become and remain at 0. The feedback functions where $E_{A5}$, $E_{A2}$, $E_{C5}$ and $E_{C2}$ are all at 0 are mathematically characterizeable as previously discussed. Furthermore, the cycles of states of the modulo 5 portions of FSR A and FSR C are of equal length as are the cycles of states of the modulo 2 portions of FSR A and FSR C.

It should be appreciated that the re-initialization of FSR A and FSR C requires only 10 CPSs. However, since IN storage unit 15 is comprised of 20 stage binary registers, the registers 61–64 are supplied with an additional 10 clock pulses after FSR A and FSR C have been re-initialized in order to cyclically shift their contents to their original position and restore the transformed IN in preparation for the next PAN and PIN entries.

As previously indicated, a 10-digit Offset Number could be derived starting at any preselected CPI after the completion of the re-initialization of FSR A and FSR C. For example, at CPI k=37 as shown in FIG. 10, $$A^{(5)}_{k-1}A^{(5)}_{k-2}\ldots A^{(5)}_{k-10} = 1\,1\,3\,2\,2\,2\,2\,3\,0\,0 \text{ and}$$

$$A^{(2)}_{k-1}A^{(2)}_{k-2}\ldots A^{(2)}_{k-10} = 0\,1\,0\,0\,1\,1\,1\,0\,1\,0 \text{ Thus,}$$

$$A_1A_2\ldots A_{10} = 2\,3\,6\,4\,5\,5\,5\,6\,1\,0 \text{ where}$$

$$A_i = 2A^{(5)}_{k-i} + A^{(2)}_{k-i} \text{ and } 1 \leq i \leq 10$$

It should be noted that $A_i$ is a 4-bit representation of a decimal digit in an 8421 format. The three most significant bits correspond to the binary representation of $$A^{(5)}_{k-i}$$

and the least significant bit is the representation of $$A^{(2)}_{k-i}$$

Similarly, at CPI k=37 as shown in FIG. 11, $$C^{(5)}_{k-1}C^{(5)}_{k-2}\ldots C^{(5)}_{k-10} = 4\,4\,0\,3\,2\,3\,4\,0\,4\,0 \text{ and}$$

$$C^{(2)}_{k-1}C^{(2)}_{k-2}\ldots C^{(2)}_{k-10} = 0\,1\,1\,0\,0\,0\,1\,0\,0\,0 \text{ Thus,}$$

$$C_1C_2\ldots C_{10} = 8\,9\,1\,6\,4\,6\,9\,0\,8\,0 \text{ where,}$$

$$C_i = 2C^{(5)}_{k-i} + C^{(2)}_{k-i} \text{ and } 1 \leq i \leq 10$$

As in the case of $A_i$, $C_i$ is a 4-bit representation of a decimal digit in an 8421 format. The three most significant bits correspond to the binary representation of $$C^{(5)}_{k-i}$$

and the least significant bit is the representation $$C^{(2)}_{k-i}.$$

The ith stages of the four 10-stage binary registers, associated with FSR A, store the binary representation of $A_i$. Similarly, the ith stages of the four 10-stage binary registers, associated with FSR C, store the binary representation of $C_i$. The time interval CPI k during which $A_i$ and $C_i$ are stored in the ith stages of FSR A and FSR C, respectively, is implied in the foregoing expressions for $A_i$ and $C_i$. Corresponding $A_i$'s and $C_i$'s starting at CPI k=37 could be sequentially combined by processor 45, shown in FIG. 1, in accordance with the preselected processing function, shown in FIG. 13. Thus, corresponding $A_i$'s and $C_i$'s are combined as follows $$A_1 A_2 \ldots A_{10} = 2\,3\,6\,4\,5\,5\,5\,6\,1\,0$$
$$C_1 C_2 \ldots C_{10} = 8\,9\,1\,6\,4\,6\,9\,0\,8\,0$$
$$\overline{D_1 D_2 \ldots D_{10} = 4\,8\,7\,0\,5\,1\,0\,4\,3\,8}$$

where $$D_i = A_i + 3C_i + 8 \; mod \; 10 \text{ and } 1 \leqq i \leqq 10$$

the output of precessor 45 in FIG. 1 is the Offset Number.

$$D_1 D_2 \ldots D_{10} = 4\,8\,7\,0\,5\,1\,0\,4\,3\,8$$

for the PAN, PIN and IN, given in FIGS. 5 (line a), 8 (line a) and 3 (line a), respectively. Thus, the generation of the Offset Number is dependent upon the PAN which is assigned by the institution, the IN, which is secretly selected for a one-time entry by one or preferably more officers of the institution, and the PIN which is secretly selected by the customer. Furthermore, the transformations and mappings, the modulo 5 feedback networks associated with FSR A and FSR C, and the output processor 45, which are realized by electronic circuitry, affect the generation of the Offset Number. The electronic circuitry in the form of integrated circuits is secretly selected by the manufacturer for each set of Generators and verifiers, subsequently discussed to be delivered to a particular institution. Clearly, the overall mapping of PAN and PIN into an Offset Number is identical for all units. As previously pointed out in a preferred embodiment, additional circuitry is provided to further affect the generation of the Offset Number. The circuitry will be explained in connection with a specific example in relation to the example, hereinbefore described.

Figure 12:
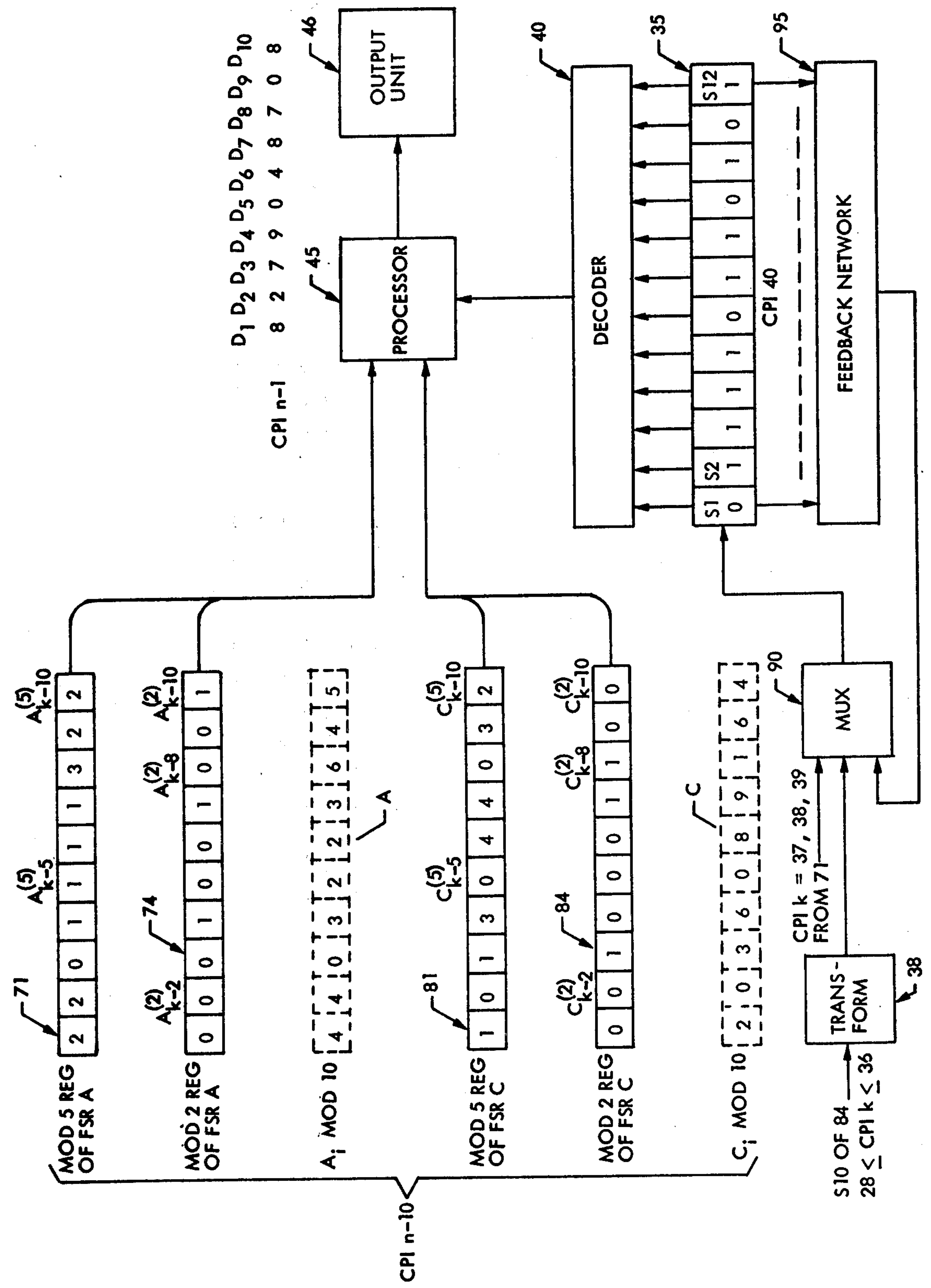
FIG. 12 is a block diagram, useful in explaining the role of a control feedback shift register in generating the Offset Number, in accordance with an embodiment of the invention.

Included in the circuitry is the 12-stage binary shift register 35 and the binary feedback network 95, shown in FIGS. 1 and 12. In accordance with a particular embodiment of the present invention one CPI after FSR A and FSR C have been re-initialized by the transformed IN, i.e. at CPI 28, initialization of register 35 starts. During CPI 28–36 the bit stored in stage S10 of register 84 of FSR C is fed to register 35 via transformation unit 38 and multiplexer 90. As shown in FIG. 11, during CPI 28–36, stage 10 of the modulo 2 register portion of FSR C, i.e. register 84, successively stores the bits 1 1 0 0 0 1 0 0 0. These bits are serially fed to transformation unit 38 wherein they undergo a preselected transformation. In a particular embodiment, a one-to-one non-linear transformation takes place, whereby the second, third, fifth, eighth and ninth bits which pass through transformation unit 38 are complemented, so that a 1 becomes a 0 and a 0 becomes a 1. Thus the succession of bits (in register 84 at CPI 28, shown in FIG. 11) 0 0 0 1 0 0 0 1 1, as read from right to left, the order in which they are supplied to transformation unit 38, is transformed to the succession of bits 1 1 0 1 1 0 1 0 1 as read from right to left. (See FIG. 12). During CPI 37–39, the three bits stored in register 71 of FSR A and representing a particular base 5 digit are successively supplied to register 35 via multiplexer 90. In the particular example it is assumed that the three bits are those representing the base 5 digit 3 stored in stage S8 of register 71 during CPI 37, stage S9 during CPI 38 and stage S10 during CPI 39. (See FIG. 10). The 3 bits representing digit 3 are 0 1 1 where the rightmost bit (i.e., the least significant bit) is supplied first. These 3 bits do not undergo a transformation but are fed directly to register 35 via multiplexer 90. Thus, at CPI 40 bits 0 1 1 1 1 0 1 1 0 1 0 1 are stored in the stages S1–S12, respectively, of register 35, and the register is fully initialized.

Once register 35 has been initialized, together with its binary network feedback 95, it operates as a binary FSR, referred to earlier as FSR B. For purposes to be described hereafter in detail a non-linear feedback function is chosen so that the register 35 operates as a singular non-linear FSR. The feedback may be described by the following non-linear switching function.

$$b_k = b_{k-4} b_{k-7} \oplus \bar{b}_{k-12} \oplus b_{k-1} b_{k-2} \ldots b_{k-11} \bar{b}_{k-12}$$

where $b_{k-i}$ denotes the content of ith stage at CPI k for 1≦i≦11 and $\bar{b}_{k-12}$ is the complement of the content of the 12th stage at CPI k. Therein $b_k$ denotes the bit being fed back to stage S1 of register 35 at CPI k.

The contents of stages S1–S12 of register 35 are supplied to decoder 40. Its function is to sense the content of each of the stages of register 35 and provide a control output to processor 45 when the stages are in a particular combination of states. Once this control signal is supplied to processor 45 even though register 35 continues to cycle through its states, processor 45 remains enabled and processes the contents of FSR A and FSR C in order to generate the Offset Number, based on preselected processing functions.

For explanatory purposes, it is assumed that whenever stages S1–S12 of register 35 are respectively in the states of 1 1 0 1 1 1 1 0 1 1 0 1 an enabling control signal is supplied by decoder 40 to processor 45. For this particular example this combination of states occurs at a CPI which is two CPI's following the initialization of register 35.

Referring to FIGS. 10 and 11, therein at CPI 41 the states of the modulo 5 and modulo 2 register portions of FSR A and FSR C are respectively tabulated, as well as the states of these registers during a subsequent time period, designated as CPI n-10. During CPI n-10 as well as during 9 successive CPI's, herein designated as n-9 through n-1, corresponding $A_i$'s and $C_i$'s (as previously defined) stored in the ith stages of FSR A and FSR C, respectively, are sequentially combined by processor 45. During these 10 CPI's, processor 45 maps the contents of FSR A and FSR C into the Offset Number.

In order to facilitate the following explanations the contents of registers 71 and 74 of FSR A and registers 81 and 84 of FSR C are diagrammed in FIG. 12 with their respective states given at CPI n-10. Also, shown in FIG. 12 are the modulo 10 equivalents, i.e. $A_i$ and $C_i$ for i=1,2, . . . ,10. In order to further enhance the security provided by the system, two different processing functions are used in processor 45 to generate the 10 digit Offset Number. The 10 digits of the Offset Number, as previously designated, are $D_1$ through $D_{10}$. During CPI n-10 digit $D_{10}$ is generated. The processing function for $D_{10}$ may be expressed as follows:

$$D_{10} = 2C^{(5)}_{n-10} + C^{(2)}_{n-10}$$

$$\text{where } C^{(5)}_{n-10} = (2C^{(5)}_{(n-10)-5} + 4C^{(5)}_{(n-10)-10} + 1) \; mod \; 5$$

It should be noted that $$C^{(5)}_{(n-10)-5}$$

denotes the output of stage S5 of register 81 (contained in FSR C) at CPI k=n-10, whereas $$C^{(5)}_{(n-10)-10}$$

denotes the output of stage S10 at CPI n-10. Also, $$C^{(2)}_{n-10} = (C^{(2)}_{(n-10)-2} + C^{(2)}_{(n-10)-8} + C^{(2)}_{(n-10)-10} + 1) \bmod 2$$

where $C^{(2)}_{(n-10)-2}$ denotes the output of stage S2 of register 84 (contained in FSR C) at CPI k=n-10, and $$C^{(2)}_{(n-10)-8} \text{ and } C^{(2)}_{(n-10)-10}$$

denote the outputs of stages S8 and S10, respectively, at CPI k=n-10.

From the foregoing and FIG. 12, it should be apparent that $$C^{(5)}_{(n-10)}$$

is equal to $(2\times0)+(4\times2)+1\equiv4 \bmod 5$, while $$C^{(2)}_{(n-10)}$$

is equal to $0+1+0+1\equiv0 \bmod 2$. Therefore, $D_{10}$ is equal to $(2\times4)+0=8$.

As to the processing and the generation of the other nine digits of the Offset Number i.e. D1–D9 they are generated based on the processing function $$D_i=(A_i+3C_i+8) \bmod 10 \quad 1\leq i\leq 10$$

Wherein $A_i$ is a 4-bit representation of a decimal digit stored in stages $S_i$ of FSR A in an 8421 format, and similarly $C_i$ is a 4-bit representation of a decimal digit stored in stages $S_i$ of FSR C in an 8421 format. In this particular example corresponding $A_i$'s and $C_i$'s for i=1,2, . . . ,9 are sequentially combined in accordance with the preselected processing function shown in FIG. 13.

At CPI k=n-10, $A_{10}$ and $C_{10}$ are stored in stages S10 of FSR A and FSR C, respectively, as shown in FIG. 12, and $D_{10}$ is derived as previously shown. At CPI n-9, the contents of FSR A and FSR C will have been shifted to the right, such that $A_9$ and $C_9$ (4 and 6 respectively) will be stored in stages S10 of FSR A and FSR C, respectively and $D_9$ is derived by processor 45 as follows:

$$D_9 = (A_9 + 3C_9 + 8) \bmod 10$$
$$= 4 + (3 \times 6) + 8 \equiv 0 \bmod 10.$$

Successive $D_i$'s for i=8,7, . . . ,2 and 1 are similarly derived as is $D_9$ by processor 45. The generation of the Offset Number is completed at CPI k=n-1 when, $D_1$ is derived. The 10-digit Offset Number for this example appears above processor 45 in FIG. 12. This is the Offset Number for the PAN, PIN and IN given in FIGS. 5 (line a), 8 (line a) and 3 (line a), respectively. The Offset Number $$D_1D_2 \ldots D_9D_{10}=8\ 2\ 7\ 9\ 0\ 4\ 7\ 0\ 8$$

as shown in FIG. 12, includes the effects of FSR B (comprised of register 35 and its feedback network 95), decoder 40 and transformation unit 38 as well as processor 45 with two preselected processing functions. In the foregoing example, the role of FSR B and decoder 40 is further detailed as follows.

After FSR A and FSR C have been re-initialized at (CPI 27), the initialization of FSR B begins (at CPI 29). After the completion of the initialization of FSR B (at CPI 40), FSR B (i.e., register 35 and feedback network 95) and decoder 40 supply timing and control signals (starting at CPI 42=n-1) in addition to those emanating from timing and control unit 32. Attention is now drawn to FIG. 14. FSR A and FSR C continue to assume a succession of states until register 35 of FSR B assumes the preselected state 1 1 0 1 1 1 1 0 1 1 0 1 where the leftmost bit resides in stage S1 and is denoted by $b_{k-1}$. The nonlinear switching function $$b_k=b_{k-4}b_{k-7}\oplus\bar{b}_{k-12}\oplus b_{k-1}b_{k-2}\ldots b_{k-11}\bar{b}_{k-12}$$

previously shown characterizes the state behavior of FSR B. The preselected state 1 1 0 1 1 1 1 0 1 1 0 1 designated to occur at CPI n-10 is the first of 10 successive state as sensed by decoder 40 which establishes a window period 10 CPI's in length. The last state in the window namely, 1 1 1 1 1 1 1 1 1 1 1 0, appears at CPI n-1. This state is succeeded by the all 1's state at CPI n which appears after the Offset Number has been derived. Furthermore, the all 1's state is the terminal state of FSR B since it is its own successor state. During the 10 CPI window period, decoder 40 provides timing and control signals for enabling processor 45 and for serially clearing (i.e., resetting) various registers in Generator 10 of FIG. 1 in preparation for the entry of another PAN and PIN combination.

The time elapsed in CPIs between the initailization of FSR B and the appearance of the 10 CPI window period is dependent upon the initial state of FSR B. The initial state of FSR B in turn is a function of PAN, PIN and IN. In this example, as indicated in FIG. 14, initialization of FSR B is completed at CPI 40 whereas the beginning of the 10 CPI window period occurs two CPI's later.

Distinct initial states of FSR B result in different time appearances of the 10 CPI window period. FSR B can assume any one of $5\times512=2560$ initial states. Any one of 512 9-bit combinations can be the initial state of the nine rightmost stages (i.e., stages S4–S12) of register 35 of FSR B shown in FIG. 12. On the other hand, the three leftmost stages (i.e., stages S1–S3) of register 35 will be initialized with one of 5 possible 3-bit combinations. The 5 3-bit combinations are respective binary representations of base 5 digits 0,1,2,3 and 4. in a 421 format. By restricting the initialization of stages S1–S3 to binary respresentations of base 5 digits (where the most significant digit resides in stage S1) the total initial state of FSR B can never be a member of the 10 states appearing in FSR B during the 10 CPI window period, as shown in FIG. 14.

A second example is herein presented for explanatory purposes. No restriction is placed on the sequence of decimal digits PAN. The secretly selected and privately entered PIN may be any one of the possible sequences of four or more alphanumeric characters provided by PIN input unit 27 in FIG. 1. Thus, the number of possible distinct PAN-PIN combinations that will be entered into a customized Offset Generator is equal to the number of assigned PAN's (which are necessarily different). In the second example the same set of transformations and mappings, feedback networks, and preselected processing functions (associated with processor 45 in FIG. 12) are used. However, a different 20-digit IN is assumed.

Reference is now made to FIG. 15. Therein 20-digit IN, IN transformed, the modulo 5 components of IN transformed, and the modulo 2 components of IN transformed appear in lines a, b, c, and d, respectively. The PAN comprising of 9 digits, PAN transformed, $\hat{P}AN_5$ (the modulo 5 components of PAN transformed), and $\hat{P}AN_2$ (the modulo 2 components of PAN transformed) appear on lines e, f, g and h, respectively. A PIN comprised of eight characters is given in line i. The numerical (representation of) PIN, the numerical PIN transformed, $PIN_5$ (the modulo 5 component of the numerical PIN transformed) and $PIN_2$ (the modulo 2 component of the numerical PIN transformed) are appear on lines j, l, k and m, respectively.

The modulo 5 and the modulo 2 components of successive states of FSR A and FSR C during initialization are tabulated in FIG. 16. The modulo 5 and the modulo 2 components of successive states of FSR A during re-initialization are tabulated in FIG. 17. It should be noted that the initialization of FSR A is designated to have been completed at CPI k=0. In a like manner, the modulo 5 and modulo 2 components of successive states of FSR C during re-initialization are tabulated in FIG. 18.

As shown in FIG. 18, 0 1 1 1 0 0 0 0 0 is stored in stages S2–S10 in the modulo 2 portion of FSR C at CPI 28. During CPI 28–36, these bits, as read from right to left, are serially fed via stage S10 (of register 84 in FIG. 2) to transformation unit 38 in FIG. 12. The succession of bits 0 1 1 1 0 0 0 0 0 is transformed to 1 0 1 1 1 0 1 1 0 whereby the second, third, fifth, eighth, and ninth bit (as read from right to left) are complemented, as they pass through transformation unit 38 to register 35 of FSR B, via multiplexer 90 in FIG. 12. During CPI 37–39, 1 0 0 representing the base 5 digit 4 is supplied to register 35 of FSR B via multiplexer 90, where the right-most bit is supplied first. The binary representation of the base 5 digit 4 is stored in stage S8 (of register 71 in FIG. 2) of the modulo 5 portion of FSR A during CPI 37. For the sake of brevity, states of FSR A and FSR C from CPI 30 through 107 are omitted in FIGS. 17 and 18, respectively.

The 12-bit sequence 1 0 0 1 0 1 1 1 0 1 1 0 is stored in stages S1 S12 of register 35 of FSR B at CPI 40, one CPI after the leftmost bit appears at the input of stage S1. Thus, as indicated in FIG. 19, FSR B is initialized at CPI 40 and assumes a succession of states in accordance with the feedback function given previously, which characterizes a singular, nonlinear FSR, until it assumes the all 1's (terminal) state. FSR B assumes the state 1 1 0 1 1 1 1 0 1 1 0 1 whereby decoder 40 in FIG. 12 supplies an enabling control signal to processor 45 at CPI 113=n-10. During CPI n-10 and 9 successive CPI's, denoted by n-9 through n-1, corresponding $A_i$'s and $C_i$'s (as previously defined) stored in the ith stages of FSR A and FSR C, respectively, are sequentially combined by processor 45 starting with $A_{10}$ and $C_{10}$. The two preselected processing functions as given in the previous example are employed by processor 45 in mapping the contents of FSR A and FSR C into an Offset Number during the 10 CPI window period, shown in FIG. 19. The Offset Number for the PAN, PIN and IN, given in FIG. 15 on lines e, i, and a, respectively, is $$D_1D_2 \ldots D_9D_{10} = 4\ 6\ 4\ 6\ 4\ 9\ 2\ 4\ 3\ 7$$

As shown in the foregoing examples, FSR B participates in the mapping of the contents of FSR A and FSR C (after re-initialization) into an Offset Number.

For a given customized Generator, FSR B insures that the PAN-PIN mapping into an Offset Number is irreversible such that PIN cannot be determined from known PAN - Offset combinations. Let it be assumed that, the digit transformations, realized by transformation units 18, 23 and 28 are one-to-one. That is, the transformation of distinct digits are distinct. Also, the modulo 5 networks associated with the modulo 5 portion of FSR A and FSR C, respectively, yield one-to-one mappings of the present total state to the next state, under subsequently stated conditions, during initialization and re-initialization of the modulo 5 portions of FSR A and FSR C. The total state of the modulo 5 portion of FSR A at CPI k, for example, is defined as $$A^{(5)}_{k-1}\, A^{(5)}_{k-2} \ldots A^{(5)}_{k-10}\, E_{A5}$$

where the external input $E_{A5}$ is included as a component. Distinct total states which disagree in at least 1 of 9 of the leftmost components or in only 1 of the 2 components $$A^{(5)}_{k-10}$$

or $E_{A5}$ are succeeded by distinct states (where only the content of the register is considered) for the feedback networks, characterized in FIGS. 4 and 7. Furthermore, let it be assumed that the preselected processing functions (associated with processor 45 in FIG. 12) have the mathematical structure of a Latin square. The two processing functions, used in the foregoing examples, have such a structure. One processing funcitin is characterized by the table in FIG. 13. The row and column entries correspond to the 10 different decimal values of $A_i$ and $C_i$, respectively. Each decimal digit (0 through 9) appears as an entry represented by $D_i$, a function of $A_i$ and $C_i$, once and only once in each row and each column. The mapping $D_i$ described by the Latin square has a range consisting of the set {0, 1, . . . , 9}. The domain of each argument $A_i$ and $C_i$ is the same as the range of $D_i$. Furthermore, the mapping introduces no biases since each digit in the range appears as an entry an equal number of times namely, ten.

Consideration is now given to the mapping of two hypothetical sets of PAN-PIN combinations, without the inclusion of FSR B in the manner previously described. In each set the PAN's are $10^{10}$ distinct 10-digit numbers. Suppose PIN's are assigned to one set of $10^{10}$ PAN's, such that the $10^{10}$ distinct PAN-PIN combinations result in $10^{10}$ different Offset Numbers. In the second set, suppose PIN's are assigned such that each of the $10^{10}$ distinct PAN-PIN combinations map into the same Offset Number. The two sets of overall mappings are mathematically realizeable with a given Generator.

The insertion of FSR B, as previously described, has the following, "focusing effect" on the first set of PAN-PIN combinations, i.e., the one wherein $10^{10}$ different Offset Numbers are realized. The ten billion ($10^{10}$) distinct PAN-PIN combinations map into less than 8 billion distinct Offset Numbers. Subsets of distinct PAN-PIN combinations map into the same Offset Number. PAN-PIN combinations of disjoint subsets map into distinct Offset Numbers, and the size of these subsets are not uniform. Furthermore, at least 2 billion 10-digit numbers will never appear as Offset Numbers. On the other hand, FSR B has the following "defocusing effect" on the second set of PAN-PIN combinations, wherein, in the absence of FRS B, the same Offset Number would be produced for $10^{10}$ different PIN-PAN combinations. The ten billion ($10^{10}$) distinct PAN-PIN combinations map into more than 6 billion distinct Offset Numbers. Again, disjoint subsets of distinct PAN-PIN combinations that map into the same Offset Number are not of uniform size. Thus, FSR B guarantees that the overall PAN-PIN mapping into Offset Numbers is irreversible. That is, PIN cannot be extracted from a known PAN-Offset Number combination.

A mechanical analog of an Offset Generator will now be described. The set of $10^{10}$ different 10-digit numbers is partitioned into 25 million disjoint subsets such that every 10-digit number belongs to one and only one subset. Each subset therefore contains 400 different numbers which belong to no other subset. Each of the 25 million subsets of 400 10-digit numbers appear on the periphery of a wheel. Twenty five million such wheels have a common axis and each is free to rotate. Consider a second set of 25 million wheels with a totality of $10^{10}$ different 10-digit numbers similarly partioned. The 400 10-digit numbers on each wheel in the first set are distributed on more than one wheel in the second set and visa versa.

One wheel from each set is selected as a function of two arguments as follows:

$$f(PAN, IN) \text{ and } g(PIN, IN), \text{ respectively,}$$

After a wheel from each set is selected, one of 400 10-digit numbers on each is selected as a function of two arguments as follows:

$$F(PAN, IN) \text{ and } G(PIN, IN), \text{ respectively,}$$

Each selected 10-digit number serves as a starting position for its respective wheel. The two wheels are then synchronously rotated for an interval of time which is a function of three arguments as follows:

$$h(PAN, PIN, IN)$$

Two 10-digit numbers corresponding to the terminal positions of each respective wheels are mapped into one of $10^{10}$ possible 10-digit Offset Numbers. That is $$N_A * N_I \rightarrow \text{Offset Number}$$

$N_A$ denotes the terminal number on the selected wheel from wheel set A, associated with PAN, and $N_I$ denotes the terminal number on the selected wheel from wheel set I associated with PIN.

The functions f, g, F, G, h and the mapping * are determined by the manufacturer (by means of off-the-shelf integrated circuit selection) in over $10^{100}$ ways. This consitutes the manufacturer's code MC.

The 20-digit IN is selected by the (card issuing) institution among $10^{20}$ possible 20-digit sequences, as previously discussed. Clearly MC and IN are fixed for all Offset Generators, utilized by a particular institution.

Figure 20:
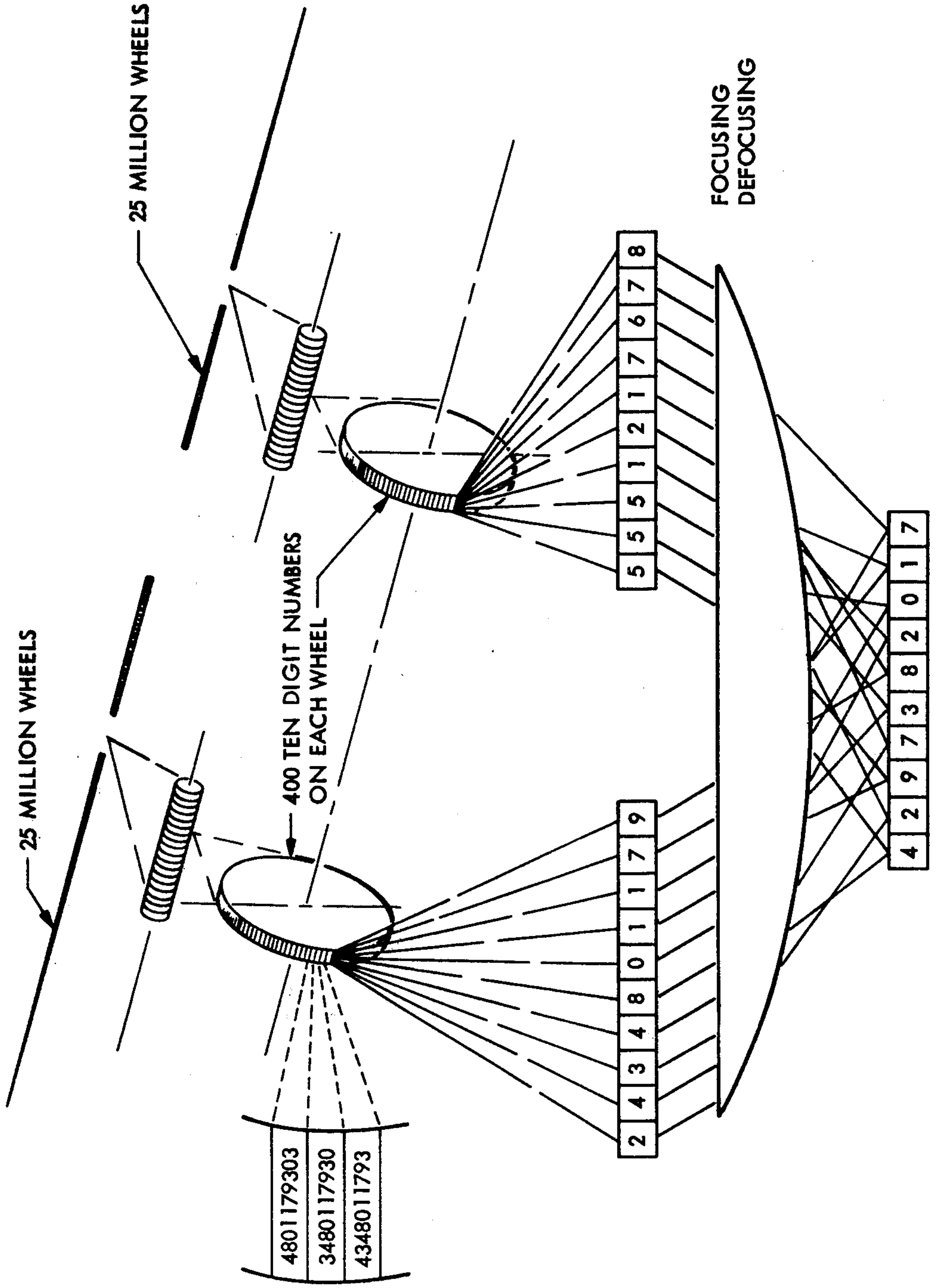
FIG. 20 is a diagram of a mechanical analog, useful in explaining various features of the invention.

The correspondence between the digits of PAN, the digits of PIN, the 20 digits of IN, and the patterns of wheel selection and wheel rotation cannot be reversed. A pictorial representation of the mechanical analog of an Offset Generator (including the focusing/defocusing effect in the mapping of the Offset Number) appears in FIG. 20.

Heretofore, the Offset Generator described accepted representations of alphanumeric information and generated representations of 10-digit decimal Offset Numbers. Transformations and FSR implementations are rellizable for base m representation of an arbitrary length r.

Figure 21:
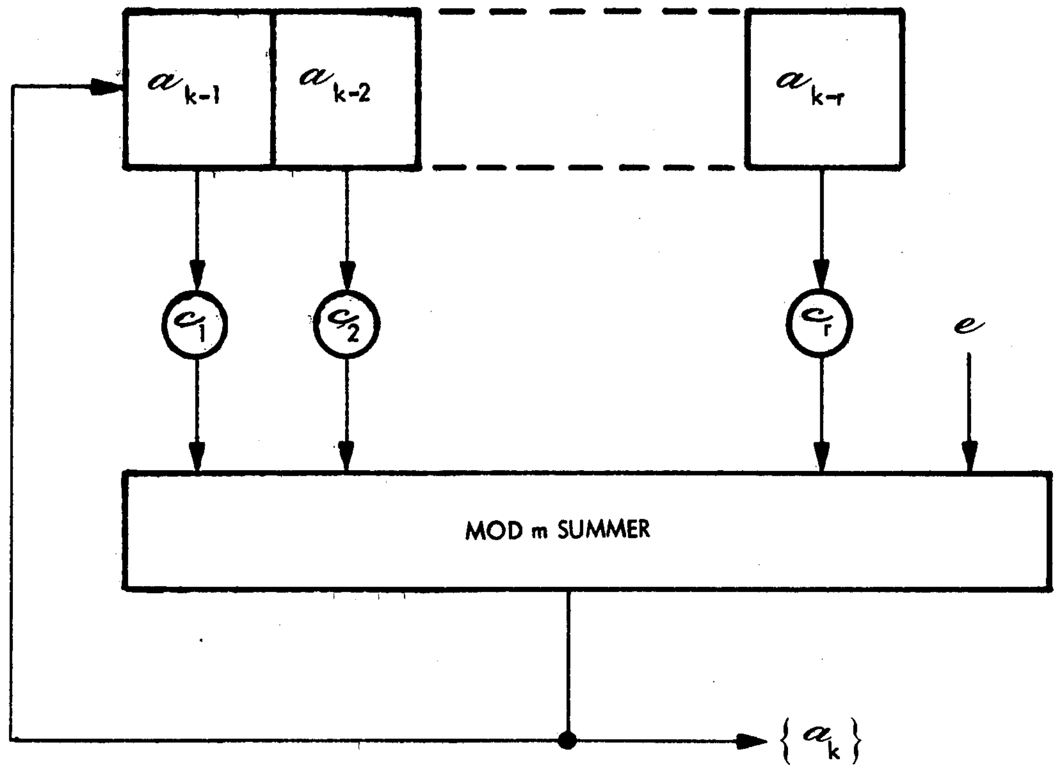
FIG. 21 is a functional block diagram of a Linear m-ary feedback shift register.

Attention is directed to the functional logic diagram of an r-stage FSR in FIG. 21 which is characterized by the following rth order modulo m recurrence relationship.

$$a_k = c_1 a_{k-1} + c_2 a_{k-2} + \dots + c_r a_{k-r} + e \bmod m.$$

Each stage is capable of assuming any one of m states, represented by the base m digits 0, 1, . . . , m−1. The constant multipliers $c_1, C_2, \dots, c_{r-1}$ are selected from the base m digits. Distinct states will have distinct successor states if multiplier $c_r$ and the external constant input e are each relatively prime to m. Two integers are relatively prime if their Greatest Common Divisor (gcd) is 1. For example, 8 and 9 are relatively prime (although neither are prime). That is gcd (8, 9)=1. The values of the constant multipliers $c_1, c_2, \dots, c_r$ for an FSR configuration which yields equal cycles of r-component states are determined from the expansion of the binomial $$(1+(m-l)x)^r = 1 + d_1 x + d_2 x^2 + \dots + d_r x^r \bmod m$$

Each $c_i$ is related to $d_i$ as follows.

$$c_i = (m - d_i) \bmod m \text{ for } 1 \leq i \leq r$$

For example, $$(1+3x)^4 = 1 + 0 \cdot x + 2 \cdot x^2 + 0 \cdot x^3 + 1 \cdot x^4 \bmod 4$$

Thus, $$C_1=0,\ C_2=2,\ C_3=0,\ C_4=3$$

and $$a_k = 2a_{k-2} + 3a_{k-4} + e \bmod 4$$

characterizes a 4-stage FSR which decomposes the totality of $4^4$ (or 256) 4-digit base 4 numbers into cycles of equal length for e=1, 2 or 3. Note that gcd ($c_4$, 4)=1 and gcd (e, 4)=1 where $c_4$=3 and e=1, 2 or 3.

Multipliers $c_1, c_2, \dots, c_r$ in the rth order linear recurrence relationship characterizing equal length modulo 2 FSR cycles are tabulated in FIG. 22 for values of r from 1 through 20. This is repeated for m=3, 4, 5 and 10 in FIGS. 23, 24, 25 and 26, respectively.

The integer m>1 may be uniquely expressed except for order as the product of powers of distinct primes as follows.

$$m = p_1^{s1} p_2^{s2} \dots p_j^{sj} \dots$$

If a particular prime, say $p_j$ is not a factor, then $s_j=0$ and $p_j$ will not appear. The length l of the equal length cycles of a properly configured r-stage modulo m FSR is computed from the prime power factors as follows. Assume $$m=p^s$$

For a given r, determine i such that r+1 satisfies the inequalities $$p^i<r+1\leqq p^{i+1}$$

Then l the length of each cycle of states is $$l=mp^i=p^{s+i}$$

and the total number of cycles is $$N_T=m^r/l=p^{s(r-1)-i}$$

For example, assume r=3 and $m=4=2^2$ (p=2, s=2)

$$2^1<4=2^2$$

Thus $$l=2^{2+1}=8 \text{ and } N_T=4^3/8=8$$

From foregoing discussions a 3rd order linear recurrence relationship for a 3-stage modulo 4 FSR which decomposes the $4^3=64$ state space into 8 cycles of length 8 is $$a_k=3a_{k-1}+a_{k-2}+a_{k-3}+e \bmod 4$$

Note that gcd (e, 4) must be 1. Thus e must be 1 or 3. The 8 cycles of states of length 8 for e=1 are tabulated in FIG. 27. Each 3-place base 4 number appears once and belongs to one and only one cycle of states. The length l of the equal length cycles and the number of cycles $N_T$ for m=2 and values of r from 1 through 20 are tabulated in FIG. 28. This is repeated for m=3, 4 and 5 in FIGS. 29, 30 and 31, respectively. For each $m=p^s$ where $s\leqq 1$, the length of the cycles are constant over the range of values of r where $$p^i\leqq r\leqq p^{i+1}-1$$

Starting at $p^i$, $N_T$ increases $p^s$-fold for each increment of r over the foregoing range of values of r. At the transition from one range to another, increasing r from $$p^{i+1}-1 \text{ to } p^{i+1}$$

results in a p-fold increase in l and $p^{s-1}$-fold increase in $N_T$. If s=1 (i.e., m=p)$p^{s-1}=1$, and no change occurs at the transition from one range to another. See FIGS. 29 through 31.

To determine l and $N_T$ for an m containing two or more prime factors, the following procedure is employed. Assume $$m=p_1^{s1}p_2^{s2}p_3^{s3} \text{ where } s_1, s_2, s_3>0$$

Let $$m_1=p_1^{s1},\ m_2=p_2^{s2} \text{ and } m_3=p_3^{s3}$$

For a given r, first determine $l_1$, $l_2$, and $l_3$, the cycle lengths corresponding to modulo $m_1$, $m_2$ and $m_3$, respectively. Then $$l=l_1l_2l_3 \text{ and } N_T=m^r/l$$

The computation for $N_T$ can also be done as follows.

$$N_{T1}=\frac{m_1}{l_1},\ N_{T2}=\frac{m_2}{l_2} \text{ and } N_{T3}=\frac{m_3}{l_3}$$

and $$N_T=N_{T1}N_{T2}N_{T3}$$

For example, let r=10 and m=10=2·5 ($p_1=2$, $s_1=1$, $p_2=5$, $s_2=1$)

$$2^3<11<2^4 \text{ and } l_1=2^{3+1}=16$$

$$5^1<11<5^2 \text{ and } l_2=5^{1+1}=25$$

$$l=l_1l_2=400$$

$$N_T=10^{10}/400=25 \text{ million}$$

Also $$N_{T1}=2^{10}/2^4=2^6$$

$$N_{T2}=5^{10}/5^5=5^8$$

$$N_T=2^65^8=25 \text{ million.}$$

The length l of the equal length cycles and the number of cycles $N_T$ for m=10 and values of r from 1 through 20 are tabulated in FIG. 32.

The 10th order linear recurrence relationship for a 10-stage modulo 10 FRS which decomposes the $10^{10}$ state space into 25 million cycles of length 400 is $$A_k=5A_{k-2}+2A_{k-5}+5A_{k-8}+9A_{k-10}+e \bmod 10.$$

The multipliers $c_1$ through $c_{10}$ appear in the enclosed row labeled r=10 in FIG. 26. Since gcd (e, 10)=1, the external constant input e must be 1, 3, 7 or 9. The implementation of the 10-stage modulo 10 FSR with binary devices would require 4 10-stage binary registers where the ith stage of each register stores an 8 4 2 1 binary representation of $A_{k-i}$. Also required is an implementation of the switching function $$A_k=f(A_{k-2}, A_{k-5}, A_{k-8}, A_{k-10}, e)$$

which is 4 simultaneous switching functions of 20 switching variables (i.e., $A_k$ and each argument is represented by 4 switching variables). Since m=10=2·5, the foregoing linear recurrence relationship may be decomposed as follows $$A_k^{(5)}=2A_{k-5}^{(5)}+4A_{k-10}^{(5)}+e_5 \bmod 5$$

$$A_k^{(2)}=A_{k-2}^{(2)}+A_{k-8}^{(2)}+A_{k-10}^{(2)}+e_2 \bmod 2$$

These result from reducing each term of the modulo 10 relationship modulo 5 and modulo 2, respectively. The reduction of e (a base 10 digit) for each of the 4 possible constant values where gcd (e, 10)=1 is as follows.

| | | | | |
|---|---|---|---|---|
| e | 1 | 3 | 7 | 9 |
| $e_5$ | 1 | 3 | 2 | 4 |
| $e_2$ | 1 | 1 | 1 | 1 |

Note that $e_5$=e mod 5 and $e_2$=e mod 2. Furthermore gcd ($e_5$, 5)=gcd ($e_2$, 2)=1. Thus the expressions $A_k^{(5)}$ and $A_k^{(2)}$ characterize the 10-stage modulo 10 FSR decomposed into a 10-stage modulo 5 FSR and a 10-stage modulo 2 FSR, respectively. The multipliers for each appear in the enclosed row labeled r=10 in FIGS. 25 and 22, respectively. The behavior of the 10-stage decomposed modulo 10 FSR was fully described in connection with the operation of FSR A and FSR C. Decomposition reduces the complexity of the feedback function $A_k$ as follows.

$$A_k^{(5)} = g(A_{k-5}^{(5)}, A_{k-10}^{(5)}, e_5)$$

$$A_k^{(2)} = h(A_{k-2}^{(2)}, A_{k-8}^{(2)}, A_{k-10}^{(2)}, e_2)$$

The 4 simultaneous switching functions of 20 switching variables associated with $A_k$ are reduced to 3 simultaneous switching functions of 9 switching variables associated with $A_k^{(5)}$ and a single switching function of 4 switching variables associated with $A_k^{(2)}$. Recall that $$A_k^{(5)} = 2A_{k-5}^{(5)} + 4A_{k-10}^{(5)} + e_2 \bmod 5$$

characterizes the output of the modulo 5 feedback network 72 (associated with the modulo 5 portion of FSR A) in FIG. 2 only when $E_{A5}$ is 0. In FIG. 4, entries under $E_{A5}=0$ are $A_k^{(5)}$ where $$A_k^{(5)} = 2A_{k-5}^{(5)} + 4A_{k-10}^{(5)} + 2 \bmod 5$$

(i.e., $e_5=2$). All other entries of $A_k^{(5)}$ under nonzero values of $E_{A5}$ are in general nonlinear recurrence relations with arguments $$A_{k-5}^{(5)}, A_{k-10}^{(5)} \text{ and } E_{A5}.$$

Similarly $$C_k^{(5)} = 2C_{k-5}^{(5)} + 4C_{k-10}^{(5)} + e_5 \bmod 5$$

characterizes the output of the modulo 5 feedback network 82 (associated with the modulo 5 portion of FSR C) in FIG. 2 only when $E_{C5}=0$. In FIG. 7 entries under $E_{C5}=0$ are $C_k^{(5)}$ where $$C_k^{(5)} = 2C_{k-5}^{(5)} + 4C_{k-10}^{(5)} + 1 \bmod 5$$

(i.e., $e_5=1$). All other values of $C_k^{(5)}$ are in general nonlinear recurrence relations with arguments $$A_{k-5}^{(5)}, A_{k-10}^{(5)}$$

and $E_{C5}$.

It will be appreciated by those familiar with the art that an r-stage modulo m FSR can map external m-ary input sequences into r-place base m numbers and autonomously generate equal length m-ary cycles of states (representable as r-place base m numbers). Furthermore, the r-stage modulo m FSR can be implemented with binary switching elements and $2_j$ binary registers where $$2^{j-1} < m < 2^j$$

By decomposing the modulo m FSR into modulo $p_i^{si}$ FSR's (where $p_i^{si}$ are prime power factors of m), an overall reduction in the complexity of the feedback network is realizable. Furthermore, for many values of m the number of binary registers required is identical for the decomposed and nondecomposed versions of the modulo m FSR as is the case for m=10.

The modulo 5 feedback networks 72 and 82, shown in FIG. 2 are both implementable with Read Only Memories (ROM's) where the ROM's are realizations of 3 switching functions of 9 switching variables. Attention is directed to FIG. 4 which specifies one possible modulo 5 feedback network for FSR A. The column of entries for $A_k^{(5)}$ under $E_{A5}$ equal to 0 is directly related to the choice of $e_5$ namely, 1, 2, 3 or 4. Thus, there are exactly 4 distinct sets of base 5 values, $A_k^{(5)}$, under $E_{A5}$ equal to 0, can assume. Each corresponds to a different decomposition of $5^{10}$ (9,765,625) 10-place base 5 numbers representing states into $5^8$ (390,625) cycles of length 25 as given in FIG. 31. The remaining entries for $A_k^{(5)}$ are chosen such that distinct total states $$(A_{k-1}^{(5)} A_{k-2}^{(5)} \ldots A_{k-10}^{(5)} E_{A5})$$

which disagree in at least 1 of 9 of the leftmost components or only 1 of the 2 components $$A_{k-10}^{(5)}$$

or $E_{A5}$ are succeeded by distinct states (where only the content of the register is considered). The total number of ways the 125 entries for $A_k^{(5)}$ can be selected whereby previously described distinct total states are succeeded by distinct register states is $$4[(43)(42)(41)(40)]^5 > 9 \times 10^{32}$$

Thus, the modulo 5 feedback network (e.g., ROM) associated with FSR A can be any one among a number exceeding $9\times10^{32}$. Similarly the modulo 5 feedback network associated with FSR C can be among a number exceeding $9\times10^{32}$.

The modulo 2 feedback networks 75 and 85, shown in FIG. 2 are unique modulo 2 summers characterized by the 10th order linear recurrence relationships $$A_k^{(2)} = (A_{k-2}^{(2)} + A_{k-8}^{(2)} + A_{k-10}^{(2)} + 1 + E_{A2}) \bmod 2 \text{ and}$$

$$C_k^{(2)} = (C_{k-2}^{(2)} + C_{k-8}^{(2)} + C_{k-10}^{(2)} + 1 + E_{C2}) \bmod 2$$

respectively. Distinct modulo 2 total states which diagree in at least 1 of 9 of the leftmost components or only 1 of the 2 rightmost components, have distinct successor (register) states, and the linear relationships hold for both values (i.e., 0 and 1) of the external inputs ($E_{A2}$ and $E_{C2}$). Equal length cycles result when the external input $E_{A2}$ (for $A_k^{(2)}$) and $E_{C2}$ is 0. This corresponds to a unique decomposition of $2^{10}$ (1,024) 10-place base 2 numbers representing states into $2^6$ (64) cycles of length 16 as given in FIG. 28. The constant external input 1 (when $E_{A2}$ and $E_{C2}$ are 0) is $e_2$ which is relatively prime to 2—i.e., gcd (1,2)=1—as required.

Figure 33:
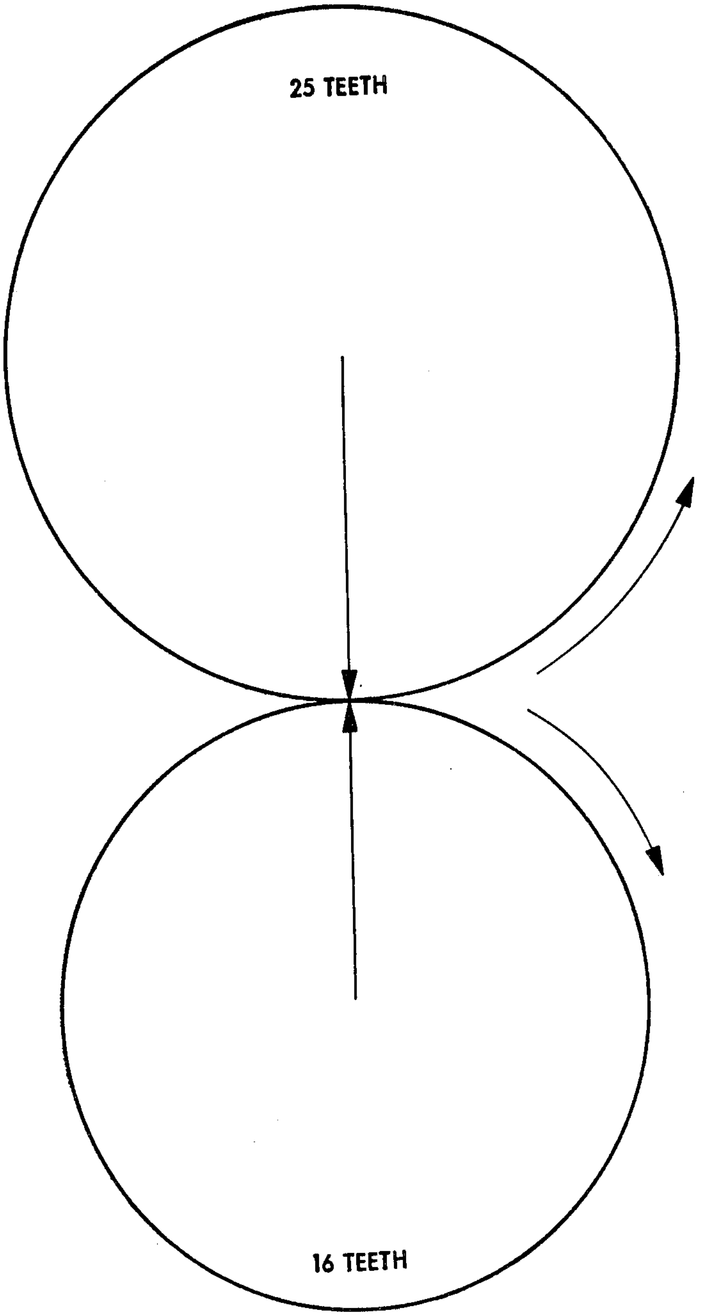
FIG. 33 is a diagram of a mechanical analog of decomposing a modulo 10 feedback shift register into modulo 5 and modulo 2 feedback shift registers.

A mechanical analog of a modulo 10 FSR synthesized with a modulo 5 and a modulo 2 FSR is shown in FIG. 33. The mechanical analog corresponds to a 10-stage FSR that generates equal length cycles of states of length 400. It is comprised of a pair of meshed gears. The larger gear has 25 gear teeth corresponding to the 25 states of a cycle of a 10-stage modulo 5 FSR that generates equal length cycles of states of length 25. The smaller gear has 16 teeth corresponding to the 16 states of a cycle of a 10-stage modulo 2 FSR that generates equal length cycles of states of length 16. The teeth at the point of contact each represent the current state of their respective FSR's. The initial state of an FSR is represented by the tooth joined to gear's center by a scribe line. The alignment of the two scribe lines corresponds to the FSR's being in or returning to their initial states. Given that the scribe lines are aligned (i.e., the two FSR's are in their initial state), the number of teeth (of each gear) that must pass the point of contact before realignment of the scribe lines corresponds to cycle length of the synthesized modulo 10 FSR. This is equal to the Least Common Multiple (LCM) of 25 and 16. Since 25 to 16 are relatively prime (i.e., gcd (25,16)=1), LCM (25,16) is equal to the product of 25 and 16 or 400. The pair of meshed gears whose ordered pairs of teeth in contact represent a 10-place base 10 number corresponds to one of the 25 million wheels in FIG. 20 with 400 10-place base 10 numbers on its periphery.

Figures 34, 35:
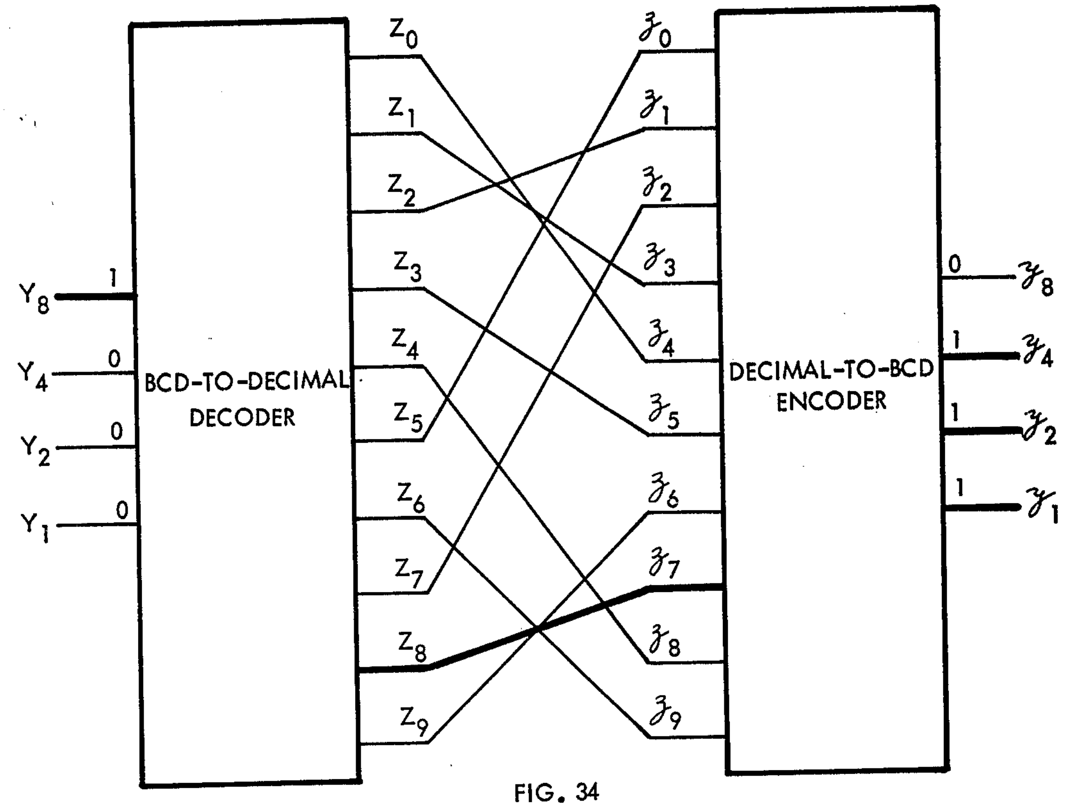
Figures 36, 37:
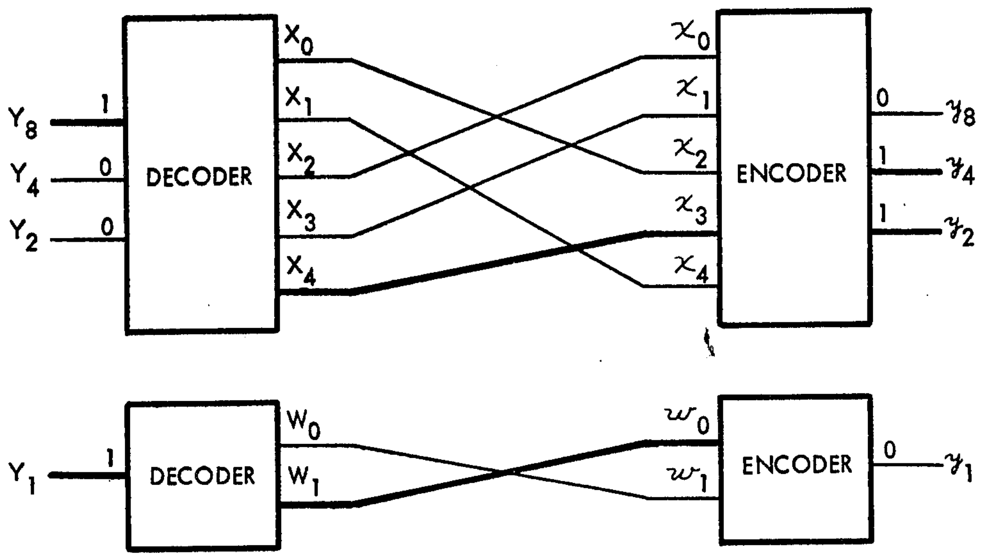

The digit transformation units 18, 23 and 28 shown in FIG. 1, can be realized for any base m number system. Base 10 digit transformations are herein specifically discussed. Let $Y_8Y_4Y_2Y_1$ denote the binary representation of decimal digit in an 8 4 2 1 format. The binary representation of the transformed decimal digit (also in an 8 4 2 1 format) is denoted by $y_8y_4y_2y_1$. Each of the digit transformations is a one-to-one onto transformation on the set of decimal digits. Refer to FIG. 34. The Binary Coded Decimal (BCD)-to-decimal decoder accepts $Y_8Y_4Y_2Y_1$ as an input. If the input represents the decimal digit i, then $Z_i$ among the 10 outputs $Z_0$, $Z_1$, . . . , $Z_9$ and only $Z_i$ assumes a state-value of 1. All other outputs assume a state-value of 0. The decimal-to-BCD encoder accepts $z_0z_1 \ldots z_9$ as an input where one and only one of the components is at state-value 1, say $z_j$. All other components are at state-value 0 and the output $y_8y_4y_2y_1$ represents the decimal digit j in an 8 4 2 1 format. By connecting each output of the BCD-to-decimal decoder to one and only one input of the decimal-to-BCD encoder a particular one-to-one onto transformation on the set of decimal digits is realized. The transformation in FIG. 34 represents one of $$10! = 3{,}628{,}800$$

possible one-to-one onto transformations on a set of decimal digits. The transformation of 1 0 0 0 to 0 1 1 1 (i.e., decimal 8 to 7) is illustrated. Heavily drawn input lines correspond to state-values of 1. All other inputs and outputs are at state-value 0. This particular configuration transforms representations of the decimal digits 0,1,2,3,4,5,6,7,8 and 9 to 4,3,1,5,8,0,9,2,7 and 6, respectively. Corresponding inputs and outputs of the BCD-to-decimal decoder and decimal-to-BCD encoder are tabulated in FIG. 35 for the configuration in FIG. 34. The one-to-one onto transformations on the set of decimal digits can be synthesized from base 5 and base 2 digit transformations as shown in FIG. 36. The binary representation of a decimal digit $Y_3Y_4Y_2Y_1$ is partitioned into $Y_8Y_4Y_2$ and $Y_1$. The former is the representation of a base 5 digit in a 4 2 1 format, whereas the latter is a representation of a base 2 digit. A binary-to-base 5 decoder accepts $Y_8Y_4Y_2$ as an input. If the input represents the base 5 digit i, then $X_i$ (among the 5 outputs $X_0$, $X_1$, . . . $X_4$) and only $X_i$ assumes a state-value of 1. All other outputs assume a state-value of 0. The base 5-to-binary encoder accepts $x_0\ x_1 \ldots x_4$ as an input where only one of the components is at state-value 1, say $x_j$. All other inputs are at state-value 0 and the output $y_8y_4y_2$ represents the base 5 digit j in a 4 2 1 format. By connecting each output of the decoder to one and only one input of the encoder, a particular one-to-one onto transformation on the set of base 5 digits is realized. Similarly, the binary-to-base 2 decoder accepts $Y_1$ as an input. If $Y_1$ is 0, then $W_0=1$ and $W_1=0$. If $Y_1$ is 1, then $W_1=0$ and $W_0=1$. The base 2-to-binary decoder accepts $W_0W_1=10$ or 10 as an input and supplies the output $y_1=0$ or 1, respectively. The input combination $(Y_8Y_4Y_2)\ Y_1$ to the decoders represents a decimal digit D. Whereas the output combination $(y_8y_4y_2)\ y_1$ represents the transformed decimal digit d. The transformation of 1 0 0 1 to 0 1 1 0 (i.e., decimal 9 to 6) is illustrated in FIG. 36. The configuration is one of $$5!2! = 240$$

possible one-to-one onto transformations on a set of decimal digits signthesized from the partitioned base 2 and base 2 transformations. Note that partitioned transformations offer a reduction in the complexity of implementation of the expense of a significant reduction in the number of realizable one-to-one onto transformations. Corresponding inputs and outputs of the base 5 and base 2 decoders and encoders are tabulated in FIG. 37. The resulting (synthesized) transformation is tabulated in FIG. 38 where $D=2X+W$ and $2X+W=d$.

Figure 39:
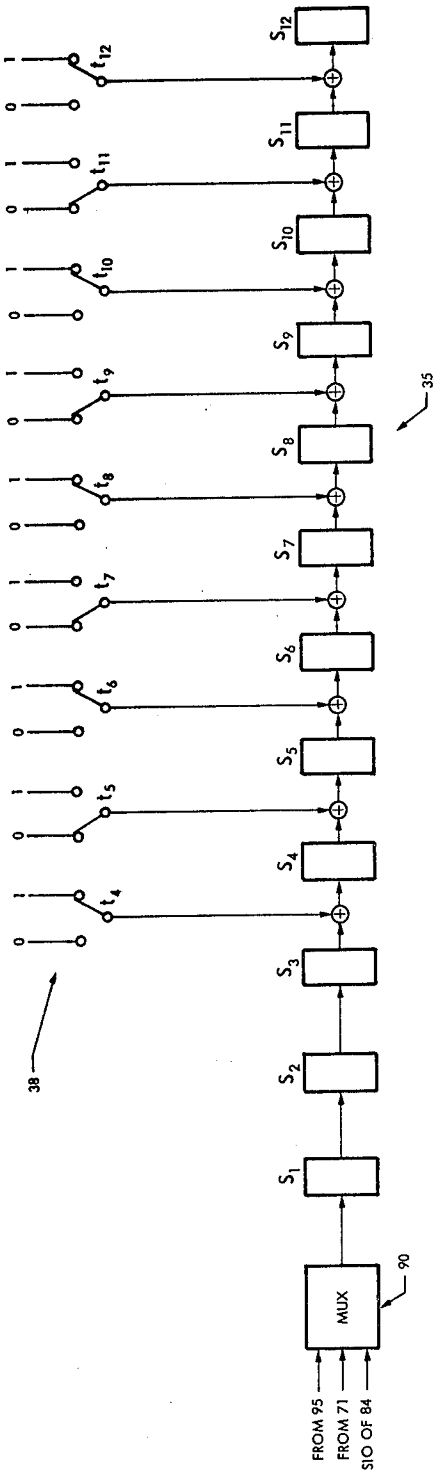
FIG. 39 is a block diagram of a control feedback shift register with a switching transformation arrangement.

Consider the bit serial transformation unit 38 appearing in FIG. 1 and 12. For explanation purposes, transformation unit 38 was shown separately from register 35 of FSR B. Attention is now directed to FIG. 39, where transformation unit 38 and register 35 are integrated. Transformation unit 38 is comprised of nine fixed switches $t_4$ through $t_{12}$ whose poles are respectively connected to the nine Exclusive-OR gates whose outputs are respective inputs to stages $S_4$ through $S_{12}$ of register 35. Each of the other inputs to the nine Exclusive-OR gates are the outputs of stages $S_3$ through $S_{11}$, respectively. As previously discussed, 9 bits are serially shifted from $S_{10}$ of register 84 (the modulo 2 portion of FSR C) via multiplexer 90 during CPI 28 through 36. During CPI 37, 38 and 39, three bits stored in register 71 of FSR A and representing a particular base 5 digit are successively supplied to register 35 via multiplexer 90. With reference to the integrated transformation unit 38 and register 35, let $X_4$, $X_5$, . . . $X_{12}$ represent the bits emanating from $S_{10}$ of register 84. Let $X_1$, $X_2$, $X_3$ represent the bits emanating from register 71 (and which were stored in stage S8 during CPI 37). Bit $X_{12}$ enters register 35 first and ultimately initializes stage S12. If switch $t_i$ is in the left position, $t_i$ is at state-value 0 and each bit entering stage Si from stage S(i-1) is unchanged. If switch $t_i$ is in the right position, $t_i$ is at state-value 1 and each bit entering Si from stage S(i-1) is complemented. Let $$T_4 = t_4$$

$$T_5 = t_4 + t_5$$

$$T_6 = t_4 + t_5 + t_6$$

$$\vdots \qquad \vdots$$

$$T_{12} = t_4 + t_5 + t_6 + \ldots t_{12}$$

where summations are reduced modulo 2. The contents of stages S1 through S12 after initialization are $X_1, X_2, X_3, X_4+T_4, X_5+T_5, \ldots, X_{12}+T_{12}$ The fixed switch setting in FIG. 39 corresponds to $$t_4t_5 \ldots t_{12}=1\,0\,1\,0\,1\,1\,1\,0\,1$$

Thus $$T_4T_5 \ldots T_{12}=1\,1\,0\,0\,1\,0\,1\,1\,0$$

and $$X_4X_5 \ldots X_{12}=0\,0\,0\,1\,0\,0\,0\,1\,1$$

is transformed to 1 1 0 1 1 0 1 0 1 as shown in the first of two previous examples. Note that distinct 9 bit strings are transformed onto distinct 9 bit strings. Thus the transformation realized by transformation unit 38 is a one-to-one onto transformation. Furthermore, the fixed switch setting represents one of $$2^9=512$$

possible bit serial transformations.

It remains to enumerate the number of ways corresponding $A_i$'s (of FSR A) and $C_i$'s (of FSR C) can be combined by processor 45 (shown in FIG. 1 and 12) to yield Offset digits $D_i$. Two preselected processing functions were utilized in connection with the two examples presented. One used in the generation of $D_{10}$ involved the synthesized modulo 10 FSR's feedback digit during the generation of equal length cycles. Thus the number of ways $D_{10}$ can be thus derived is equal to the number of ways modulo 10 equal length cycles can be derived. The remaining Offset digits $D_i$ are mapped from corresponding $A_i$'s and $C_i$'s in accordance with a mathematical structure known as a Latin square. The 10 by 10 array in FIG. 13 as previously indicated is an example of a Latin square. Each of the 10 decimal digits appears as an entry in each row and column exactly once. This is known as a Latin square of order 10. The number of distinct Latin squares of order 10 has not yet been enumerated. It is known that the number of distinct Latin squares of order n, namely $L_n$ is $$L_n=n!(n-1)!R_n$$

where $R_n$ is the number of reduced Latin squares of order n. A reduced Latin square of order n has the entries in the first row and first column in natural order (i.e., 0, 1, . . . , n−1). $R_n$ has been determined for values of n from 1 through 9. These are tabulated in FIG. 40. $R_9$ in factored form is $$R_9=(2^{21})(3^2)(5{,}231)(3{,}824{,}477)$$

Multiplying $R_9$ by (9!) (8!)

where $9!=362{,}880$ and $8!=40{,}320$ gives $L_9$ the number of distinct Latin squares of order 9. Though $L_{10}$ has not yet been determined the lower bound of $L_{10}$ is known. That is $$L_{10} \geqq (10!)(9!) \ldots (2!)=6.586\times 10^{27}$$

The mappings characterized by Latin squares of order 10 of order pairs ($A_i$, $C_i$) into $D_i$ can be realized by 8-in by 4-out ROM's.

Referring again to FIG. 1, the output of processor 45, which is the Offset Number, is supplied to the output Unit 46. As previously stated, the latter may include display means to display the Offset Number and/or means for recording the Offset Number on the magnetic stripe of the card. Thus, the card is assumed to have both the PAN and the Offset Number recorded thereon. If desired, the card's expiration date and other information may be recorded on the card.

Figure 41:
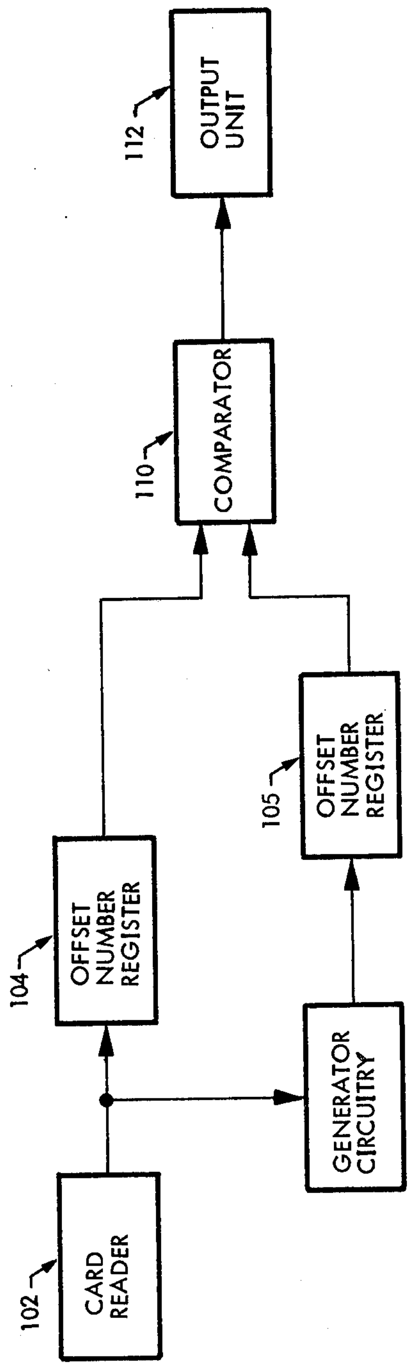
FIG. 41 is a simplified block diagram of a verifier in accordance with the invention.

When the card is to be used, it is inserted into a Card Verifier or simply a Verifier which in most aspects is similiar to the Generator, heretofore described. The Verifier, shown in FIG. 41, includes circuitry identical to all the circuitry shown in FIG. 1, except for the input PAN Unit 21 and the output unit 46. This circuitry is represented in FIG. 41 by the box, designated Generator Circuitry.

Instead of input PAN Unit 21, the verifier includes a card reader 102, whose function is to read automatically the Offset Number, the PAN and any other information recorded on the magnetic stripe when the card is inserted. Once the card is inserted, digits of the Offset Number which are read out are supplied to an Offset Number register 104, wherein it is stored for use, as will be described hereafter. The digits of the PAN which are readout are sequentially supplied to the transformation unit 23 (See FIG. 1) and are ultimately stored in FSR A, as heretofore described. The latter-mentioned elements are in the block, designated Generator Circuitry.

As to the IN, it is entered into Verifier by one or more of the officers of the institution before the Verifier is enabled and can be used. Thus, the IN is present in storage unit 15. The entering of the PAN takes place, asynchronously, controlled by clock pulses which are derived from recorded digital information by the card reader, when the card is read.

The card user enters a PIN via Unit 27 (see FIG. 1) wherein after transformation it is stored in FSR C, as heretofore described. Only after both the PAN and PIN are in registers A and C respectively, does the Verifier enter the synchronous mode, and generate an Offset Number which is stored in a second Offset Number register 105. When the latter is loaded with the entire Offset Number a comparator 110, to which the two Offset Numbers in registers 104 and 105 are supplied, is activated. It compares both Offset Numbers in registers 104 and 105. Only if the two are identical does comparator 110 supply a verification signal to output Unit 112. On the other hand, if the two are not identical a signal is supplied indicating the absence of identity.

To determine the PIN from the PAN and Offset Number is impossible, particularly due to the focusing and defocusing effects which is produced by the incorporation of FSR B, as heretofore described. Even without FSR B, without the various transformation units and even if the transformed IN in storage unit 15 were known, with multistage FSR A and FSR C, the task of determining the secret PIN of the original card owner from the recorded PAN and Offset Number requires the posession of a generator or verifier and is so time consuming, as to be impossible or at least highly unprofitable.

If desired the output Unit 112, in addition to providing an indication whether the two Offset Numbers are identical or not may display other information recorded on the card's magnetic stripe, such as card expiration date, parity errors in the recorded digital information or any other information of interest.

It should be pointed out that a person may choose and use the same PIN, when obtaining cards of different institutions; However, the Offset Number is related to PAN, assigned by the institution, IN secretly selected by the institution as well as the card user's secretly selected PIN through a unique set of transformations and mappings. This relationship is unique to the institution and is guaranteed by the unique set of transformations and mappings. Thus, even if a person may choose the same PIN, for each card a different Offset Number will result.

It should be appreciated that the foregoing description is of preferred embodiments. The FSR B is incorporated to provide focusing and defocusing effects so that the process becomes irreversible. That is, it is impossible to determine the secret PIN from the known Offset Number and the PAN, even if the transformed IN were known. Also, the various transformation units such as units 18, 23 and 28 which transform the entered IN, PAN and PIN, respectively, were added to further enhance the system's operation. It should be clear, however, that if a level of protection, less than that achievable with any of the preferred embodiments, is acceptable, one or more of the features which provide the added system protection may be eliminated. For example, FSR B may be eliminated. In such a case, once PAN and PIN are entered into FSR A and C respectively, and the system enters the synchronous mode, processor 45 may be activated, at any selected CPI during the synchronous operation, to produce the Offset Number. Also, the mapping of the Offset Number from the PAN and PIN may be performed other than heretofore described, i.e. other than with the Latin square. For example, corresponding digits in FSR A and FSR C may be multiplied and reduced modulo 10, to represent the digits (Di) of the Offset Number. Such a mapping, unlike that characterized by a Latin Square would be a many-to-one into mapping. If desired, all or several of the transformation units may be eliminated. Likewise, if desired the use of an IN may be eliminated.

Although particular embodiments of the invention have been described and illustrated herein, it is recognized that modifications and equivalents may readily occur to those skilled in the art and, consequently, it is intended that the claims be interpreted to cover such modifications and equivalents.

What is claimed is:

1. For use in a personal identification system of the type in which a card is issued to a person by an entity with a personal assigned number, definable as PAN, being recorded on a machine readable magnetic stripe on the card, a generator for generating an Offset Number which is a function of at least said PAN and a secret code in the form of a digital sequence secretly chosen by and known only by said person, definable as PIN, said generator comprising:

first means including first feedback shift register means and interconnected feedback means adapted to assume cycles of states of equal length;

second means including feedback shift register means and interconnected feedback means adapted to assume cycles of states of equal length;

input means for storing digits related to PAN in said first feedback register means and digits related to PIN in said second feedback register means; and control means for utilizing at least some of the digits in said first and second feedback shift register means to generate an Offset Number after digits related to said PAN and PIN were stored in said first and second feedback shift registers.

2. A generator as recited in claim 1 wherein said input means include means for transforming the digits of at least one of said PAN and PIN into transformed digits prior to storing them in said feedback shift register means.

3. A generator as recited in claim 1 further including third means including third register means for storing digits related to a sequence of digits definable as IN, and said control means include means for utilizing selected ones of the digits in said third register means to control the digits stored in said first and second feedback shift register means, prior to utilizing the digits in said latter mentioned register means to generate said Offset Number.

4. A generator as recited in claim 3 wherein each of said first and second feedback shift register means in r stages long where r is an integer, and wherein said third register means is 2r stages long, with said control means utilizing the digits in said third register means to control the digits in each of said first and second feedback shift register means.

5. A generator as recited in claim 1 wherein both the PAN and PIN digits are modulo m digits and each of said first and second feedback shift register means is modulo m, and is r stages long.

6. A generator as recited in claim 5 wherein m is equal to the product of primes, definable as $p_1^{s1}p_2^{s2}\ldots p_j^{sj}$, wherein $p_1^{s1}=m_1$, $p_2^{s2}=m_2\ldots p_j^{sj}=m_j$ and each of said modulo m feedback shift registers being implementable by $m_1\, m_2\ldots m_j$ portions where each $m_i$, where i is 1, 2 . . . j is implementable by $n_i$ binary feedback shift registers where $n_i$ satisfies the inequalities $2^{ni-1}<m_i\leqq 2^{ni}$.

7. A generator as recited in claim 5 wherein $m=p^s$, p being a prime and s is an integer not less than one, each of said first and second feedback shift registers being implementable with n binary feedback shift registers where n satifies the inequalities $2^{n-1}<m\leqq 2^n$.

8. A generator as recited in claim 5 wherein $m=m_1m_2, m_1=p_1^{s1}$ and $m_2=p_2^{s2}$ where $p_1$ and $p_2$ are different primes and each of $s_1$ and $s_2$ is an integer not less than one, each of said modulo m feedback shift registers being implementable by $m_1$ and $m_2$ portions where $m_1$ is implementable by $n_1$ binary feedback shift registers where $n_1$ satifies the inequalities $2^{n1-1}<m_1\leqq 2^{n1}$ and the $m_2$ portion is implementable with $n_2$ binary feedback shift registers where $n_2$ satisfies the inequalities $2^{n2-1}<m_2\leqq 2^{n2}$.

9. A generator as recited in claim 5 further including a third modulo m feedback shift register means of 2r stages for storing modulo m digits related to a sequence of digits definable as IN, and said control means include means for utilizing the digits stored in said third register means to control the digits stored in said first and second feedback shift register means, prior to utilizing the digits in said latter mentioned register means to generate said Offset Number.

10. A generator as recited in claim 9 wherein m is equal to the product of primes, definable as $p_1^{s1}p_2^{s2}\ldots p_j^{sj}$, wherein $p_1^{s1}=m_1$, $p_2^{s2}=m_2\ldots p_j^{sj}=m_j$ and each of said modulo m feedback shift registers being implementable by $m_1\, m_2\ldots m_j$ portions where each $m_i$, where i is 1,2 . . . j is implementable by $n_i$ binary feedback shift registers where $n_i$ satisfies the inequalities $2^{n_i-1}<m_i \leq 2^{n_i}$.

11. A generator as recited in claim 9 wherein $m=m_1m_2, m_1=p_1^{s1}$ and $m_2=p_2^{s2}$ where $p_1$ and $p_2$ are different primes and each of $s_1$ and $s_2$ is an integer not less than one, each of said modulo m feedback shift registers being implementable by $m_1$ and $m_2$ portions where $m_1$ is implementable by $n_1$ binary feedback shift registers where $n_1$ satisfies the inequalities $2^{n1-1}<m_1<2^{n1}$ and the $m_2$ portion is implementable with $n_2$ binary feedback shift registers where $n_2$ satisfies the inequalities $2^{n2-1}<m_2 \leq 2^{n2}$.

12. A generator as recited in claim 9 wherein said input means include means for transforming the digits of at least one of said PAN, PIN and IN into transformed digits prior to storing them in said shift register means.

13. A generator as recited in claim 5 wherein said generator further includes a control feedback shift register adapted to cycle through a selected cycle of states, means for initializing said control feedback shift register with selected digits of the digits stored in at least one of said first and second feedback shift registers, and means included in said control means for utilizing digits in said first and second feedback shift register means to generate said Offset Number only when said control feedback shift register is in preselected states of said cycle.

14. A generator as recited in claim 13 wherein m is equal to the product of primes, definable as $p_1^{s1}p_2^{s2} \ldots p_j^{sj}$, wherein $p_1^{s1}=m_1$, $p_2^{s2}=m_2 \ldots p_j^{sj}=m_j$ and each of said modulo m feedback shift registers being implementable by $m_1 m_2 \ldots m_j$ portions where each $m_i$, where i is 1,2 . . . j is implementable by $n_i$ binary feedback shift registers where $n_i$ satisfies the inequalities $2^{n_i-1}<m_i \leq 2^{n_i}$.

15. A generator as recited in claim 13 wherein $m=m_1m_2$, $m_1=p_1^{s1}$ and $m_2=p_2^{s2}$ where $p_1$ and $p_2$ are different primes and each of $s_1$ and $s_2$ is an integer not less than one, each of said modulo m feedback shift registers being implementable by $m_1$ and $m_2$ portions where $m_1$ is implementable by $n_1$ binary feedback shift registers where $n_1$ satisfies the inequalities $2^{n1-1}<m_1 \leq 2^{n1}$ and the $m_2$ portion is implementable with $n_2$ binary feedback shift registers where $n_2$ satisfies the inequalities $2^{n2-1}<m_2 \leq 2^{n2}$.

16. A generator as recited in claim 13 further including a third modulo m feedback shift register means of 2r stages for storing modulo m digits related to a sequence of digits definable as IN, and said control means include means for utilizing the digits stored in said third register means to control the digits stored in said first and second feedback shift register means, prior to utilizing the digits in said latter mentioned register means to generate said Offset Number.

17. A generator as recited in claim 16 wherein m is equal to the product of primes, definable as $p_1^{s1}p_2^{S2} \ldots p_j^{sj}$, wherein $p_1^{s1}=m_1$, $p_2^{s2}=m_2 \ldots p_j^{sj}=m_j$ and each of said modulo m feedback shift registers being implementable by $m_1 m_2 \ldots m_j$ portions where each $m_i$, where i is 1,2 . . . j is implementable by $n_i$ binary feedback shift registers where $n_i$ satisfies the inequalities $2^{n_i-1}<m_i \leq 2^{n_i}$.

18. A generator as recited in claim 16 wherein $m=m_1m_2$, $m_1=p_1^{s1}$ and $m_2=p_2^{s2}$ where $p_1$ and $p_2$ are different primes and each of $s_1$ and $s_2$ is an integer not less than one, each of said modulo m feedback shift registers being implementable by $m_1$ and $m_2$ portions where $m_1$ is implementable by $n_1$ binary feedback shift registers where $n_1$ satisfies the inequalities $2^{n1-1}<m_1 \leq 2^{n1}$ and the $m_2$ portion is implementable with $n_2$ binary feedback shift registers where $n_2$ satisfies the inequalities $2^{n2-1}<m_2 \leq 2^{n2}$.

19. A generator as recited in claim 13 wherein said input means include means for transforming the digits of at least one of said PAN, PIN and IN into transformed digits prior to storing them in said shift register means.

20. For use in a card identification system of the type in which a card user is assigned a user number, which is recorded on a machine readable magnetic stripe on a card, to be issued to the user by an entity, a generator for generating an Offset Number which is a function of at least said user number and a secret alphanumeric sequence, which the card user chooses and is known only to him, said generator comprising:

first circuit means including first register means and first input means, the latter being responsive to manual actuation thereof, representing a user number, and first means for transferring to said first register means for storage therein, digits which are a function of the user number;

second circuit means including second register means and second input means, the latter being responsive to manual actuation thereof, representing said user secret alphanumeric sequence, which need not be disclosed by the user to anyone for the operation of said generator, and second means for transferring to said second register means digits which are a function of said secret number for storage therein, said first and second register means being feedback shift registers with feedback means so that they assume cycles of states of equal length, and;

control circuit means operable when all the digits corresponding to said user number and said secret alphanumeric sequence were supplied to said first and second register means respectively, for utilizing at least some of the digits in each of said register means for generating an Offset Number as a function thereof.

21. A generator as described in claim 20 wherein said generator further includes means for recording said Offset Number on the card's machine readable magnetic stripe.

22. A generator as described in claim 20 wherein at least one said user number and said secret alphanumeric sequence comprises alphanumeric characters of a preselected number.

23. A generator as described in claim 22 wherein at least one of said first and second circuit means includes transformation means for transforming, based on a preselected criteria, the characters of the number from its associated input means to its associated register means.

24. A generator as described in claim 20 wherein said register means includes third circuit means including third register means for storing a multidigit number, representing a number associated with the entity issuing said card, and means for affecting the digits in said first and second register means with digits in said third register means, definable as reintializing said first and second register means, prior to generating said Offset Number.

25. A generator as described in claim 24 wherein said first and second register means are reinitialized by different portions of the digits in said third register means.

26. A generator as described in claim 24 wherein said third circuit means includes fourth register means, means for storing in said fourth register means selected digits present in said first and second register means, and means for clocking said first, second and fourth register means and for generating said Offset Number during a selected number of clock intervals only after said fourth register means has reached a preselected state.

27. A generator as described in claim 20 wherein said control circuit means include means for generating said Offset Number by mapping selected digits in said first and second shift registers based on a preselected mapping.

* * * * *